US007827227B2

(12) United States Patent
Iijima et al.

(10) Patent No.: US 7,827,227 B2
(45) Date of Patent: Nov. 2, 2010

(54) INFORMATION DISTRIBUTION SYSTEMS AND METHODS, PROGRAMS REALIZING THESE METHODS, AND INFORMATION MEDIA CONCERNING THE PROGRAMS

(75) Inventors: Akio Iijima, Minato-ku (JP); Tomohiko Yukawa, Minato-ku (JP); Junichi Kobayashi, Minato-ku (JP); Hiroyuki Arai, Koto-ku (JP); Tomoko Nakano, Koto-ku (JP); Nahoko Toda, Koto-ku (JP)

(73) Assignee: Dentsu Inc., Tokyo (JP)

( * ) Notice: Subject to any disclaimer, the term of this patent is extended or adjusted under 35 U.S.C. 154(b) by 1276 days.

(21) Appl. No.: 10/500,272

(22) PCT Filed: Dec. 25, 2002

(86) PCT No.: PCT/JP02/13521

§ 371 (c)(1),
(2), (4) Date: May 26, 2005

(87) PCT Pub. No.: WO03/056829

PCT Pub. Date: Jul. 10, 2003

(65) Prior Publication Data

US 2005/0246432 A1   Nov. 3, 2005

(30) Foreign Application Priority Data

Dec. 25, 2001   (JP)   ............................ 2001-392930

(51) Int. Cl.
*G06F 15/16* (2006.01)
*H04N 7/10* (2006.01)
*H04N 7/025* (2006.01)
(52) U.S. Cl. ............................. 709/201; 725/32; 725/34
(58) Field of Classification Search .................. 709/201
See application file for complete search history.

(56) References Cited

U.S. PATENT DOCUMENTS 6,161,142 A   12/2000   Wolfe et al.

(Continued)

FOREIGN PATENT DOCUMENTS

EP   1 263 224 A1   12/2002

(Continued)

OTHER PUBLICATIONS

European Search Report for Application No. 02791988.5-1241/1478180; PCT/JP0213521, Mailed Jul. 6, 2009, 3 pages.

*Primary Examiner*—Jeffrey Pwu
*Assistant Examiner*—Shaq Taha
(74) *Attorney, Agent, or Firm*—Townsend and Townsend and Crew LLP

(57) ABSTRACT

The achievement of broadband information transmission media, makes it possible to perform on-demand information distribution. With this comes a desire for an autonomous information distribution system that meets both diverse client requirements and the need for a high level of immediacy.

An objective of the present invention is to provide such information distribution systems. The systems of the present invention comprise a means for managing the number of distributions, a means for generating an advertising list in which the extraction probability of each information material in the case of random extraction is the ratio of the remaining number of distributions of each information material to the overall remaining number of distributions, a means for handicap application which applies a handicap to the remaining number of distributions of each information material included in the advertising list, and a means for random extraction which performs random extraction with respect to the advertising list so as to extract one information material. In these systems of the present invention, extracted information materials are distributed to a distribution demand terminal from the information distribution server via a network, and the contents of the advertising list are updated.

12 Claims, 35 Drawing Sheets

U.S. PATENT DOCUMENTS

| | | | |
|---|---|---|---|
| 2002/0013729 A1* | 1/2002 | Kida | 705/14 |
| 2002/0065977 A1* | 5/2002 | Kindo et al. | 711/1 |
| 2002/0147985 A1 | 10/2002 | Miyajima et al. | |
| 2003/0208560 A1* | 11/2003 | Inoue et al. | 709/219 |
| 2004/0093253 A1 | 5/2004 | Iijima | |
| 2004/0193488 A1* | 9/2004 | Khoo et al. | 705/14 |
| 2008/0134236 A1* | 6/2008 | Iijima et al. | 725/34 |

FOREIGN PATENT DOCUMENTS

| | | |
|---|---|---|
| EP | 1 292 146 A1 | 3/2003 |
| JP | 09-083991 | 3/1997 |
| JP | 09-116812 | 5/1997 |
| JP | 09-251296 | 9/1997 |
| JP | 10-022955 | 1/1998 |
| JP | 11-055636 | 2/1999 |
| JP | 11/353294 A | 12/1999 |
| JP | 2000-148675 A | 5/2000 |
| JP | 2001-024956 A | 1/2001 |
| JP | 2001-142826 A | 5/2001 |
| JP | 2001-236444 A | 8/2001 |
| JP | 2001-265997 A | 9/2001 |
| JP | 2001/266257 A | 9/2001 |
| JP | 2001-298432 | 10/2001 |
| JP | 2003-067290 A | 3/2003 |
| JP | 3825597 B2 | 9/2004 |
| KR | 10-2002-0034996 A | 5/2002 |
| WO | WO 97/40447 A1 | 10/1997 |
| WO | WO 01/71587 A2 | 9/2001 |
| WO | WO 01/71609 A2 | 9/2001 |
| WO | WO 01/89216 A1 | 11/2001 |
| WO | WO 01/93582 A1 | 12/2001 |
| WO | WO 02/061619 A1 | 8/2002 |

* cited by examiner

FIG. 3

ADVERTISER A  OVERALL DESIRED NUMBER OF REPRODUCTIONS FOR
ADVERTISEMENT ✱ ✱ ✱ TIMES

| UNIQUE CATEGORY | 1 4 ~ 2 4 | 2 5 ~ 3 4 | 3 5 ~ |
|---|---|---|---|
| CONSTITUENT INDIVIDUALS | a  b  c | d  e  f | g  h |
| EMPHASIS SETTING | + | − | O |

→ (FOR EXAMPLE, AGES)

ADVERTISER B  OVERALL DESIRED NUMBER OF REPRODUCTIONS FOR
ADVERTISEMENT ✱ ✱ ✱ TIMES

| UNIQUE CATEGORY | 1 0 ~ 1 9 | 2 0 ~ 2 9 | 3 0 ~ |
|---|---|---|---|
| | a  b | c  d  e | f  g  h |
| EMPHASIS SETTING | − | + | O |

MINIMUM UNIT CATEGORY SETTING
WITHIN A TIME PERIOD

| MINIMUM UNIT CATEGORY | 10~14 | 15~19 | 20~24 | 25~29 | 30~34 | 35~ |
|---|---|---|---|---|---|---|
| CONSTITUENT INDIVIDUALS | a | b | c | d  e | f | g  h |
| EMPHASIS SETTING OF ADVERTISEMENT A | + | + | + | − | − | O |
| EMPHASIS SETTING OF ADVERTISEMENT B | − | − | + | + | O | O |

FIG. 4

<< PREDICTED NUMBER OF SLOTS >>

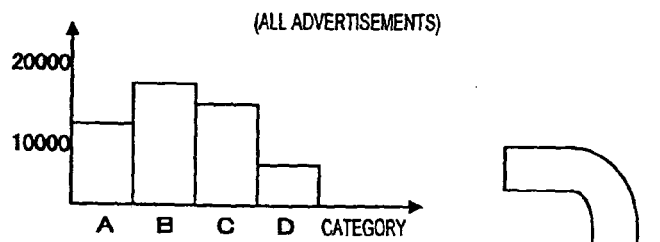
(ALL ADVERTISEMENTS)

<< INITIALLY DESIRED NUMBER OF REPRODUCTIONS FOR ADVERTISEMENT >>
(=THE OVERALL DESIRED NUMBER OF REPRODUCTIONS FOR ADVERTISEMENT MULTIPLIED BY THE RATIO OF THE PREDICTED NUMBER OF SLOTS FOR EACH CATEGORY RELATIVE TO THE OVERALL PREDICTED NUMBER OF SLOTS )

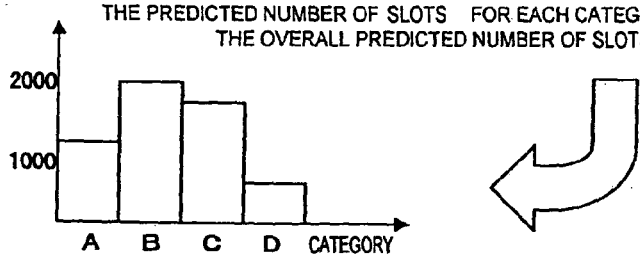

<< DESIRED NUMBER OF REPRODUCTIONS FOR ADVERTISEMENT AFTER INCREASE/DECREASE ADJUSTMENT >>

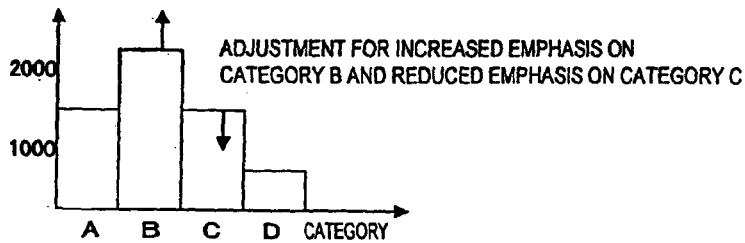
ADJUSTMENT FOR INCREASED EMPHASIS ON CATEGORY B AND REDUCED EMPHASIS ON CATEGORY C << NUMBER OF ALLOCATIONS >>
AN ACTUAL NUMBER OF ADVERTISEMENTS FOR EACH CATEGORY IS DETERMINED SO THAT THE TARGET FUNCTION $Z = \sum_{i,j} \{K(i,j) \times |$ (DESIRED NUMBER OF REPRODUCTIONS FOR ADVERTISEMENT AFTER INCREASE/DECREASE ADJUSTMENT − NUMBER OF ALLOCATIONS) / DESIRED NUMBER OF REPRODUCTIONS FOR ADVERTISEMENT AFTER INCREASE/DECREASE ADJUSTMENT $|\}$ IS MINIMIZED, WHERE i IS THE ADVERTISEMENT TYPE, j IS THE CATEGORY, AND
$K(i,j) = 1$ (TARGET SPECIFICATION) or ARBITRARY CONSTANT (WITHOUT TARGET SPECIFICATION)

FIG. 7

8 UPLOADING OF PRE-ALLOCATED ADVERTISING LIST

↓

9 GENERATION AND UPDATING PROCESS OF ALLOWANCE-CHECKED ADVERTISING LIST

↓

10 CALCULATION OF HANDICAP COEFFICIENT (= A X B X C X D)

ACQUISITION OF CHECKED ADVERTISING LIST

↓

CALCULATION OF DISALLOWED DATE COEFFICIENT (A)

↓

CALCULATION OF TARGET DATE COEFFICIENT (B)

↓

CALCULATION OF DISALLOWED TIME BAND COEFFICIENT (C)

↓

CALCULATION OF TARGET TIME BAND COEFFICIENT (D)

↓

TO DAILY CHECKED ADVERTISINIG LIST DATABASE

FIG. 14
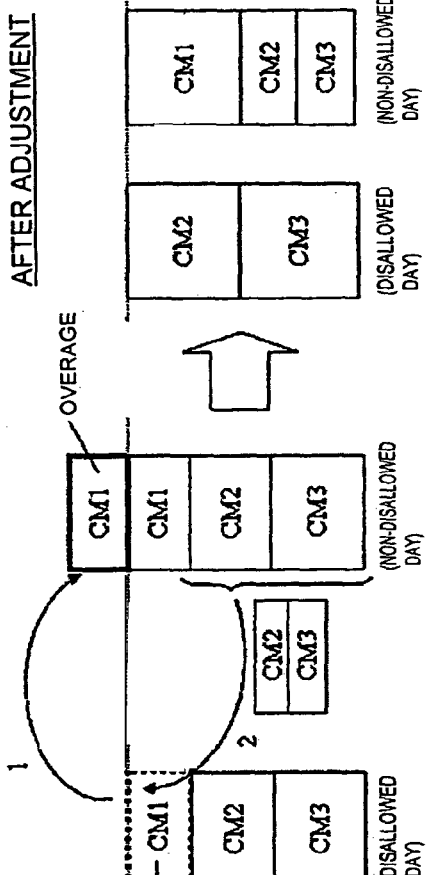
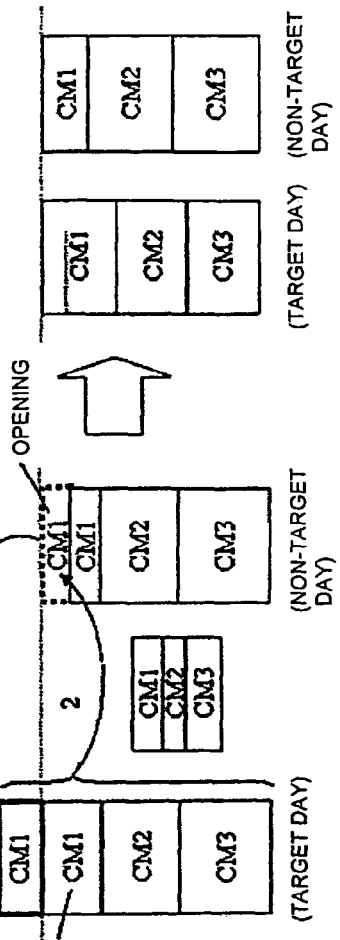
○ DISALLOWANCE SPECIFICATION

FIG. 19
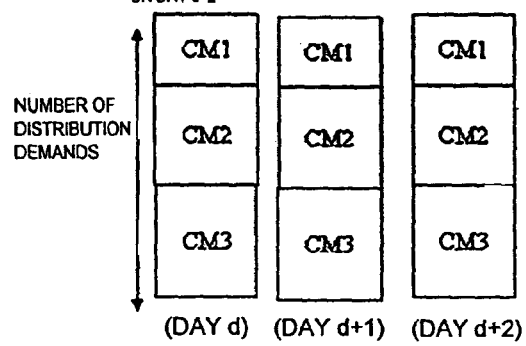
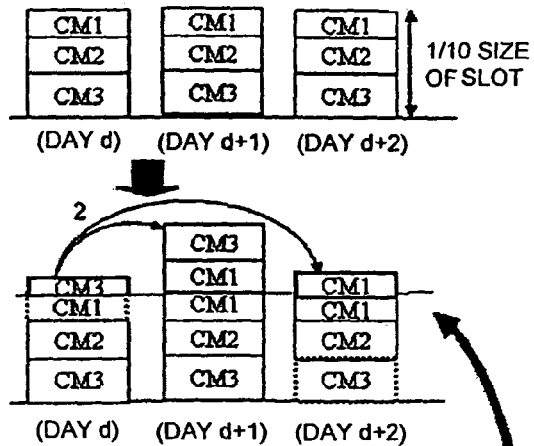
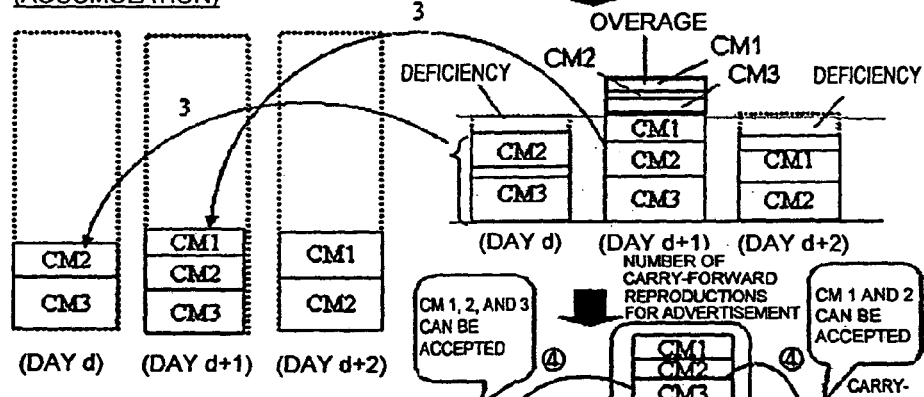
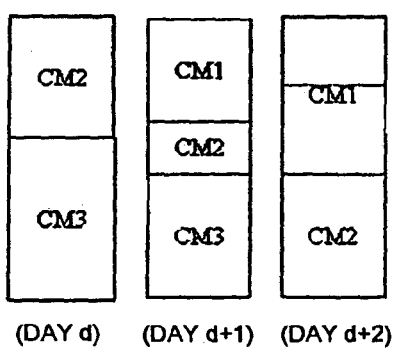
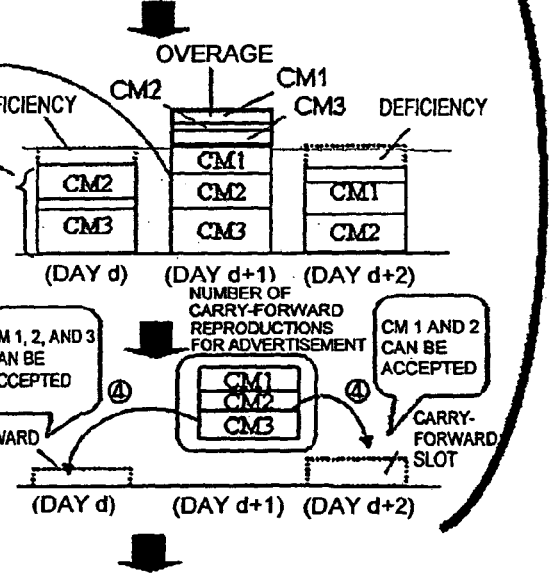
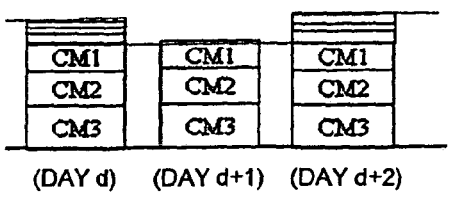

FIG. 25

(1) METHOD A

THE ADDED AMOUNT IS THE PRODUCT OF THE RATIO GIVEN AS THE BASIC COEFFICIENT AND THE AMOUNT OF THE ADVERTISEMENT.

THE ADDED AMOUNT $u(i,d)$ FOR ADVERTISEMENT $i$ ON DAY $d$, FOR WHICH THE INCREASE/DECREASE RATIO $p$ IS GIVEN IS $$u(i,d) = n(i,d) \times p(i,d)$$

$n(i,d)$ IS THE AMOUNT OF ADVERTISEMENT $i$ ON DAY $d$ BEFORE ADJUSTMENT.

(2) METHOD B

THE ADDED AMOUNT IS THE PRODUCT OF THE RATIO GIVEN AS THE BASIC COEFFICIENT RELATIVE TO THE OVERALL AMOUNT OF ADVERTISEMENTS ON DAY $d$ BEFORE ADJUSTMENT AND THE AMOUNT OF THE ADVERTISEMENT.

THE ADDED AMOUNT $u(i,d)$ FOR ADVERTISEMENT $i$ ON DAY $d$, FOR WHICH THE INCREASE/DECREASE RATIO $p$ IS GIVEN IS AS FOLLOWS.

$$\frac{n(i,d)+u(i,d)}{\sum n(k,d)+u(i,d)} = \frac{n(i,d)}{\sum n(k,d)} (1+p) \quad k=1,2,3,\ldots,CM\_SIZE$$
(NUMBER OF ADVERTISEMENTS)

$$\therefore u(i,d) = \frac{n(i,d) \times p(i,d) \times \sum n(k,d)}{\sum n(k,d) - n(i,d) - n(i,d) \times p(i,d)}$$

$n(i,d)$ IS THE AMOUNT OF ADVERTISEMENT $i$ ON DAY $d$ BEFORE ADJUSTMENT.

(i) POSITIVE INCREASE/DECREASE SPECIFICATION
CM1 : p=0.5(+50%)

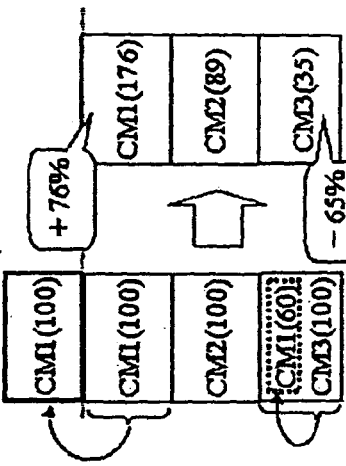

(ADJUSTMENT-METHOD A)    (AFTER ADJUSTMENT)
CM1 : +50%

(i) POSITIVE INCREASE/DECREASE SPECIFICATION
CM1 : p=0.5(+50%)

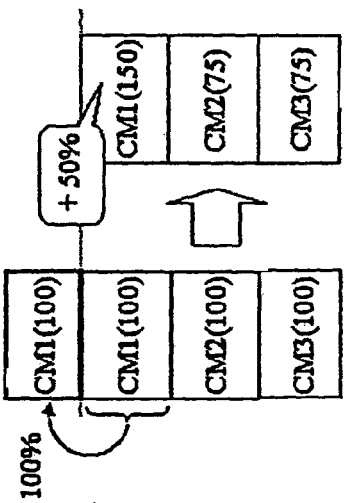

(ADJUSTMENT-METHOD B)    (AFTER ADJUSTMENT)
CM1 : +50%

(ii) POSITIVE AND NEGATIVE INCREASE/DECREASE SPECIFICATION
CM1 : p=0.5(+50%)
CM3 : p=-0.5(-50%)

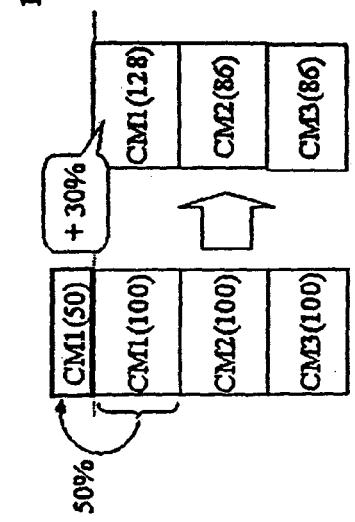

(ADJUSTMENT-METHOD B)    (AFTER ADJUSTMENT)
CM1 : +50%
CM3 : -50%

FIG. 26
(3) METHOD A + METHOD B (CM1 : p=0.5 (+50%))
(i) POSITIVE INCREASE/DECREASE SPECIFICATION
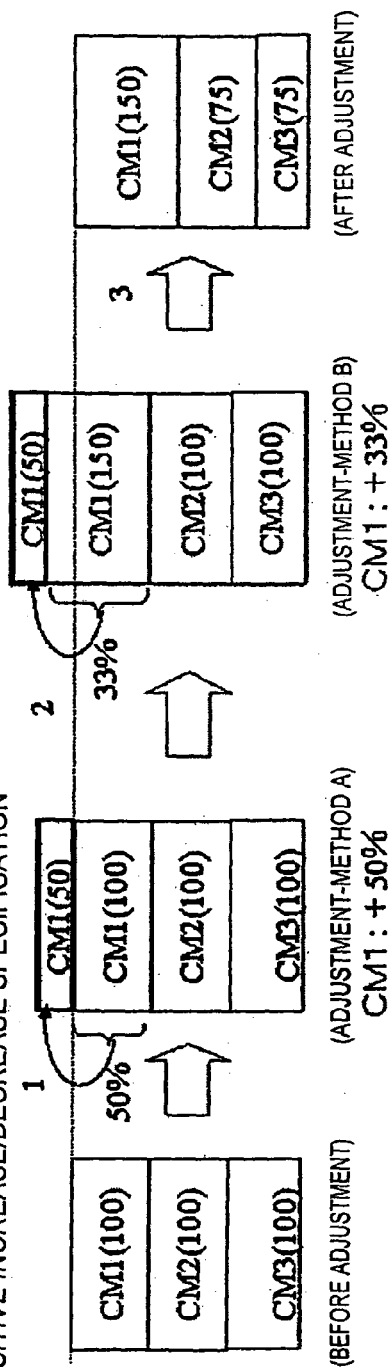
(ii) POSITIVE AND NEGATIVE INCREASE/DECREASE SPECIFICATION (CM1 : p=0.5 (+50%), CM3 : p=−0.5 (−50%))
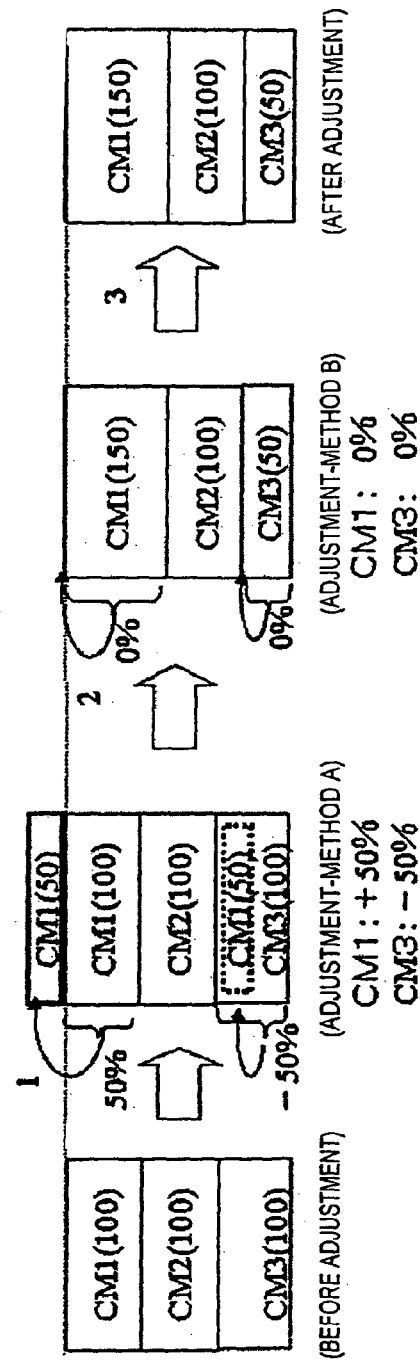

DECISION TREE

| ADVERTISEMENT TYPE | SELECTION RATIO P1(i) | CHANGE RATIO sa(i) | MINIMUM COMMON MULTIPLE | HANDICAP COEFFICIENT w_flame(i) |
|---|---|---|---|---|
| CM1 : | 0.25 | 1 | | 2 |
| CM2 : | 0.5 | 2 | 2 | 1 |
| CM3 : | 0.5 | 2 | | 1 |
| CM4 : | 0.5 | 2 | | 1 |

FIG. 32
(A)
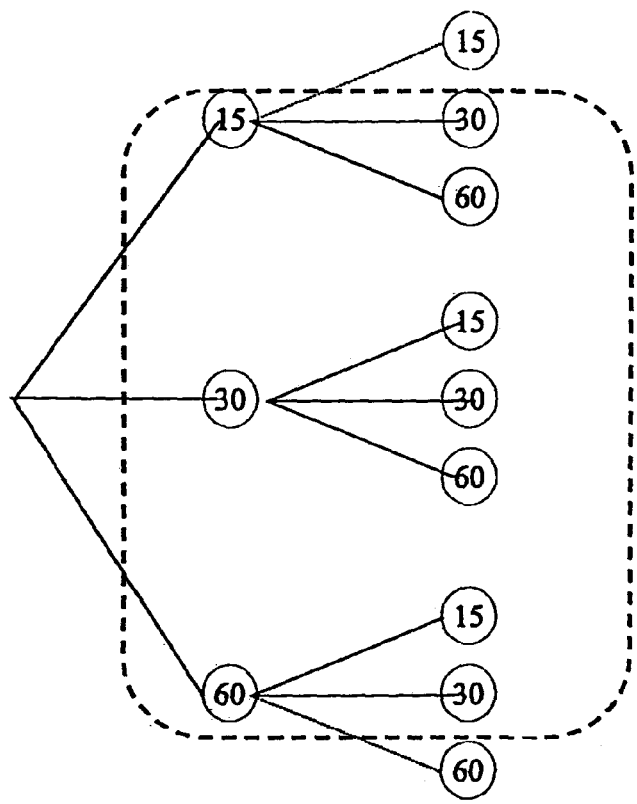
(B)
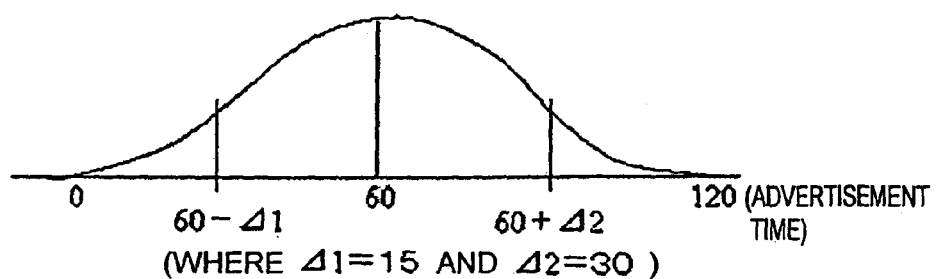

FIG. 34

<PRE-ALLOCATED MONTHLY ADVERTISING LIST>

| | AGENCY /BROADBAND PROVIDER CODE (PRODUCER) | SALES UNIT CODE | VIEWER CATEGORY CODE | ADVERTISEMENT ORIGINAL CODE | ADVERTISEMENT TIME PERIOD STARTING YEAR/MONTH/ DAY | ADVERTISEMENT TIME PERIOD ENDING YEAR/MONTH/ DAY | NUMBER OF REPRODUCTIONS FOR ADVERTISEMENT (ACTUAL RENEWING NUMBER OF TIMES) | FREQUENCY |
|---|---|---|---|---|---|---|---|---|
| CLASS 1 SPOT | ○ | ○ | ○ | ○ | ○ | ○ | ○ | ○ |
| CLASS 2 TIME 1 CONTENT | ○ | ○ | ○ | ○ | ○ | ○ | ○ | ○ |
| CLASS 3 TIME 2 ADVERTISEMENT SLOT | ○ | ○ | ○ | ○ | ○ | ○ | ○ | ○ |

| TARGET TIME BAND COEFFICIENT | | | | | | | | | TARGET DATE COEFFICIENT | | | | |
|---|---|---|---|---|---|---|---|---|---|---|---|---|---|
| WEEKDAY | | | HOLIDAY | | | | | | | | | | |
| 0 | 1 | ~ | 22 | 23 | 0 | 1 | ~ | 22 | 23 | 1 | 2 | ~ | 30 | 31 |
| ○ | ○ | ○ | ○ | ○ | ○ | ○ | ○ | ○ | ○ | ○ | ○ | ○ | ○ | ○ |
| ○ | ○ | ○ | ○ | ○ | ○ | ○ | ○ | ○ | ○ | ○ | ○ | ○ | ○ | ○ |
| ○ | ○ | ○ | ○ | ○ | ○ | ○ | ○ | ○ | ○ | ○ | ○ | ○ | ○ | ○ |

FIG. 35

<PRE-ALLOCATED DAILY ADVERTISING LIST>

| | SALES UNIT CODE | AGENCY /BROADBAND PROVIDER CODE (PRODUCER) | VIEWER CATEGORY CODE | ADVERTISEMENT ORIGINAL CODE | ADVERTISEMENT TIME PERIOD STARTING YEAR/MONTH/ DAY | ADVERTISEMENT TIME PERIOD ENDING YEAR/MONTH/ DAY | NUMBER OF REPRODUCTIONS FOR ADVERTISEMENT (ACTUAL REMAINING NUMBER OF TIMES) | FREQUENCY |
|---|---|---|---|---|---|---|---|---|
| CLASS 1 SPOT | ○ | | | ○ | | | | ○ |
| CLASS 2 TIME 1 CONTENT | ○ | ○ | ○ | ○ | ○ | ○ | ○ | ○ |
| CLASS 3 TIME 2 ADVERTISEMENT SLOT | ○ | ○ | ○ | ○ | ○ | ○ | ○ | ○ |

TARGET TIME BAND COEFFICIENT

| WEEKDAY OR HOLIDAY | | | TARGET DATE COEFFICIENT |
|---|---|---|---|
| 0 | 1 ~ 22 | 23 | |
| ○ | ○ ○ ○ | ○ | ○ ○ ○ |
| ○ | ○ ○ ○ | ○ | ○ ○ ○ |
| ○ | ○ ○ ○ | ○ | ○ ○ ○ |

DISALLOWED DATE COEFFICIENT

| | DISALLOWED TIME BAND COEFFICIENT | | |
|---|---|---|---|
| | 0 | 1 ~ 22 | 23 |
| ○ ○ ○ | ○ ○ ○ | ○ ○ ○ | ○ ○ ○ |
| ○ ○ ○ | ○ ○ ○ | ○ ○ ○ | ○ ○ ○ |
| ○ ○ ○ | ○ ○ ○ | ○ ○ ○ | ○ ○ ○ |

SLOT TIME BAND COEFFICIENT

| 5 | 10 ~ 60 | 80 ~ |
|---|---|---|
| ○ | ○ ○ ○ | ○ ○ ○ |
| ○ | ○ ○ ○ | ○ ○ ○ |
| ○ | ○ ○ ○ | ○ ○ ○ |

| DISALLOWANCE INFORMATION | | USED RULE | | | |
|---|---|---|---|---|---|
| NW | AGE LIMIT CLASS | NUMBER OF MATERIAL SECONDS | BIT RATE | NUMBER OF PIXELS | FORMAT |
| ○ | ○ | ○ | ○ | ○ | ○ |
| ○ | ○ | ○ | ○ | ○ | ○ |
| ○ | ○ | ○ | ○ | ○ | ○ |

INFORMATION DISTRIBUTION SYSTEMS AND METHODS, PROGRAMS REALIZING THESE METHODS, AND INFORMATION MEDIA CONCERNING THE PROGRAMS

TECHNICAL FIELD

The present invention relates to information distribution systems and methods for distributing viewing information, such as video contents, to a viewer terminal connected to a network, as well as programs and information media for realizing these methods. More particularly, the present invention relates to information distribution systems and methods for distributing advertisement information together with the distribution of video contents, and programs and information media for realizing these methods.

BACKGROUND ART

With the achievement of high communication rates, video content distribution services via the Internet have been started. Along with such diversification of information media, development is progressing in the area of various broadband information media, and accordingly, the number of viewing channels is increasing. At the same time, with an increase in bidirectional information media, great changes are foreseen in viewer behavior, including on-demand viewing and so on. These trends are expected to accelerate even faster in the future.

Along with the above, the average viewing rating for each medium is expected to gradually decline. In television and radio advertising it is already becoming difficult to achieve the same advertising effect as in the past by using advertisements inserted between various contents or with a part of the contents.

Therefore, in allocating a limited advertising budget between various information media, there is a desire on the part of an advertiser to achieve the best possible cost effectiveness through differentiated advertisement distributions, such as those that closely match the tastes of individual distribution viewers, instead of the averaged form of distribution, as in the past.

In the distribution of advertising, the number of viewers in a targeted group of viewers that are reached by the advertiser (reach) and the number of times the advertising reaches viewers, are criteria indicating the effectiveness of advertising.

In advertising for television broadcasts, time slots for advertising are established for each program (program advertising slots). For each program advertising slot, a prediction is made as to the viewer group (age, gender, and the like) and the degree to which the viewing is done. These predictions are made considering broadcast time, program content, and viewing rating. An advertising broadcast plan (program advertising slot purchasing plan) is developed in order to respond to the desires of the advertiser with regard to reach and frequency for each targeted group.

When advertising is distributed via the Internet to a viewer terminal along with video content, or when an advertisement comprising video information in an information screen is distributed, because it is possible for the same video content or information screen to distribute different advertising depending upon the viewer, the concept of an advertisement time slot is provided for each viewing time (this is called a viewing time advertisement slot).

Compared with the program advertising slot in television broadcasting, the viewing time advertisement slot enables not prediction but rather specification of viewers. It enables more precisely targeted advertising. However, since the number of advertisement slots changes depending upon the overall viewing time of viewers, it is not possible to pre-establish an advertisement slot.

In the manual allocations of the past, it was too complex to perform detailed allocation of advertisements in diversified information media, and such a detailed allocation has become increasingly more difficult to accommodate.

To handle this type of situation, in Japanese Patent Application No. 2000-48217 (Unexamined Published Japanese Patent Application No. (JP-A) 2001-236444), for example, a method for advertising distribution is proposed. This method prepares and quantifies a plurality of attributes common to advertisements, determines the distribution frequency and distribution sequence that reflect distribution conditions from the distribution side and the viewer side, generates an advertisement sequence schedule, performs scheduling and generates a time schedule for advertisements for which the distribution time band and distribution sequence have been specified, synthesizes the above-noted two schedules and performs re-scheduling to create a final distribution schedule, and distributes advertisements from the distribution side to the viewer side while observing the time, in accordance with this distribution schedule.

Japanese Patent Application No. 2000-53305 (International Publication No. 01/89216) proposes a technology aimed at achieving a desired total number of reproductions for the advertisement by generating and managing a plan for the upper limit of the number of placements for each terminal, considering viewer attributes, and also controlling the placement sequence in accordance with the desires of the advertiser.

DISCLOSURE OF THE INVENTION

In the above-described advertisement distribution methods, the priority of advertisement placement is determined in accordance with a distribution frequency that is defined by the product of an attribute and a weighting coefficient. Eventually, priority would be applied to the number of the advertisements required to fill the advertisement slot. However, in actual advertisement distribution, even applying overall priority, it is impossible to perform dramatic distribution in accordance with the desires of the advertiser or the viewer.

That is, in an advertisement without an advertisement slot, there is very little probability that a large difference will occur in the advertising effects between the case in which the n-th advertisement and the (n+1)-th advertisement are distributed in that sequence, and the case in which these advertisements are distributed in the reverse sequence. Given this, it is expected that the effort required to apply a complete prioritizing will result in commensurate waste.

Additionally, if a distribution schedule is made using the advertising distribution method noted in the Examples of the above-described patent applications, it is expected that advertisements with no time specification will appear with an averaged frequency. This is because, for example, at the beginning of the planned time period, only advertisements having a high number of demanded distributions will be distributed, whereas at the end of the planned time period, the number of remaining distributions for all advertisements without time specification will be approximately the same. This type of distribution pattern is certainly significantly different from the distribution pattern originally desired by the advertiser.

Furthermore, there is a risk that even advertisements having low weight, such as those with a low number of distributions, may not reach the demanded number of distributions within the planned time period, thereby resulting in a breach of the advertising contract.

Therefore there is a strong desire for an advertising distribution system that enables autonomous determination of a detailed distribution schedule desired by an advertiser, without the need for troublesome human intervention.

In particular, in actual advertisement distribution the classification of attributes desired by an advertiser is not uniform, and differs with each advertiser and advertisement. Thus it is difficult to establish a fixed routine, and it is not easy to determine a priority sequence. Furthermore, in order to perform distribution with uniform attributes, the agency side must buy up a certain amount of advertisement slots due to the need to avoid interference with other advertisers.

In addition, methods of inserting advertisements include such methods as the "spot" type advertisement, in which the information medium is specified, and the "time" type advertisement, in which the content (program) is specified. This makes determining a priority sequence all the more difficult.

Furthermore, in actual distribution the possibility must also be considered of cases where, in response to the desires of an advertiser, there is a day during which advertising is not possible (a disallowed day), or a time band during which advertising is not allowed (a disallowed time band), or cases in which there are weighted and non-weighted specifications made for advertising days or advertising time bands, and cases in which an advertisement cannot fit into an advertisement slot because the length of the advertisement content differs. In such cases, the number of reproductions for the advertisement desired by an advertiser must be fulfilled while satisfying these restrictions.

In the real world, in which the above-noted complex cases can be envisioned, methods such as those of the past, which use uniform distribution priority sequences, are not effective. It is essential to either perform advertisement distribution at a level that can satisfy the desires of advertisers by being practically useful or, if that is not possible, to have a huge amount of human support: a far cry from an autonomous system.

In addition, the technology disclosed in Japanese Patent Application No. 2000-533055 (International Publication No. 01/89216) can be appreciated since it adopts the view of time in selecting advertisements to distribute. However, it merely adjusts the number of reproductions for the advertisement heading towards the end of a period of time to meet the required number for each advertisement, while setting and managing the upper limit to the number of distribution in each individual terminal. Under actual access conditions, it is not only difficult to perform detailed distribution in accordance with the desires of advertisers, but it is also uncertain as to even whether the total number of reproductions for the advertisement for each advertisement will be achieved.

Given the above, the present invention was made in order to solve the above-described technical problems.

The present invention (1) is an information distribution system that distributes each information material from an information distribution server to an information demand terminal via an information network, where the information distribution system comprises a means for managing the number of distributions, where the means stores the planned number of distributions during a period of time for each information material, the actual number of distributions already made for each information material, and the remaining number of distributions for each information material, which is the difference between these two numbers of distributions, a means for generating an advertising list, where the means generates an advertising list for extraction, in which the extraction probability for each information material in the case of random extraction is the ratio of the remaining number of distributions for each information material to the accumulated total of the remaining number of distributions for each information material at that point in time, a means for handicap application, which, when performing random extractions, applies a handicap each time to the remaining number of distributions of each information material comprised by the advertising list, so that the mean extraction probability is maintained over the time period, while causing deviation in the extraction probability distribution at each random extraction, and a means for random extraction, where the means performs random extractions with respect to the advertising list, based on the remaining number of distributions of each information material to which a handicap has been applied, so as to extract one information material, and wherein an extracted information material is distributed via the information network from the information distribution server to the distribution demand terminal, an addition is made to the actual number of distributions already made, a subtraction is made from the remaining number of distributions based on the results of the distribution, and the advertising list is updated so that the distribution results are reflected in the extraction probabilities for next time.

Herein, the term "deviation" refers to the condition in which, in the extraction probability distribution for each individual information material (comprising advertisements), the extraction probability for each information material for each time region varies from the mean extraction probability with time, to the extent that there is no fluctuation in the mean extraction probability for each information material over a predetermined period of time; the condition in which the mean extraction probability for each category of information material varies from the extraction probability distribution for each category for all the information materials; or a combination of these conditions.

The present invention (2) is an information distribution system that, in response to demand from each distribution demand terminal, reads out various information from a means of storing an information material and distributes the read-out information material to the distribution demand terminals via a network, where the system comprises, a means for managing a remaining number of distributions, where the means stores the planned number of distributions during a period of time for each information material, the actual number of distributions already made for each information material, and the remaining number of distributions for each category of each information material, which is the difference between these two numbers of distributions, a means for generating an advertising list, where the means generates an advertising list for extraction of each category, in which the extraction probability for each information material in the case of random extraction is the ratio of the remaining number of distributions for each information material to the accumulated total of the remaining number of distributions for each information material at that point in time, a means for category judgment, where the means judges the category to which the distribution demand terminal belongs at the time a distribution request is received from a distribution demand terminal, a means for selecting an advertising list, where the means selects the advertising list corresponding to the judged category, a means for handicap application, which, when performing random extractions, applies a handicap each time to the remaining number of distributions of each information material comprised in the advertising list, so that the mean extraction probability is maintained over the time period, while causing deviation in the extraction probability distribution at each random extraction, a means for random extraction, which performs random extraction with respect to the advertising list based on the remaining number of distributions of each information material to which a handicap has been applied, so as to extract one information material;

and wherein an extracted information material is distributed via the information network from the information distribution server to the distribution demand terminal that made the request, an addition is made to the actual number of distributions already made, a subtraction is made from the remaining number of distributions based on the results of the distribution, and the advertising list is updated so that the distribution results are reflected in the extraction probabilities for the next time.

The present invention (3) is the information distribution system of (1) or (2), in which the information material comprises an advertisement.

The present invention (4) is an information distribution system comprising at least a video content storage means which stores video contents, an advertisement storage means which stores advertisement materials, and a video content distribution server which selectively reads requested video contents from the video content storage means, and distributes, via a network, the video content to a viewer terminal that has made a request, and the system further comprises, an advertisement distribution condition database, which stores at least, for each advertisement, information about the desired number of reproductions for the advertisement during a planned time period and information about specifications of increasing or decreasing with respect to each category and time period, a viewer database, which stores at least information about a category to which each viewer belongs, and information about the viewing history for each viewer, a means for predicting the number of distribution demands, which predicts the number of demanded distributions within the time period for each category, based on the information on the viewing history of all viewers, a means for calculating the number of planned distributions, which calculates the number of planned distributions of each advertisement for each category, so as to balance the number of desired advertisements of each advertisement for each category and the number of requested distributions for each category, a means for generating a random extraction advertising list, which generates an advertising list for each category, wherein the extraction probability for each advertisement in the case of random extraction is the ratio of the planned number of distributions of each advertisement for each category to the accumulated total for each category of the planned number of distributions of all the advertisements, a means for random extraction, which performs random selection and extraction with respect to the advertising list corresponding to a category to which the distribution demand terminal belongs, so as to select one advertisement, a means for generating a distribution list, which generates a distribution list in which the extraction sequence is used as the advertisement distribution sequence, by repeating the random extraction of advertisements by the means for random extraction until the demanded advertisement slots are filled, while updating the advertising list so that the extraction probabilities for the next time reflect the results of the extraction, a means for managing a distribution list, which stores the distribution list and outputs the list to an advertisement material distribution server, and an advertisement material distribution server which, based on the distribution list, sequentially and selectively reads a corresponding advertisement material from the advertisement material storage means, and when the video content is distributed via the information network to a distribution demand terminal which has made a request, performs a linked distribution of the advertisement material.

As described in (4), application of a handicap comprises the control of the extraction probability distribution for each category for each advertisement so as to approach the desired number of reproductions for the advertisement while maintaining the mean extraction probability for each advertisement.

The present invention (5) is the information distribution system of (4), wherein the means of generating a distribution list generates a distribution list in which the extraction sequence is used as the advertisement distribution sequence, by repeating the random extraction of advertisements by the means for random extraction until the demanded advertisement slots are filled, while updating each number of planned distributions of the advertising list by reducing the number of planned distributions so that there is no return to the advertising list for the extracted advertisement.

The present invention (6) is the information distribution system of (4), wherein the means for generating a distribution list generates a distribution list in which the extraction sequence is used as the advertisement distribution sequence, by repeating the random extraction of advertisements by the means for random extraction until the demanded advertisement slots are filled, while multiplying the extraction probability of each advertisement by a corresponding correction coefficient and updating the extraction probability of each advertisement in the advertising list so that the extraction probability for the next time reflects the extraction results.

Herein, if the correction coefficient is such that the extraction results are reflected in each of the extraction probabilities for the next time, it is applicable. For example, when the number of accumulated planned number of reproductions for the advertisement is calculated at the time of each extraction, and the number of actual reproductions for the advertisement does not reach that number, it is possible to multiply the extraction probability of such an advertisement by a correction coefficient such that increases the extraction probability.

For example, for an advertisement X for which the number of actual reproductions for the advertisement does not reach the accumulated number of planned reproductions for the advertisement, in calculating the extraction probability for the d-th day, if $$A(X, d-1) = \frac{\text{Accumulated number of planned advertisements up to the }(d-1)\text{-th day for advertisement }X}{\text{Accumulated number of planned advertisements up to the }(d-1)\text{-th day for all advertisements}} \text{ and}$$

-continued $$B(X, d-1) = \begin{bmatrix} \text{Accumulated number of actual} \\ \text{advertisements made up to the } (d-1)- \\ \text{th day for advertisement } X \\ \hline \text{Accumulated number of actual} \\ \text{advertisements up to the } (d-1)- \\ \text{th day for all advertisements} \end{bmatrix}$$

it is possible to perform processing whereby the correction coefficient for the d-th day is taken as being $A(X,d-1)/B(X,d-1)$.

The present invention (7) is the information distribution system of any one of (4) to (6), wherein the advertisement distribution condition database further stores a category classification for each advertisement, and the system further comprises a means for minimum unit category classification which performs a detailed division, into minimum categories, of the categories for all the advertisements desired to be distributed during the time period, and assigning the increase or decrease specifications stored in the advertisement distribution condition database to the corresponding minimum categories, and then storing the specifications again.

The present invention (8) is the information distribution system of any one of (4) to (7), wherein the means for calculating the number of planned distributions, in order to increase or decrease the initially allocated number of reproductions for the advertisement for the specified category for each advertisement in accordance with the target specification, performs a uniform flexible adjustment between the initially allocated number and the number of reproductions for the advertisement for categories without target specification for the advertisement; and uses each of the number of reproductions for the advertisement to which the increase or decrease adjustment has made as the planned number of distributions for each category, so that the overall number of reproductions for the advertisement comprised in each category agrees with the number of demanded number of distributions for each category, while maintaining the ratio of the number of reproductions for each advertisement for each category to the overall number of planned reproductions for advertisements comprised in each category after the flexible adjustment.

The present invention (9) is the information distribution system of any one of (4) to (7), wherein the means for calculating the number of planned distributions, in order to increase or decrease an initially allocated number of reproductions for the advertisement for the specified category for each advertisement in accordance with the target specification, performs uniform flexible adjustment between the initially allocated number and the number of reproductions for the advertisement for categories without the target specification for the advertisement; and takes the number of reproductions for the advertisement of each advertisement wherein the deficiency or excess of the number of reproductions for the advertisement for the categories without the target specification caused by the adjustment is adjusted flexibly and uniformly relative to all the advertisements comprised in the specified categories, so as to maintain the ratio of the number of reproductions for the advertisement after the adjustment to the overall number, as the number of planned distributions for each category.

The present invention (10) is the information distribution system of any one of (4) to (7), wherein the means for calculating the number of planned distributions takes the number of reproductions for the advertisement of each advertisement, calculated by the following means of processing (i) to (v), as the number of planned distribution for each category, (i) a means of processing for taking an amount obtained by dividing the initially allocated number of reproductions for the advertisement of each category by an integer as the unit adjustment amount, and extracting a number of reproductions for the advertisement corresponding to the unit adjustment amount for each category from the initially allocated number of reproductions for the advertisement for the category, so that the ratio of the number of reproductions for the advertisement of each advertisement to the unit adjustment amount for each category is the same as that of the number of reproductions for the advertisement of each advertisement to the overall initially allocated number, (ii) a means of processing for adjusting the number of reproductions for the advertisement of an advertisement with a target specification by increasing or decreasing in accordance with the target specification in the unit adjustment amount, and performing uniform flexible adjustment of a deficiency or excess occurring in the number of reproductions for the advertisement due to the adjustment relative to the number of reproductions for the advertisement of each advertisement in categories without the target specification, (iii) a means of processing for dividing the number of reproductions for the advertisement for each advertisement in each category after the flexible adjustment into a portion that fits within the unit adjustment amount and a portion that spills over it, while maintaining the ratio of the number of reproductions for the advertisement for each advertisement of each category after the flexible adjustment relative to the overall number, (iv) a means of processing for repeating an integer number of times the processing of (ii) to (iii) with respect to the accumulation of the number of reproductions for the advertisement for each advertisement spilling over from the unit adjustment amount and the number of reproductions for the advertisement of each advertisement comprised in the next unit adjustment, (v) a means of processing for taking the number of reproductions for the advertisement of each advertisement obtained by accumulating the portion that fits within the unit adjustment amount for each category as the number of reproductions for the advertisement in the category on each flexible adjustment.

The present invention (11) is the information distribution system according to any one of (4) to (7), wherein the means for calculating the number of planned distributions sets the target function Z, which comprises the difference between the desired number of reproductions for the advertisement adjusted by increasing or decreasing for each category for each advertisement and the number of reproductions for the advertisement, and uses a mathematical programming method to solve for a combination of the number of reproductions for the advertisement for each category of each advertisement, so that the value of the target function Z is minimized, and then the solved number of reproductions for the advertisement for each category of each advertisement is taken as the number of planned advertisements for each category.

The term "increase or decrease" used herein comprises several meaning.

The present invention (12) is the information distribution system of any one of (8) to (11), wherein the increase or decrease in accordance with the specification is an increase or decrease adjustment of the number of reproductions for the advertisement, so that when the ratio of the number of the advertisements before the increase or decrease adjustment relative to the overall number of reproductions for the advertisement in the category is compared with that after the increase or decrease adjustment relative to the overall, the specified ratio of increase or decrease is achieved.

The present invention (13) is the information distribution system of any one of (8) to (11), wherein the increase or decrease in accordance with the specification further performs the increase and decrease adjustment of (12) after an increase or decrease adjustment of the number of reproductions for the advertisement so as to achieve the ratio of increase or decrease specified after the adjustment.

The present invention (14) is an information distribution system comprising at least a video content storage means which stores video contents, an advertisement storage means which stores advertisement materials, and a video content distribution server which selectively reads a requested video content from the video content storage means, and distributes the video content to a viewer terminal that has made the request via a network; and the system further comprises an advertisement distribution condition database, which stores, for each advertisement, at least information about the desired number of reproductions for the advertisement during a planned time period, and information about a specification of increasing or decreasing with respect to each category, a viewer database, which stores at least information about a category to which each viewer belongs, and information about the viewing history for each viewer, a means for predicting the number of distribution demands, which, based on the information about the viewing histories of all viewers, predicts the number of demanded distributions within the time period for each category, a means of generating an as yet unallocated advertising list, which generates an as yet unallocated advertising list for each advertisement comprising the number of remaining advertisements of the overall number of desired advertisements during the planned time period for each advertisement, a means of generating an initial allocation advertising list, which multiplies the as yet unallocated advertising list for each advertisement by the ratio of the number of demanded distributions for each of the categories to the total number, so as to generate an initial allocation advertising list allocated to each category, a means for calculating a post-increase/decrease adjusted number of desired advertisements, which determines for each category for each advertisement the initially allocated number of desired advertisements and the number of desired advertisements after the increase or decrease adjustment, a means for calculating the number of planned distributions, which calculates the number of planned distributions of each advertisement for each category by calculating a category weight for each category for each advertisement, so as to balance between the post-increase/decrease adjusted number of desired advertisements and the number of demanded distributions for each category, and multiplying the number of demanded distributions for each category and the calculated category weight, a means for generating a pre-allocated advertising list, which generates an advertising list for each category, in which the extraction probability for each advertisement in the case of a random extraction is the ratio of the number of planned distributions of each advertisement for each category to the overall accumulation of the number of planned distributions for each category, a means for calculating handicap, which, with respect to the pre-allocated advertising list for each category, calculates a handicap that varies the number of planned distributions of each advertisement comprised in the pre-allocated advertising list, so as to cause deviations in the extraction probability distribution for each advertisement during each time region while maintaining the mean extraction probability of each advertisement over the period of time, a means for generating a next time region advertising list, which uses the handicap to extract an advertising list for each category for the next time region from the pre-allocated advertising list for each category, a means for category judgment, which, when a distribution request is received from a distribution demand terminal, judges the category to which said terminal belongs, a means for selecting an advertising list, which selects the next time region advertising list corresponding to the judged category, a means for random extraction, which performs random extraction with respect to the selected next time region advertising list so as to extract one advertisement, a means for generating a distribution list, which generates a distribution list by using the means for random extraction to repeat random extractions until the advertisement slots that have been demanded are filled, while updating the next time region advertising list so that the results of the extraction are reflected in each extraction probability for the next extraction, and which uses the extraction sequence as the advertisement distribution sequence, a means for managing a distribution list, which stores the distribution list and outputs it to an advertisement material distribution server, and an advertisement material distribution server which, based on the distribution list, sequentially and selectively reads a corresponding advertisement material from the advertisement material storage means, and which, when the video content is distributed via an information network to the distribution demand terminal which has made the request, performs linked distribution of the advertisement material.

With regard to processing by the various means in (14), the means for predicting the number of distribution demands, the means for generating an as yet unallocated advertising list, the means for generating an initial allocation advertising list, the means for calculating a post-increase/decrease adjusted number of desired advertisements, the means for calculating the number of planned distributions, and the means for generating a pre-allocated advertising list can be performed monthly, and wherein the means for calculating handicap can calculate a handicap for a time region in units of days and that for a time region in units of time bands, and the means for generating the next time region distribution list can consecutively generate the distribution lists for the next day and for the next time band, or the means for predicting a number of distribution demands and the means for generating the as yet unallocated advertising list can be performed monthly, the means for generating an initial allocation advertising list, the means for calculating a post-increase/decrease adjusted desired number of reproductions for the advertisement, the number of planned distributions calculation method, and the means for generating a pre-allocated advertising list can be performed daily, the means for calculating handicap can calculate a handicap for a time region in units of days and that for a time region in units of time bands, and the means for generating the next time region distribution list can consecutively generate the distribution lists for the next day and for the next time band, and also each of the processing in the above means can be performed when a distribution request is received from a distribution demand terminal.

That is, in the present invention (14), the calculation processing for the number of distribution demands for each category by the means for calculating the number of planned distributions of (4) uses only category weighting, and also a function which causes deviation in the extraction probability distributions of each advertisement for each time region is added by specifying a disallowed time band in which the advertisement is not permitted and a target time band in which, compared with another time band, there is more concentrated advertising.

The present inventions (15) to (23) are the systems of (14), wherein with the technical features in (5) to (13) are further specified.

The present invention (15) is the information distribution system of (14), wherein the means for generating a distribution list generates a distribution list in which the extraction sequence is used as the advertisement distribution sequence by repeating the random extraction of advertisements by the means for random extraction until the demanded advertisement slots are filled, while updating each number of planned distribution of the advertising list so that subtraction is made from the number of planned distributions for the extracted advertisement and there is no return to the selected next time region advertising list.

The present invention (16) is the information distribution system of (14), wherein the means for generating a distribution list generates a distribution list in which the extraction sequence is used as the advertisement distribution sequence, by repeating the random extraction of advertisements by the means for random extraction until the demanded advertisement slots are filled, while multiplying the extraction probability of each advertisement by a corresponding correction coefficient and updating the extraction probability of each advertisement in the selected next time region advertising list so as to reflect the results of the extraction in the next extraction probability.

Herein, in performing extractions of each advertisement, subtraction is basically made from the number of planned distributions, and the number of planned distributions is updated as the remaining number of distributions, the updated value being used to determine the number of advertisements in the advertising list at the time of extraction as the product of the number of planned distributions of each advertisement with its handicap, and the advertising probability is determined from the number of advertisements. However, when a correction coefficient is determined as in (16), it is not absolutely necessary to use the actual number of remaining planned distributions in this determination.

That is, as shown in the following equation, by multiplying the initially planned number of distributions during the planned time period by the handicap that reflects the results of the extractions until this time, it is possible to calculate a value corresponding to the number of remaining planned distributions for each advertisement in the advertising list.

Number of advertisements $f$ at the time of extraction in the advertising list=Handicap×Initial planned number of distributions during the planned time period.

Furthermore, in the embodiment of (16), there is no need to perform the updating of the remaining number of distributions at the same time as calculating the handicap. It is possible to update the remaining number of distributions over a shorter span than the period for calculating the handicap (the planned time period).

Stated differently, while the calculation of the handicap is performed to adjust the deviation when disallowed distributions and target specifications are expected to be comprised at the start of the time period, the updating of the remaining number of distributions is performed within a relatively short span, so that adjustment is made before fluctuations occurring in actual operation accumulate or expand.

The available planned time period comprises three types: monthly, daily, and real time. The combinations of handicap calculation and updating of the remaining number of planned distributions can be as shown in the following table. (However, "monthly"; "daily"; or such are merely examples of a planned time period, and there is no restriction thereto. It is possible to set a desired time period.)

| Updating the number of planned distributions | Handicap calculation | | |
| --- | --- | --- | --- |
| | Real time | Daily | Monthly |
| Real time | Possible | Possible | Possible |
| Daily | — | Possible | Possible |
| Monthly | — | — | Possible |

Furthermore, in actual operation, when the timing is such that updating the remaining number of planned distributions and handicap calculation are simultaneous, calculation of the extraction probability need not multiply the handicap and the remaining number of planned distributions, but will result in the same value as using only the handicap calculation.

An embodiment in which updating of the remaining number of planned distributions can be achieved in timing different to that of handicap calculation is the present invention (17).

The present invention (17) is the information distribution system of (16), wherein the means for generating a next time region advertising list can update the number of planned distributions of each advertisement in the advertising list without changing the handicap calculated by the means for calculating handicap.

The present invention (18) is the information distribution system of any one of (14) to (17), wherein the advertisement distribution condition database further stores a category classification for each advertisement, the system further comprising a means for minimum unit category classification, which finely divides the category classification of all of the advertisements desired to be distributed during the time period into classifiable minimum categories, and wherein the increase or decrease specifications stored in the advertisement distribution condition database are assigned to the corresponding minimum unit categories and stored again.

The present invention (19) is the information distribution system of any one of (14) to (18), wherein the means for calculating the number of planned distributions uniformly and flexibly adjusts the initially allocated number of reproductions for the advertisement with the target specification for the specified category using category weight, so as to increase or decrease in accordance with the target specification, relative to the number of reproductions for the advertisement for categories without target specification for the advertisement, and while maintaining the ratio of the number of reproductions for the advertisement for each category of each advertisement after the flexible adjustment to the planned number of reproductions for the advertisement for each advertisement, the category weight for the advertisement is calculated by dividing each of the number of reproductions for the advertisement which has been adjusted by increasing or decreasing so that the total number of reproductions for the advertisement in each category corresponds to the number of distribution demands for each category, by the remaining number of distribution demands for the category.

The present invention (20) is the information distribution system of any one of inventions (14) to (18), wherein the means for calculating the number of planned distributions adjusts uniformly and flexibly the initially allocated number of each advertisement with a target specification for the specified category so as to increase or decrease in accordance with the target specification, relative to the number of the advertisements for categories without target specification for each advertisement, and when a deficiency or excess of the number of reproductions for the advertisement for the categories without target specification derived from the flexible adjustment is uniformly and flexibly adjusted relative to all of the advertisements comprised in the categories with the target specification so as to maintain the ratio of the adjusted number of reproductions for the advertisement to the overall number for the categories, the category weight for each advertisement can be calculated by dividing the number of reproductions for the advertisement of each advertisement by the remaining number of distribution demands for the category.

The present invention (21) is the information distribution system of any one of (14) to (18), wherein the means for calculating the number of planned distributions takes the value obtained by dividing the number of reproductions for the advertisement for each advertisement calculated by the following means of processing (i) to (v), by the number of distribution demands for the category as the category weight for that category of the advertisement, (i) a means of processing for pulling out the number of reproductions for the advertisement corresponding to a unit adjustment amount for each category from the initially allocated number of reproductions for the advertisement for each category, wherein the unit adjustment amount is defined as the initially allocated number of reproductions for the advertisement for each category that has been divided by an integer, so that the ratio of the number of reproductions for the advertisement for each advertisement to the unit adjustment amount for each category becomes the same as that of the number of reproductions for the advertisement for each advertisement to the total initially allocated number of reproductions for the advertisement for each category, (ii) a means of processing for adjusting the number of reproductions for the advertisement of an advertisement with a target specification by increasing or decreasing in accordance with the target specification, and performing uniform flexible adjustment of a deficiency or excess occurring in the number of reproductions for the advertisement by the increase or decrease adjustment relative to the number of reproductions for the advertisement of each advertisement in categories without target specification, (iii) a means of processing for dividing the number of reproductions for the advertisement for each advertisement in each category after the flexible adjustment into a portion fitting within the unit adjustment amount and that spilling over the unit adjustment amount, while maintaining the ratio of the number of reproductions for the advertisement of each advertisement for each category after the flexible adjustment relative to the overall number, (iv) a means of processing for repeating (ii) to (iii) an integer number of times with respect to the accumulation of the number of reproductions for the advertisement for each advertisement spilling over from the unit adjustment amount and the number of reproductions for the advertisement for each advertisement comprised in the next unit adjustment, (v) a means of processing for taking the number of reproductions for the advertisement for each advertisement obtained by accumulating the portion that fits within the unit adjustment amount for each category on each flexible adjustment as the number of reproductions for the advertisement in the category.

The present invention (22) is the information distribution system of any one of (14) to (18), wherein the means for calculating the number of planned distributions sets the target function Z, which comprises the difference between the number of desired reproductions for the advertisement adjusted by increasing or decreasing and the number of actual reproductions for the advertisement for each category of each advertisement, and uses a mathematical programming method for solving the combination of the number of reproductions for the advertisement for each category of each advertisement so that the value of the target function Z is minimized, and wherein the category weight of the category for the advertisement is calculated by dividing the solved number of reproductions for the advertisement for each category for each advertisement by the number of distribution demands for the category.

The present invention (23) is the information distribution system of any one of (19) to (22), wherein increasing or decreasing in accordance with the specification means adjusting by increasing or decreasing the number of reproductions for the advertisement so that, when the ratio of the number of reproductions for the advertisement for the advertisement before the increase or decrease adjustment relative to the overall number of reproductions for the advertisement in the category is compared with that of the number of reproductions for the advertisement for the advertisement after the increase or decrease adjustment relative to the overall, the specified ratio of increase or decrease is achieved.

The present invention (24) is the information distribution system of any one of (14) to (22), wherein the increase or decrease adjustment in accordance with the adjustment specification means performing the increase or decrease adjustment of (23) after adjusting the number of reproductions for the advertisement by increasing or decreasing it so as to achieve the specified ratio of increase or decrease.

As described above, the present inventions of (14) to (24) correspond to (5) to (13), the only difference being in the inventions to which they are dependent.

In the present inventions (25) to (31) below, a means for calculating handicap for causing deviation for each time region in (14) (to (24)) is specified.

The present invention (25) is the information distribution system of any one of (14) to (24), wherein the means for calculating handicap comprises a means for calculating a disallowed date coefficient, a means for calculating a target date coefficient, a means for calculating a disallowed time band calculation, and a means for calculating a target time band coefficient, the product of the coefficients calculated by these calculation means being taken as the handicap coefficient, and the value of the product is the ratio of the number of planned distributions for the next time region, which is determined so as to maintain the average advertising probability during the time period, relative to the number of remaining distributions at the end of the current time region.

The present invention (26) is the information distribution system of (25), wherein the number of reproductions for the advertisement for an advertisement for which a disallowance is specified during a specified time region is uniformly distributed over a time region for which there is no disallowance specification, an increase or decrease adjustment is done with respect to the number of reproductions for the advertisement for advertisements without disallowance specification so as to coincide with each of the total number of planned advertisements in the specified disallowed time region and a time region without the disallowance specification, and then the disallowance coefficient is obtained by dividing the resulting number of reproductions for the advertisement for each advertisement by the number of remaining distributions of the advertisement in the time region, and the number of reproductions for the advertisement for an advertisement for which there is a target specification in the time region of the target specification is uniformly procured from the number of reproductions for the advertisement for the advertisement for which there is a target specification without the target specified time region so as to increase in accordance with the target specification, while maintaining the ratio of the number of reproductions for the advertisement for each advertisement to the overall number in each time region after procurement, the overall number of reproductions for the advertisement in the time region is adjusted by increasing or decreasing so as to coincide with the planned number of reproductions for the advertisement in that time region, and then the target coefficient is calculated by dividing the resulting number of reproductions for the advertisement for each advertisement in each time region by the remaining number of distributions of the advertisement in the planned time period.

The present invention (27) is the information distribution system of (25), wherein the number of reproductions for the advertisement of an advertisement for which a disallowance is specified during a disallowance specification time region is uniformly allocated over a time region for which there is no disallowance specification, uniform extraction is performed from the number of reproductions for the advertisement of an advertisement for which there is no disallowance specification, while maintaining the ratio of the number of reproductions for the advertisement of an advertisement not with a disallowance specification in a time region without the disallowance specification time region so as to be the same as the allocated amount, the extracted number of reproductions for the advertisement is used to compensate the deficiency in the disallowance specification time region, and the disallowance coefficient is obtained by dividing the resulting number of reproductions for the advertisement of each advertisement by the remaining number of distributions of each advertisement in that time region, and in order to increase the number of reproductions for the advertisement of an advertisement for which there is a target specification in the time region of the target specification, uniform procurement is performed from the number of reproductions for the advertisement of the advertisement for which there is a target specification without the target specification time region, while maintaining the ratio of the number of reproductions for the advertisement of each advertisement in the time region of the target specification to the overall number of reproductions for the advertisement after the procurement, the deficiency in the number of reproductions for the advertisement in a time region without the target specification caused by the procurement is compensated by the number of all advertisements comprised in the target specification time region to which the number of reproductions for the advertisement corresponding to the procured amount has been target specified, and the target coefficient is obtained by dividing the resulting number of distributions of each advertisement by the remaining number of distributions of the advertisement during the planned time period.

The present invention (28) is the information distribution system of (25), which uses the values obtained by dividing the number of reproductions for the advertisement of each advertisement, calculated by the following means of processing (i) to (v), by the number of remaining distributions of the advertisement in the planned time period, (i) a means of processing for taking an amount obtained by dividing the remaining number of reproductions for the advertisement in the distribution slot of each time region by an integer as the unit adjustment amount, and extracting a number of reproductions for the advertisement corresponding to the unit adjustment amount for each time region from the remaining number of reproductions for the advertisement for that time region so that the ratio of the number of reproductions for the advertisement for each advertisement to the unit adjustment amount is the same as that of the number of reproductions for the advertisement of each advertisement to the overall remaining number of reproductions for the advertisement in each time region, (ii) a means of processing for performing flexible adjustment that increases or decreases the number of reproductions for the advertisement of an advertisement with an adjustment specification within the unit adjustment amount in accordance with the adjustment specification, and for uniformly allocating the number of reproductions for the advertisement adjusted by decreasing among time regions other than the adjustment specification, or uniformly procuring the number of reproductions for the advertisement adjusted by increasing from the number of reproductions for the advertisement of advertisements having an adjustment specification in the time region other than the adjustment specification time region, (iii) a means of processing for dividing the number of reproductions for the advertisement for each advertisement for each time region after the flexible adjustment into a portion that fits within the unit adjustment amount, and a portion that spills over it, while maintaining the ratio of the number of reproductions for the advertisement of each advertisement in the time region after the flexible adjustment relative to the overall number, (iv) a means of processing for repeating (ii) to (iii) an integer number of times with respect to the accumulation of the number of reproductions for the advertisement for each advertisement spilling over from the unit adjustment amount, and that for each advertisement comprised in the next unit adjustment, (v) a means of processing for taking the number of reproductions for the advertisement of each advertisement obtained by accumulating for each time region the portion fitting within the unit adjustment amount as the number of reproductions for the advertisement in that time region.

The present invention (29) is the information distribution system of (25), wherein the various coefficients are taken as the values obtained by setting a target function Z, which comprises the difference between the number of reproductions for the advertisement and the desired number of reproductions for the advertisement adjusted by increasing or decreasing in accordance with the adjustment specification for each category of each advertisement, using a mathematical programming method for solving for a combination of the number of reproductions for the advertisement for each category of each advertisement so that the function Z is minimized, and dividing the resulting number of reproductions for the advertisement for each category of each advertisement by the number of remaining distributions of the advertisement within the planned time period.

The present invention (30) is the information distribution system of any one of (26) to (29), wherein the increase or decrease adjustment in accordance with the adjustment specification is an increase or decrease adjustment of the number of reproductions for the advertisement, so that when the ratio of the number of reproductions for the advertisement of the advertisement before the adjustment relative to the overall number in the time region is compared with that after the adjustment relative to the overall number, the specified ratio of increase or decrease is achieved.

The present invention (31) is the information distribution system of any one of (26) to (29), wherein the increase or decrease adjustment in accordance with the adjustment specification is the increase or decrease adjustment of (30) after performing an increase or decrease adjustment of the number of reproductions for the advertisement so as to achieve the specified ratio of increase or decrease.

The present invention (32) is the information distribution system of any one of (14) to (31), wherein each time when the means for generating a distribution list performs a random extraction, if an advertisement which has been extracted at a previous time or reaches the upper limit of the number of distributions, the result of the extraction that time is made invalid, and a random extraction is performed again.

In actual distribution, there is a specified slot for an advertisement, and it is necessary to select an advertisement material that will generally fit into the slot. One of the approaches for doing this in the present inventions (34) to (37) is to perform an operation that multiplies the extraction probability by a correction coefficient, which is a coefficient of slot size in seconds.

The method for calculating the coefficient of slot size in seconds is not particularly limited thereto.

The present invention (33) is the information distribution system of any one of (14) to (32), wherein the advertisement slot condition database further stores the slot size in seconds for each advertisement material and the slot pattern of each video content, and furthermore stores a coefficient of slot size in seconds for each advertisement, which has been multiplied so that an extraction probability that is not dependent on the size of the slot size in seconds can be obtained from a decision tree of the combination patterns of slot patterns and the number of seconds of each advertisement material, and the means for generating a distribution list has an additional extraction probability adjustment function $f$ or the slot size in seconds, which when performing a random extraction, selectively reads from the advertisement slot condition database the slot size in seconds in accordance with the combination of slot pattern and advertisement material so that the extraction probability for each advertisement material is the product of the original extraction probability and the coefficient of slot size in seconds.

The present invention (34) is the information distribution system of any one of (14) to (32), wherein the advertisement slot condition database further stores the slot size in seconds for each advertisement and the slot pattern for each video content, which system comprises a means for calculating an expected value, where that means, from a decision tree of the combination of patterns of the slot pattern and the number of seconds for each advertisement material, calculates an expected extraction value for each advertisement material at each first extraction of each advertisement slot, and a weight calculation means, which, based on the respective expected values, calculates weights proportional to the number of planned distributions for each advertisement material, and wherein upon the first extraction of an advertisement slot, the original extraction probabilities for each advertisement material is multiplied by the weights to add an extraction probability adjustment function $f$ or the slot size in seconds.

The present invention (35) is the information distribution system of any one of (14) to (32), wherein the advertisement slot condition database further stores the slot size in seconds for each advertisement material and the slot pattern for each video content, which system comprises an means for calculating an expected value, which calculates the expected value of the number of advertisement seconds with regard to all advertisement material within the advertising list, and a means for calculating the frequency of extractions, which calculates the number of extraction times for the expected value of slot size in seconds based on the slot size in seconds and the expected value of the number of advertisement seconds for each advertisement, and wherein with respect to each advertisement slot, random extraction is performed at frequencies calculated by the means for calculating the frequency of extractions.

The present invention (36) is the information distribution system of any one of (14) to (32), wherein the advertisement slot condition database further stores the slot size in seconds for each advertisement material and the slot patterns for each video content, which system comprises a means for calculating an expected value, where that means calculates the expected value of the number of advertisement seconds with regard to all advertisement material within the advertising list, a means for calculating the frequency of extractions, which, based on the value of slot size in seconds and the expected value of slot size in seconds for each advertisement, calculates the frequency of extractions so that the value of slot size in seconds for each advertisement coincides with the expected value of slot size in seconds, a means for generating a decision tree, which generates a decision tree of the number of extractions and arranges branches that do not satisfy an allowed slot limit based on the combination pattern of the slot pattern and the number of advertisement material seconds, and a means for calculating the coefficient of slot size in seconds, which calculates the coefficient of slot size in seconds based on the arranged decision tree, and wherein an extraction probability adjustment function for the slot size in seconds is added, in which the extraction probability of each advertisement material is the product of the original extraction probability and the coefficient of slot size in seconds.

In addition, the present invention (37) enables change of the manner in which the attributes are separated in the attribute judgments of (1) to (36).

The present invention (37) is the information distribution system of any one of (1) to (36), wherein the advertisement slot conditions database further stores information about a specified medium class for each advertisement, the specification of video content class, and the advertisement slot class, the means for category judgment also judges considering the information media class of the viewer terminal which made a viewing request, the video content class of the viewing request, and the advertisement slot class, and an advertising list for the classes has been provided beforehand when performing a category judgment, and the advertising list selection means selects a class-dedicated advertising list for that class when a judgment is made that the above class is selected.

The present inventions (38) to (74) are information distribution methods corresponding respectively to (1) to (37). The present invention (75) is a program for causing a computer to execute the steps according to any one of the information distribution methods of (38) to (74). The present inventions (76) and (77) are respectively an information-recording medium which can make the program of (75) computer-readable to execute the program, and an information-transmitting medium which can transmit the program within an information network.

BRIEF DESCRIPTIONS OF THE DRAWINGS

FIG. 3 is a drawing describing the present invention's minimum unit category setting.

FIG. 4 is a drawing describing the present invention's process of determining the actual allocated number of each advertisement for each category.

FIG. 7 is a drawing showing the present invention's flow of calculating various handicap coefficients.

FIG. 14 is a drawing describing the advertisement allocation method (method II) of the present invention.

FIG. 19 is a drawing describing the advertisement allocation method (method III) of the present invention.

FIG. 25 is a drawing describing the calculation of the amount of increase in the advertisement allocation method of the present invention (part 2).

FIG. 26 is a drawing describing the calculation of the amount of increase in the advertisement allocation method of the present invention (part 3).

FIG. 32 is a drawing illustrating the present invention's calculation method (4) for calculating the coefficient of advertisement slot size in seconds.

FIG. 34 is a drawing showing an example of a pre-allocated advertising list of the present invention.

FIG. 35 is a drawing showing an example of a pre-checked advertising list of the present invention.

EXPLANATION OF NUMERALS

Figure 1:
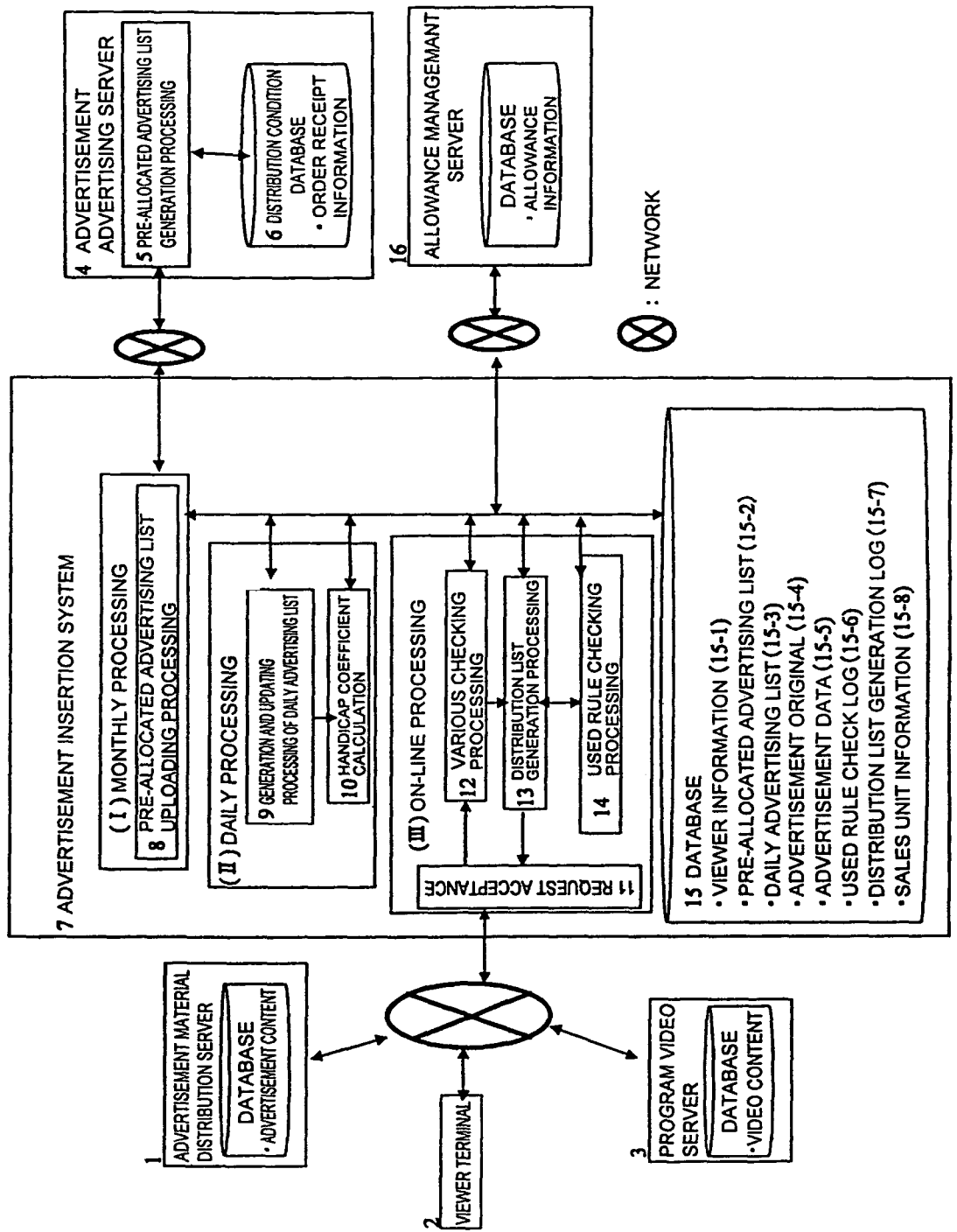
FIG. 1 is a drawing showing the overall configuration of an advertisement information distribution system that is an embodiment of the present invention.

1. Advertisement material distribution server
2. Viewer terminal
3. Program video server
4. Advertisement server
5. Pre-allocated advertising list
6. Advertisement distribution conditions database
7. Advertising insertion system
8. Pre-allocated advertising list uploading process
9. Allowance checked advertising list generation and updating
10. Handicap coefficient calculation
11. Request acceptance
12. Various checking processes
13. Distribution list generation process
14. Used rule checking process
15. Database
16. Allowance management server

BEST MODE FOR CARRYING OUT THE INVENTION

FIG. 1 shows an embodiment of the overall configuration of the present invention, which is a system comprising an advertisement insertion system and an associated peripheral system.

The viewer terminal 2 is a terminal that can be connected to a network, and that comprises software for playing back video content provided via the network.

The program video server 3 stores video content to be distributed to the viewer terminal 2, and specifically comprises a program video content database and distributes various program video content via the network.

The advertisement material distribution server 1 comprises an advertisement content database that stores advertisement content created by an advertiser, and distributes the advertisement content to each viewer terminal via the network. The number of advertisement servers 1, and program video content servers 3, can be one or more.

The program video content that is distributed by the program video server 3 comprises a program that sends a request for advertisement information via the network to acquire and play back advertisement content from the advertising server 1, during the playback of video content. This request is sent together with viewer information held in the viewer terminal 2.

Additionally, the allowance management server 16 comprises an allowance information database that stores various allowance information such as expiring date, and sends allowance information regarding stored advertisement content to the advertisement insertion system 7.

The advertising server 4 comprises a distribution conditions database 6 that stores advertisement distribution information, such as the number of reproductions for the advertisement of advertisement content and distribution time periods. The pre-allocated advertising list generation processor 5 performs allocation that satisfies the distribution conditions.

(Overall Flow)

Figure 2:
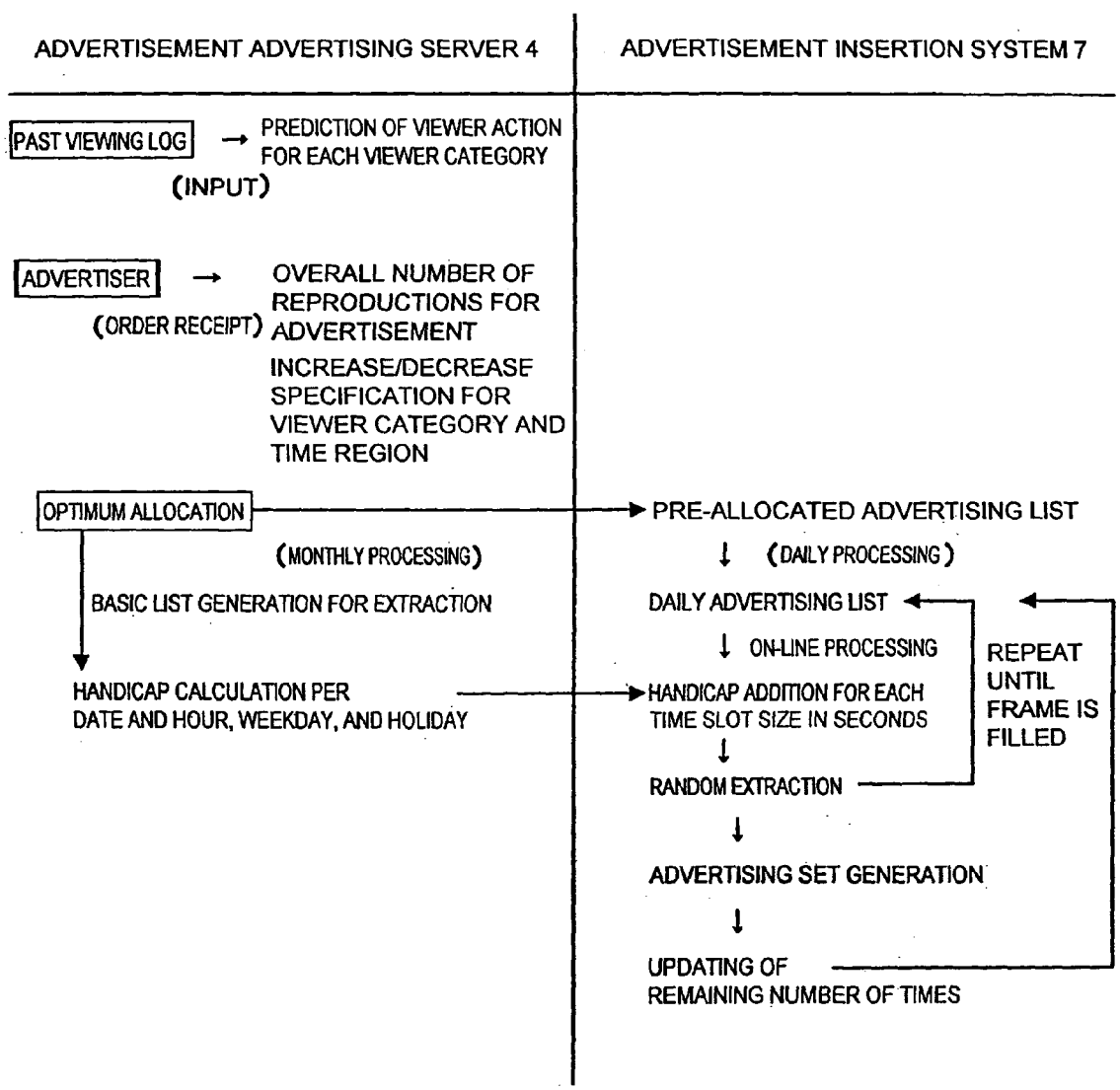
FIG. 2 is a drawing showing the overall flow of processing of the present invention.

The general flow of processing of the present invention up until the determination of an advertisement to be distributed is described. As shown in FIG. 2, the flow of the present invention is generally divided into the monthly processing process in advertising server 4, the daily to hourly processing process by advertisement insertion system 7, and the on-line process that comprises random extraction.

Processing begins by predicting viewer actions for each viewer category based on a past viewer log and receiving an order from an advertiser regarding the number of reproductions for the advertisement for each viewer category. Based on this information, a monthly plan is generated for the optimum allocation of an advertisement. By doing this, an advertising list that is optimally allocated for each category (hereinafter called a "pre-allocated advertising list") is generated. Furthermore, the planned period is not limited to a monthly period.

Together with the generation of a pre-allocated advertising list, a viewer viewing prediction is made based on time classes such as dates and times, weekdays, and holidays. This is used as information for calculating the handicap coefficient, described later.

Processing in the advertisement insertion system 7 begins with processing 8, which is the uploading of a pre-allocated advertising list, as a result of the monthly processing by the advertising server 4. Following this, daily or time-band processing and on-line processing are performed. In the daily processing, after deleting advertisements that have already been distributed from the pre-allocated advertising list, an advertising list for the current day is generated. An advertising list for each time band is generated in the same manner as by hourly processing.

When there is a request from the viewer terminal 2 for a distribution, a pre-allocated advertising list for the time period and corresponding to the terminal category is used to perform random extraction. A distribution list is then generated which lists the advertisements selected by the random extraction in the extraction sequence. The random extraction is repeated until the requested advertisement slots are filled.

(Minimum Unit Category)

In the present invention, the advertisement slots are not set in units of programs, but rather in numbers of viewings by a target viewer group. Specifically, viewers are classified into categories, based on criteria such as age, gender, family makeup, region of residence, hobbies, tastes, past actions and behavior. The advertiser, in placing an order, specifies the level of emphasis in the frequency of distributions to each of the desired categories. Furthermore, the present invention encompasses an embodiment where a unique category for each advertisement can be set up.

FIG. 3 shows a general view of the emphasis in this free-category setting type of advertisement allocation method. The example shown in FIG. 3 is one in which each of the individual advertisers performs category division based on the criterion of viewer age. Both advertisers A and B set age categories, although the age steps are unique to each advertiser.

In the present invention, a minimum unit category is determined which enables the category boundaries of both advertisers to be reflected, and the values of emphasis setting are assigned with respect to these minimum unit categories. Although this case describes division into age categories, it will be understood that obtainable viewer information items, such as gender and family makeup, can also be used as criteria for division into categories.

Using the free setting method of categories, it is possible with the same system to accommodate various types of category settings, even without buying up advertisement slots in units of information media. Therefore, it is possible to distribute advertising to meet the desires of the advertisers.

(Determining the Actual Number of Allocations)

Figure 5:
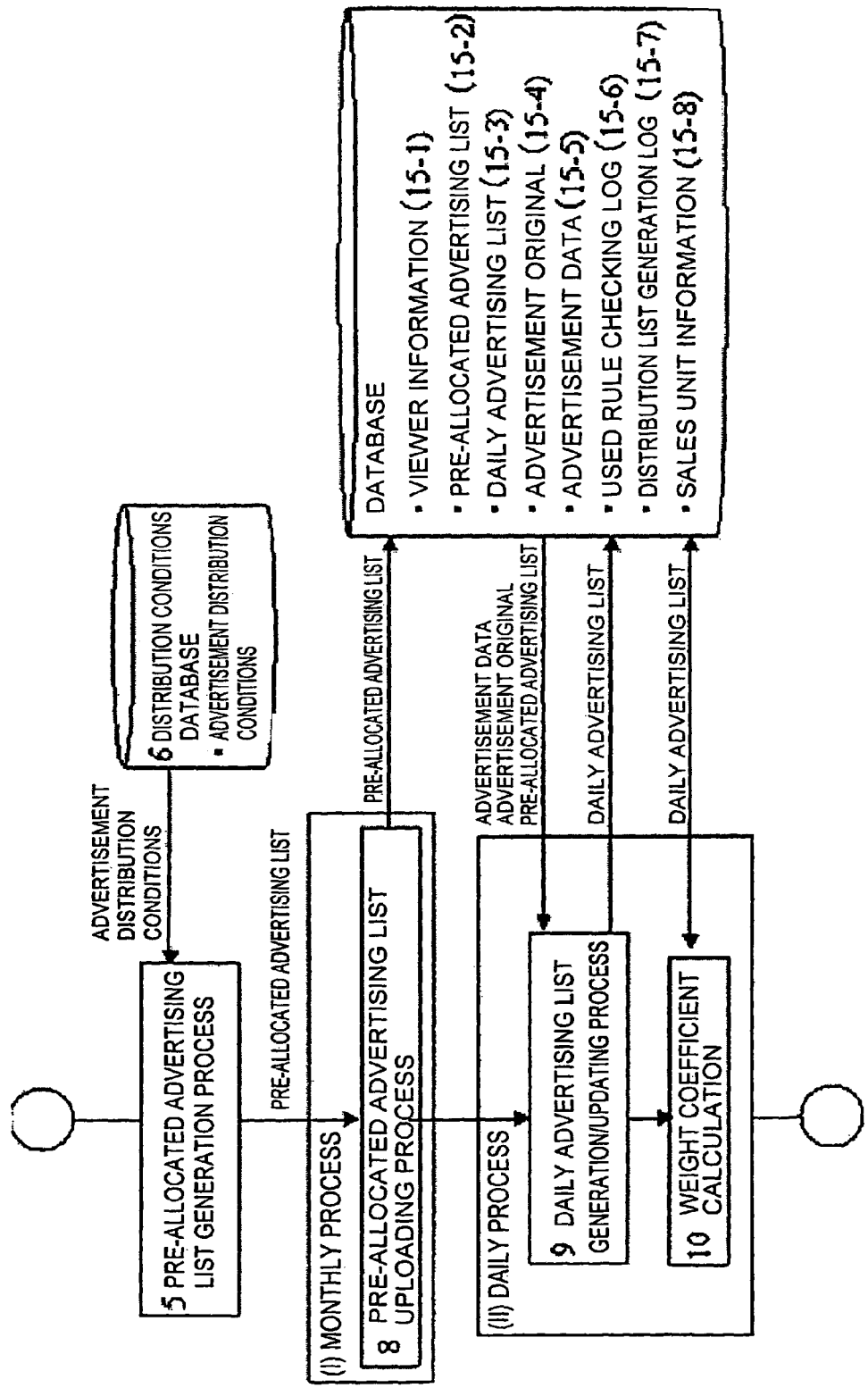
FIG. 5 is a drawing showing the present invention's flow from receipt of an advertisement order to daily processing

With respect to each category, it is then necessary to determine the extent to which viewing should be caused during a predetermined planned time period (for example, in units of months). Specifically, the number of times opportunities to view each advertisement are to be allocated to each category are determined. FIGS. 4 and 5 show an example of the configuration of the apparatus and the processing flow for the method of determining the viewing opportunities allocated to each category (hereinafter called the "actual number of allocations").

First, the predicted number of viewing slots during the planned time period is statistically calculated from data with regard to the viewing history (log) such as the distribution list generation log 15-7, the number of viewings predicted for all the advertisements in units of categories are summed up, and the predicted number of slots for each category is determined (top drawing, FIG. 4). This is the number of demanded distributions for each category during the planned time period.

Then, based on the above, the number of reproductions for the advertisement for each base category of the individual advertisements (before adjustment) is determined. Specifically, by multiplying by the ratio of the number of predicted number of slots for each category relative to the overall number of predicted slots, the initially allocated number of desired advertisements for each category and each advertisement is obtained (second graph from the top, FIG. 4).

Additionally, with respect to the above, emphasis processing is performed as specified by the advertiser. Specifically, the number of reproductions for the advertisement in the categories emphasized as described above is adjusted by increasing or decreasing, so as to take into consideration the desires of the advertiser (third graph in FIG. 4). The product of the increase/decrease specification accessed from the advertisement conditions database 6 and the above-noted initially allocated desired number of reproductions for the advertisement is taken to be the desired number of reproductions for the advertisement for each category after adjustment by increasing or decreasing.

The desired number of reproductions for the advertisement after adjustment by increasing or decreasing completely reflects the desires of the advertiser.

The increase or decrease specifications herein are slightly restricted. For example, when all categories are adjusted for emphasis, adjustment might not be possible within the desired number of reproductions for the advertisement. Thus, there is an intrinsic limitation with regard to the number of categories, and the degree of increase or decrease, that can be specified.

The overall total desired number of reproductions for the advertisement after increase or decrease adjustment is not balanced at this stage with respect to the number of demanded distributions.

Given the above, for example, a target function Z is taken as total of the absolute value, which is the difference between the desired number of reproductions for the advertisement after increase or decrease adjustment and the number of actual reproductions for the advertisement. Z is then divided by the desired number of reproductions for the advertisement after the increase or decrease adjustment. An number of actual reproductions for the advertisement for each advertisement type during the planned time period is determined for each category so as to minimize this target function Z. This is the pre-allocated monthly advertising list that serves as the population of the basic random extraction for each category. An example of this list is shown in FIG. 34.

The above-described processing is performed in the pre-allocated advertising list generation processor 5 shown in FIG. 1 (5 in FIG. 5). The number of reproductions for the advertisement accessed from the distribution conditions database 6 is allocated in order to approach the desired number of reproductions for the advertisement after increase or decrease adjustment for each of the categories, so that the number of distribution demands for each category is not exceeded, while considering the increase or decrease specification.

Category weights are used as coefficients for obtaining the number of reproductions for the advertisement corresponding to the result of this allocation from the number of distribution demands for each category.

The category weights are calculated by the following process.

Category Weight Calculation
CM_SIZE: Number of advertisements
CATEGORIES: Number of categories
a(i, j): Increase/decrease specification
i=1, 2, 3, . . . , CM_SIZE j=1, 2, 3, . . . , CATEGORIES
1. Initially allocated number of reproductions for the advertisement (n0(i,j)) calculation $$n0(i, j) = N(i) \times \log\_ctgy(k) / \sum_k \log\_ctgy(k)$$

$$k = 1, 2, \ldots, \text{CATEGORIES}$$

log_ctgy (k): Number of distribution demands for each category
N(i): Desired number of reproductions for the advertisement 2. Determining the desired number of allocations (n1(i,j))
With i=0, 1, 2, 3, . . . , CM_SIZE, and j=1, 2, 3, . . . , CATEGORY,
i) If advertisement i targets category j, $n1(i,j)=n0(i,j)+u(i,j)$, and ii) For other targets (that is, on day j of the advertisement i targets category j), $$n1(i, d) = n0(i, j) - n0(i, j) * \sum_{k \in T1} u(i, k) / \sum_{k \in T2} n0(i, k)$$

T1: category set of advertisement i
T2: category set without the target specification of advertisement i
where, $$u(i, d) = \frac{a(i, j) * n0(i, j) * \sum_m n0(m, j)}{\sum_m n0(m, j) - n0(i, j) - a(i, j) * n0(i, j)}$$

$m = 1, 2, \ldots, \text{CM\_SIZE}.$

3. Search for the ideal number of allocations (n2(i, j))
An n2(i,j) combination is determined by using mathematical programming so that the target function X value shown below is minimum.

Target Function:

$$Z = \sum_{i,j} \left\{ K(i, j) \times \left| \frac{n1(i, j) - n2(i, j)}{n1(i, j)} \right| \right\} \to \min$$

$i = 1, 2, \ldots, \text{CM\_SIZE} \quad j = 1, 2, 3, \ldots, \text{CATEGORIES}$ $$K(i, j) = \begin{cases} 1 & (\text{if } a(i, j) = 0) \text{ // No target specification} \\ k & (\text{otherwise}) \text{ // Target specification} \end{cases}$$

with arbitrary integer k

Restriction Conditions:

$$\sum_j n2(i, j) = \sum_j n0(i, j)$$

$$\sum_i n2(i, j) = \sum_i n0(i, j)$$

i=1, 2, 3, . . . , CM_SIZE.//Total number of reproductions for the advertisement for advertisement i
j=1, 2, 3, . . . , CATEGORY//Category j slot 4. Calculation of weight function (E)

$E(i,j)=n'(i,j)/N(i)$

Figure 27:
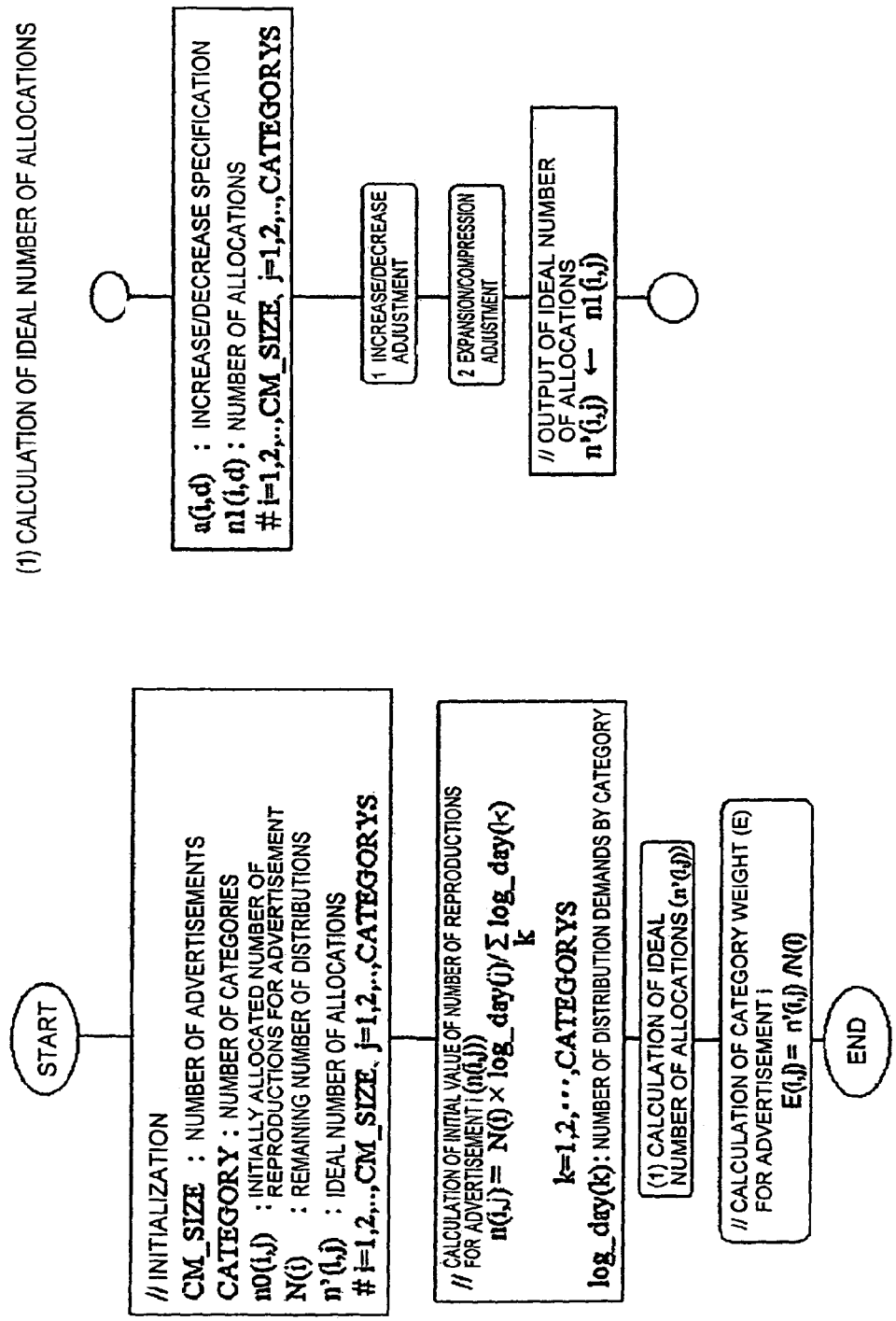
FIG. 27 is a drawing showing the flow of calculating the target category weight when using the advertisement allocation method (method I) of the present invention.
Figure 28:
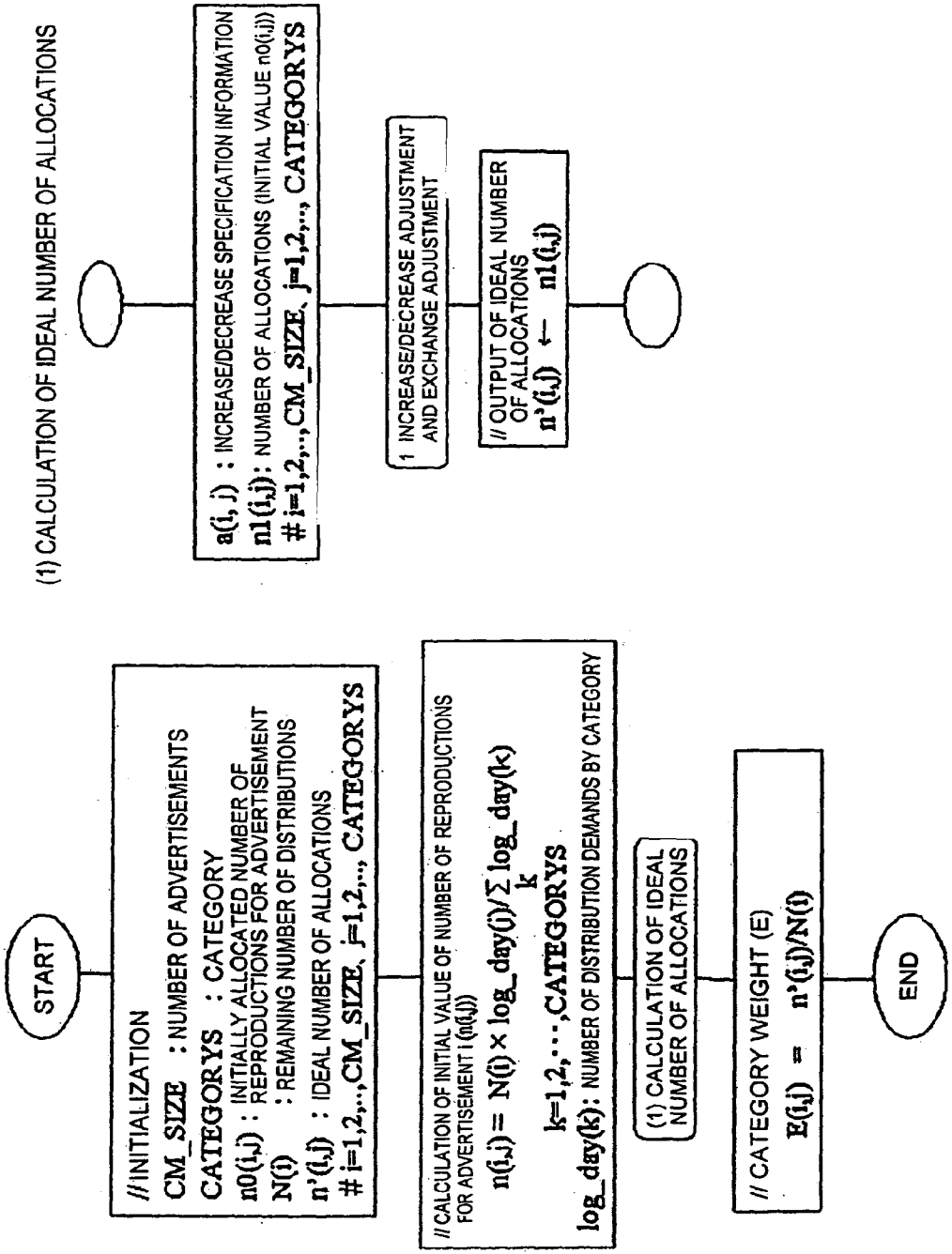
FIG. 28 is a drawing showing the flow of calculating the target category weight when using the advertisement allocation method (method II) of the present invention.
Figure 29:
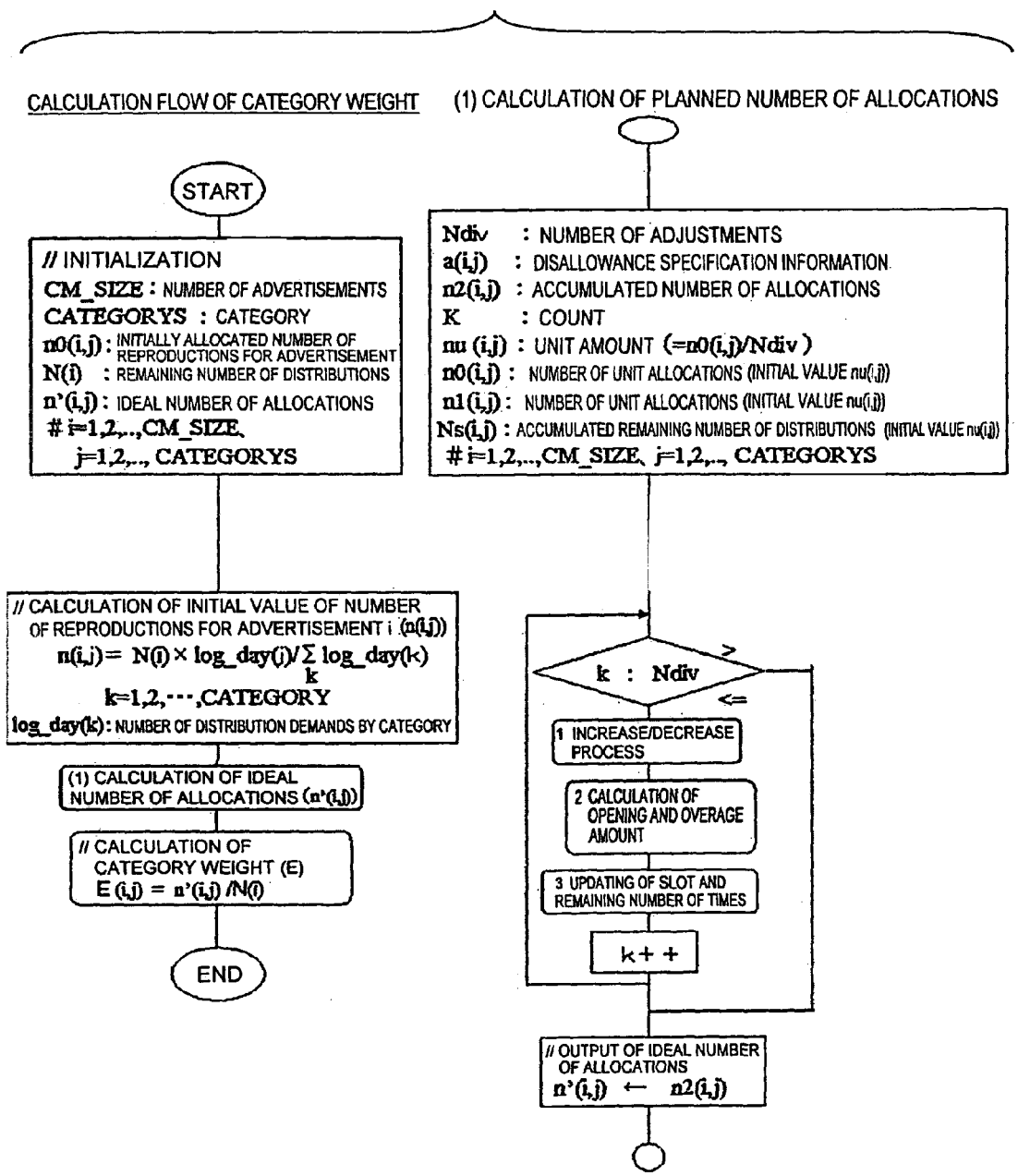
FIG. 29 is a drawing showing the flow of calculating the target category weight when using the advertisement allocation method (method III) of the present invention.

Although in the above-described example, mathematical programming is used to determine the category weight, various other calculation flows can be used. The specific flows and equations are shown in FIGS. 27 to 29. These calculation flows will be described in detail as part of the calculation method for the handicap coefficients to be presented later, from which it is easy to infer the significance of the flows and equations in FIGS. 27 to 29.

An "1) Increasing/decreasing adjustment" and "2) Expansion/compression adjustment"; noted in "(1) Calculation of the ideal number of allocations (n'(i,j)" in the category weight calculation flow of FIG. 27, are carried out by the following process.

1. Increasing/decreasing adjustment
<1> For i=1, 2, 3, ..., CM_SIZE and j=1, 2, 3, ..., CATEGORIES, the number of allocations n1(i,d) is determined in accordance with the following conditions i) and ii).
i) when advertisement i specifies category j as a target:

$n1(i,j)=n0(i,j)+u(i,j)$ ii) when advertisement i does not specify category j as a target:

$$n1(i,j) = n0(i,j) - n0(i,j) * \sum_{k \in T1} u(i,k) \Big/ \sum_{k \in T2} n0(i,k)$$

T1: category set of advertisement i target specification
T2: category set without the target specification
where, $$u(i,j) = \frac{a(i,j) * n0(i,j) * \sum_m n0(m,j)}{\sum_m n0(m,j) - n0(i,j) - a(i,j) * n0(i,j)}$$

$m = 1, 2, \ldots, CM\_SIZE.$

2. Expansion/compression adjustment
<1> For j=1, 2, 3, ..., CATEGORIES, the expansion/compression ratio (es) for arranging advertisement slots while maintaining the ratio for each advertisement is determined.

$$es(j) = \sum_i n(i,j) \Big/ \sum_i n1(i,j) \text{ for } i = 1, 2, 3, \ldots, CM\_SIZE$$

<2> At each of i=1, 2, 3, ..., CM_SIZE, for j=1, 2, 3, ..., CATEGORIES, the expansion/compression ratio for each day is used to determine the ideal number of allocations.

$n(i,j)=n1(i,j)*es(j)$ (Daily Processing)

Considering the system load when executing processes and processing efficiency, the present invention also encompasses an embodiment in which an additional advertising list is generated daily for that day.

Figure 6:
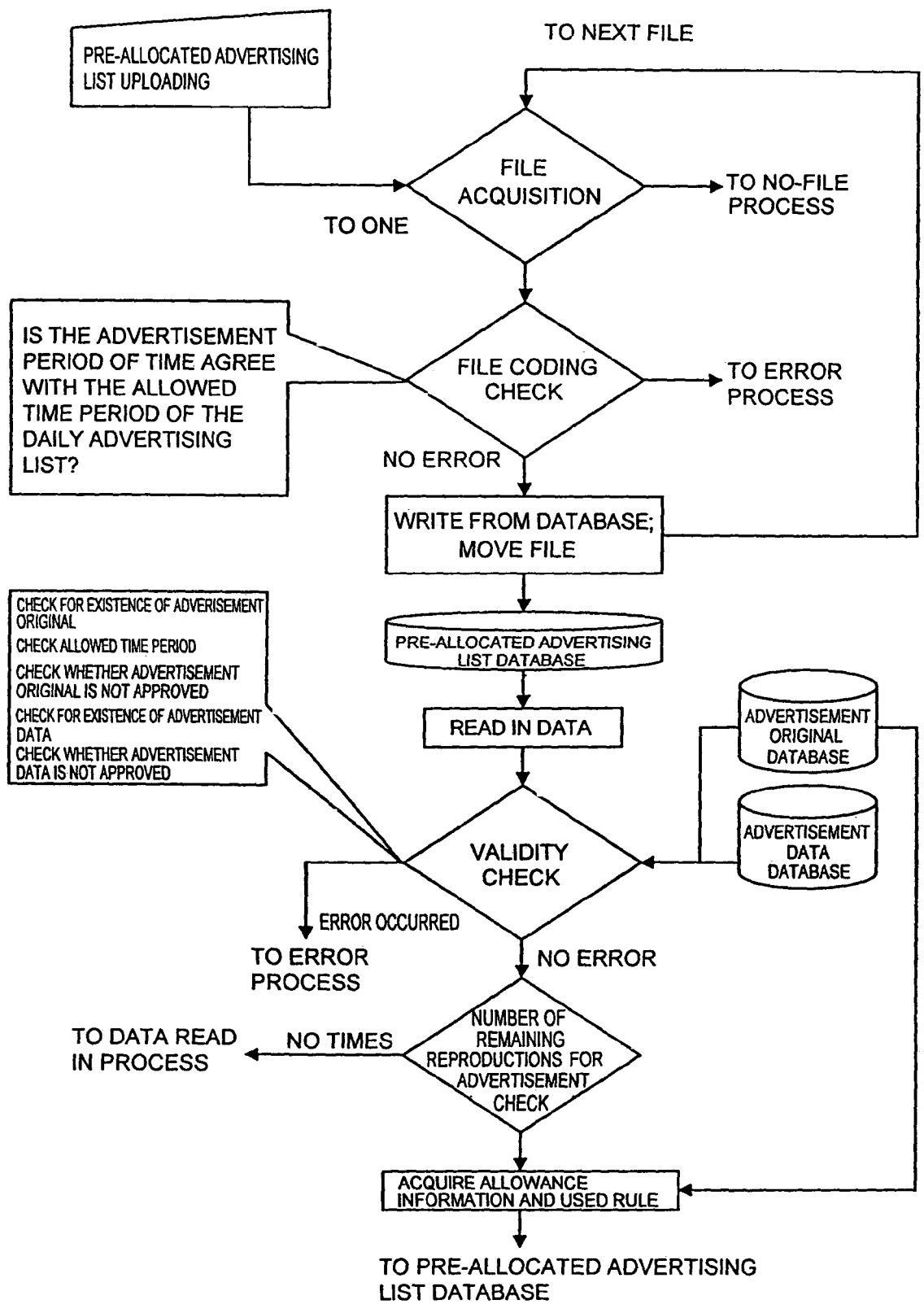
FIG. 6 is a drawing showing the present invention's flow from the uploading of a pre-allocated advertising list to the generation of an already-checked advertising list

Specifically, as shown in FIGS. 5 and 6, the pre-allocated monthly advertising list is uploaded (8), processing such as checking the advertisement's original and allowed time period is checked, and then the number of remaining advertisements is checked. Further, the uploading process 9 is carried out, such as checking the number of remaining times in order to remove advertisements that have already been advertised, thereby narrowing the already-allocated advertising list. The results obtained from this processing are stored in the pre-allocated advertising list database 15-2.

(Handicap Coefficient Calculation)

Based on the pre-allocated advertising list generated in this manner, allocation processing to each day and to each time band is performed in the planned time period. In this allocation task, it is actually possible to obtain results that appear to be the same as when the monthly advertising list is allocated to the advertising list for each day or each time band within the planned time period, by the calculation process 9 of multiplying a coefficient by the number of remaining advertisements for each advertisement in the pre-allocated monthly advertising list.

Therefore, because in reality there are fluctuation factors such as disallowed days, target dates, disallowed time bands, and target time bands, as shown in FIG. 7, coefficients for each of the factors are calculated and then the products of these coefficients and the number of remaining advertisements at each point in time are used to obtain a pre-checked advertising list serving as the number of reproductions for the advertisement for an advertisement at the point in time.

The basic idea of the method for calculating the coefficients that serve as handicaps for the above-noted fluctuation factors is described below:

First, handicaps for each category at each point in time, for each day and each time band and the like, can be set into the advertisement distribution conditions within the sales unit for allocation.

Herein, the term "sales unit" refers to one division unit which has been divided arbitrarily based on program information, and "category" refers to one division unit which has been further divided by viewer information or the like in the sales unit. Simply put, one pre-allocated monthly advertising list is generated from one sales unit.

The term "handicap" is a setting that is provided for increasing or decreasing the viewing frequency of target specified advertisement content under the restriction conditions imposed by the desired number of reproductions for the advertisement for each advertisement. This term means the amount of increase or decrease in the number of distributions when exchange is made to the number of distributions, which corresponds to "deviation" in the extraction probability distribution. That is, by adjusting the handicap setting, it is possible to arbitrarily increase or decrease the distribution probability of an advertisement in a certain day or time band or the like, during the planned time period.

The specific methods for calculating the handicap at each point in time are described in detail below.

In overall flow, calculations are performed in the sequence of disallowed day coefficient calculation, target date coefficient calculation, disallowed time band coefficient calculation, and target time band coefficient calculation, as indicated above (FIG. 7). The product of all the coefficients can be used to calculate the overall handicap coefficient. The results are stored in the pre-checked advertising list database, and are used as basic data when performing random extractions.

Before describing the specific methods for calculating each of the individual coefficients, the method for allocating the monthly advertising list to each time period and the handicap in this method will be described below, using FIG. 8.

Since it is possible to grasp the number of remaining advertisements of each type of advertisement at a given time, and approximately predict the number of reproductions for the advertisement expected on that day from the past viewing history and the like (overall number of reproductions for the advertisement varies between days), the predicted number of reproductions for the advertisement can be taken as the ideal number of allocations on that day.

As described earlier, the advertising list used as a base is determined from the ratios relative to the overall number. Thus, when it is not desired to perform some special processing for all advertisements on that day, because it is sufficient simply to compress by the ratio between the remaining number of distributions and the ideal number of allocations, the handicap coefficient is that ratio.

Figure 8:
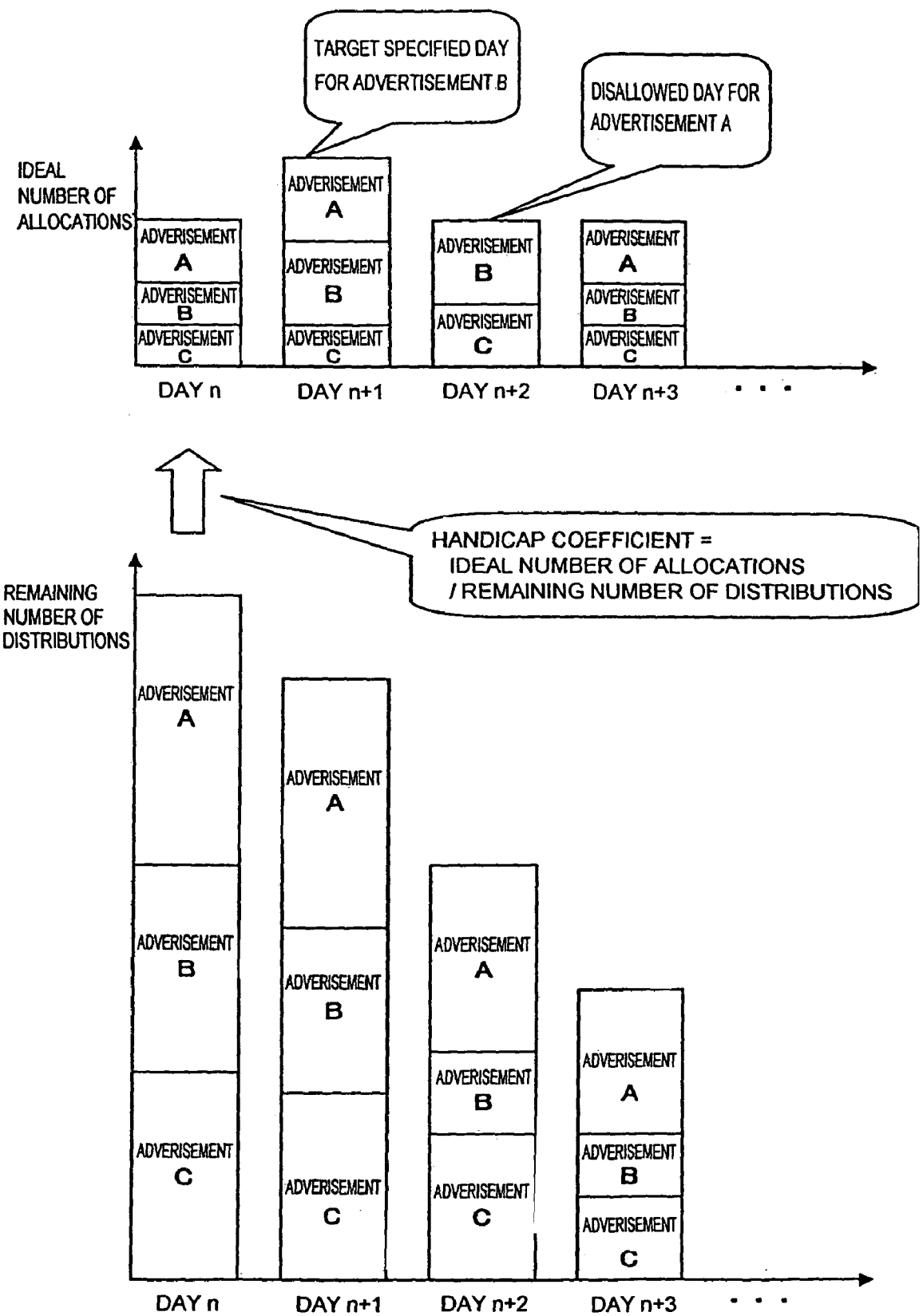
FIG. 8 is a drawing describing the present invention's day unit allocation and the definition of handicap coefficients.

Next, in a case in which an advertisement A is prohibited from being placed on the day n+2, as shown in FIG. 8 (hereinafter, referred to as a disallowed day), the number of reproductions for the advertisement for advertisement A is zero, and this portion should be filled in with advertisements B and C. Additionally, in order to comply with the number of reproductions for the advertisement desired by the advertiser for the advertisement A during the period of time, the advertisement of advertisement A that could not be done on day n+2 must be shifted to other days, so as to increase the number of reproductions for the advertisement of advertisement A on these days. On the other hand, because there is an excessive distribution of advertisements B and C on day n+2, the advertisement thereof must be reduced accordingly on other days.

In addition to a disallowance specification, there is the case in which the advertiser desires to place emphasis on distribution on a specific day. In FIG. 8, when there is a desire to emphasize distribution of advertisement B on day n+1 (hereinafter called a "target day"), the allocations are not in proportion to the number of remaining distributions for each advertisement, as in the case of disallowance specification.

Methods for calculating the ideal number of allocations, that is, the various handicap coefficients, are described in further detail below. Several methods for calculating handicap coefficients can be used.

(Method I)

Figure 9:
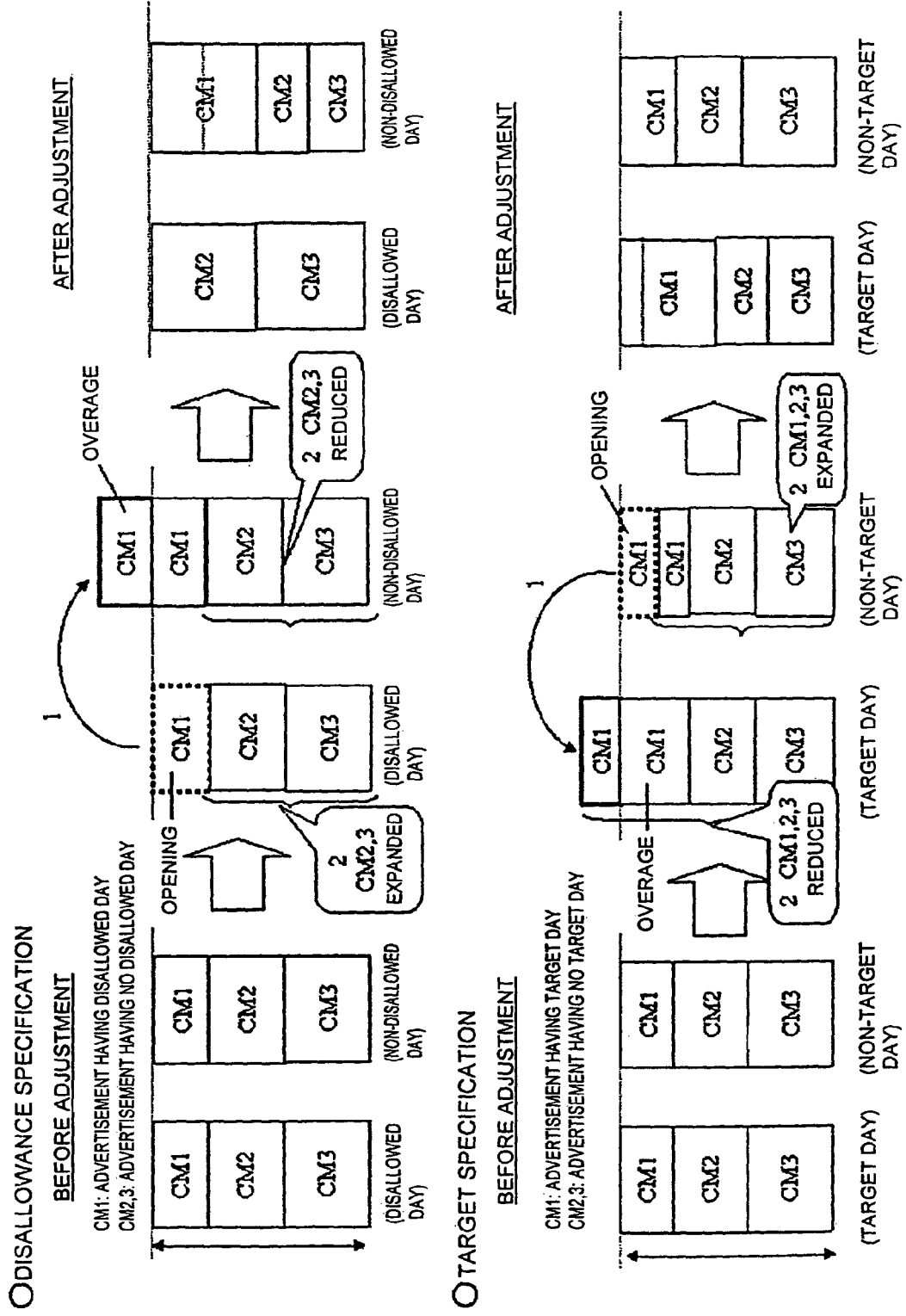
FIG. 9 is a drawing describing the advertisement allocation method (method I) of the present invention.

The simplest method will be described first. As shown in FIG. 9, when a disallowed day is set, treatment between the disallowed day and other days differs. If an advertisement with a disallowed day setting is removed so as not to be distributed on a disallowed day, an opening occurs in the advertisement slot on the disallowed day. On the other hand, because the removed portion is uniformly allocated to days other than the disallowed day, the predicted number of advertisement slots on those days is surpassed (this process corresponds to operation "1" in FIG. 9).

Given the above, while maintaining the ratios for each advertisement type, increasing or decreasing adjustments (referred to as expansion/compression adjustment in the Figures) of the amount of advertisements are carried out so that the size of the advertisement slot is adjusted to that predicted (this process corresponding to operation "2" in FIG. 9). By doing this, even if there is a disallowed day, it is possible to approximately maintain the advertisement probability throughout the planned time period.

Even if there is a target day specification, the distribution of the advertisement of interest is collected from days other than the target day, and added to the number of reproductions for the advertisement on that day, so that the distribution of the advertisement is concentrated on the target day (this process corresponds to operation "3" in FIG. 9). On a day other than the target day, an opening occurs. In order to eliminate overages and openings occurring with respect to the advertisement slots, expansion/compression adjustments are performed while maintaining the ratio of the number of advertisements (this process corresponds to operation "4" in FIG. 9), similar to the case of the disallowed day processing.

In the same manner, the calculation method when a disallowed time band or target time band is specified can also be carried out by processing similar to that for the daily calculations. The specific-handicap coefficients are calculated by the processes shown in FIGS. 10-13.

Figure 10:
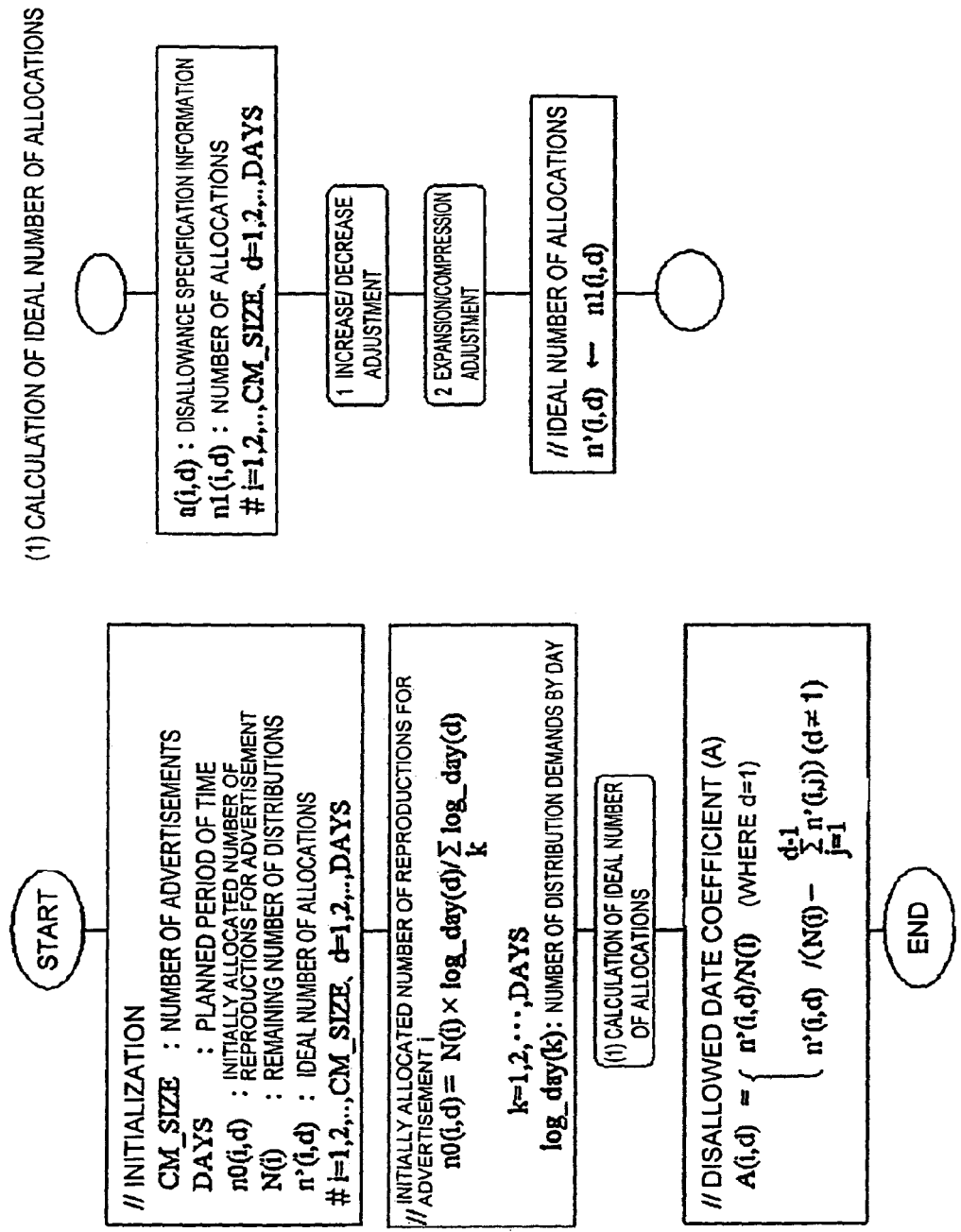
FIG. 10 is a drawing showing the flow of calculating the disallowed date coefficient when using method I allocation of the present invention.

The "1 Increasing/decreasing adjustment" and "2 Expansion/compression adjustment" of the "(1) Calculation of the ideal number of allocations" in the disallowed day coefficient calculation flow of FIG. 10 are respectively performed by the following processes:

1. Increasing/decreasing adjustment
   <1> For i=1, 2, 3, . . . , CM_SIZE and d=1, 2, 3, . . . DAYS, the number of allocations n1(i,d) is determined according to the following conditions i), ii), and iii):
   i) When advertisement i specifies a disallowance for day d:

$n1(i,d)=0$ ii) In the case other than i) and in which advertisement i has a disallowed day on another day:

$$n1(i, d) = n0(i, d) + n0(i, d) * \sum_{j \in T1} 0(i, j) \Big/ \sum_{j \in T2} n0(i, j)$$

T1: Disallowed day set of advertisement i
   T2: Date set other than disallowed days of advertisement i
   iii) For all cases other than i) and ii):

$n1(i,d)=n0(i,d)$

2. Expansion/compression adjustment
   <1> For d=1, 2, 3, . . . , DAYS, a expansion/compression ratio (es(d)) is determined that arranges the advertisement slots for each advertisement while maintaining the ratios for each advertisement.

$$es(d) = \left(\sum_i n(i, d) - \sum_{k \in C1} n1(k, d)\right) \Big/ \left(\sum_i n1(i, d) - \sum_{k \in C1} n1(k, d)\right)$$

$i = 1, 2, 3, \ldots, \text{CM\_SIZE}$

C1: Set of advertisement types for which a disallowance occurs on day d
   <2> For days d=1, 2, 3, . . . , CM_SIZE and d=1, 2, 3, . . . , DAYS, the ideal number of allocations is determined using the expansion/compression ratio for each day, in accordance with the following conditions i) and ii).
   i) When day d of advertisement i is a disallowed day:

$n1(i,d)=n1(i,d)$ ii) When day d of advertisement i is not a disallowed day:

$n1(i,d)=n1(i,d)*es(d)$

Figure 11:
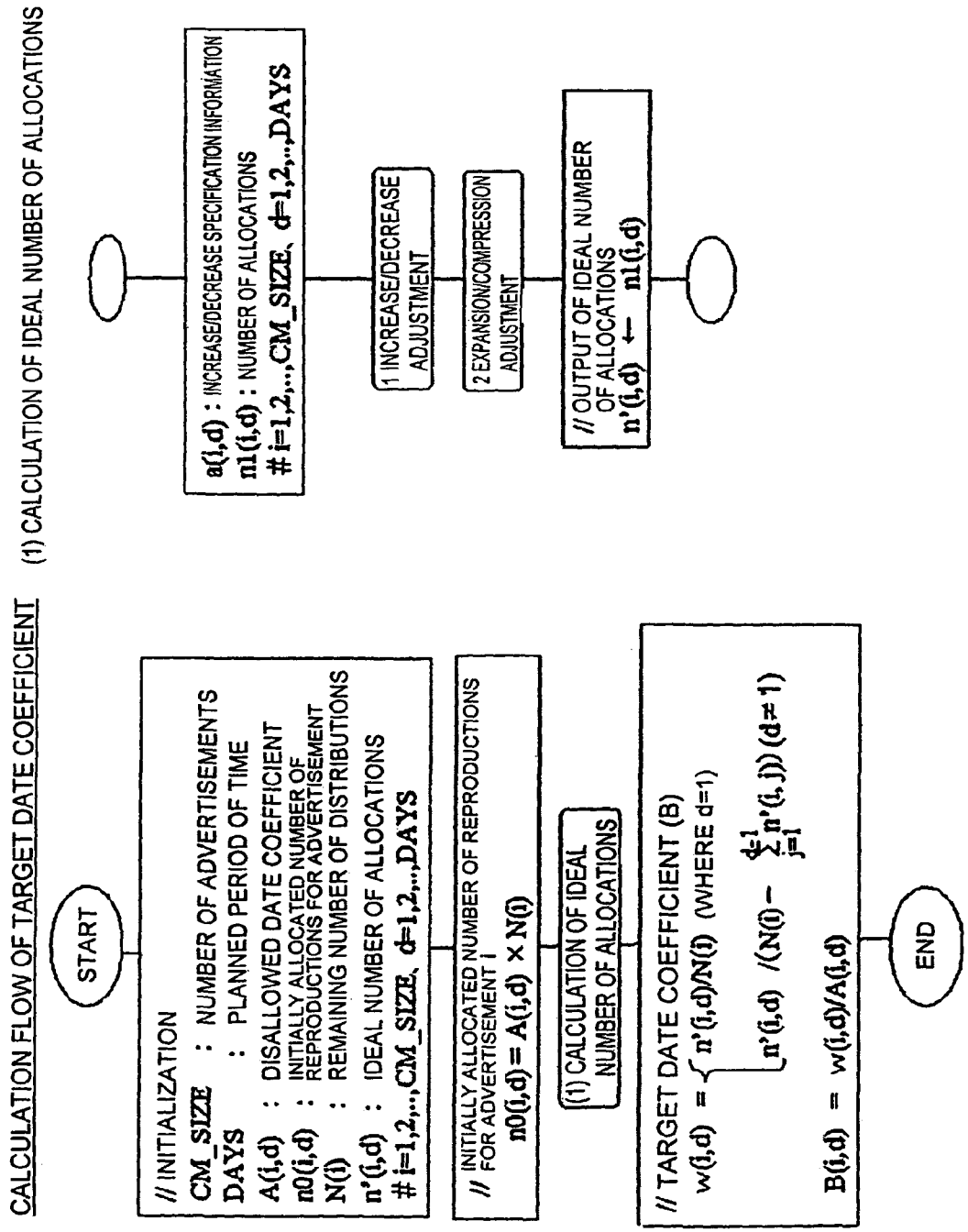
FIG. 11 is a drawing showing the flow of calculating target date coefficient when using method I allocation of the present invention.
Figure 12:
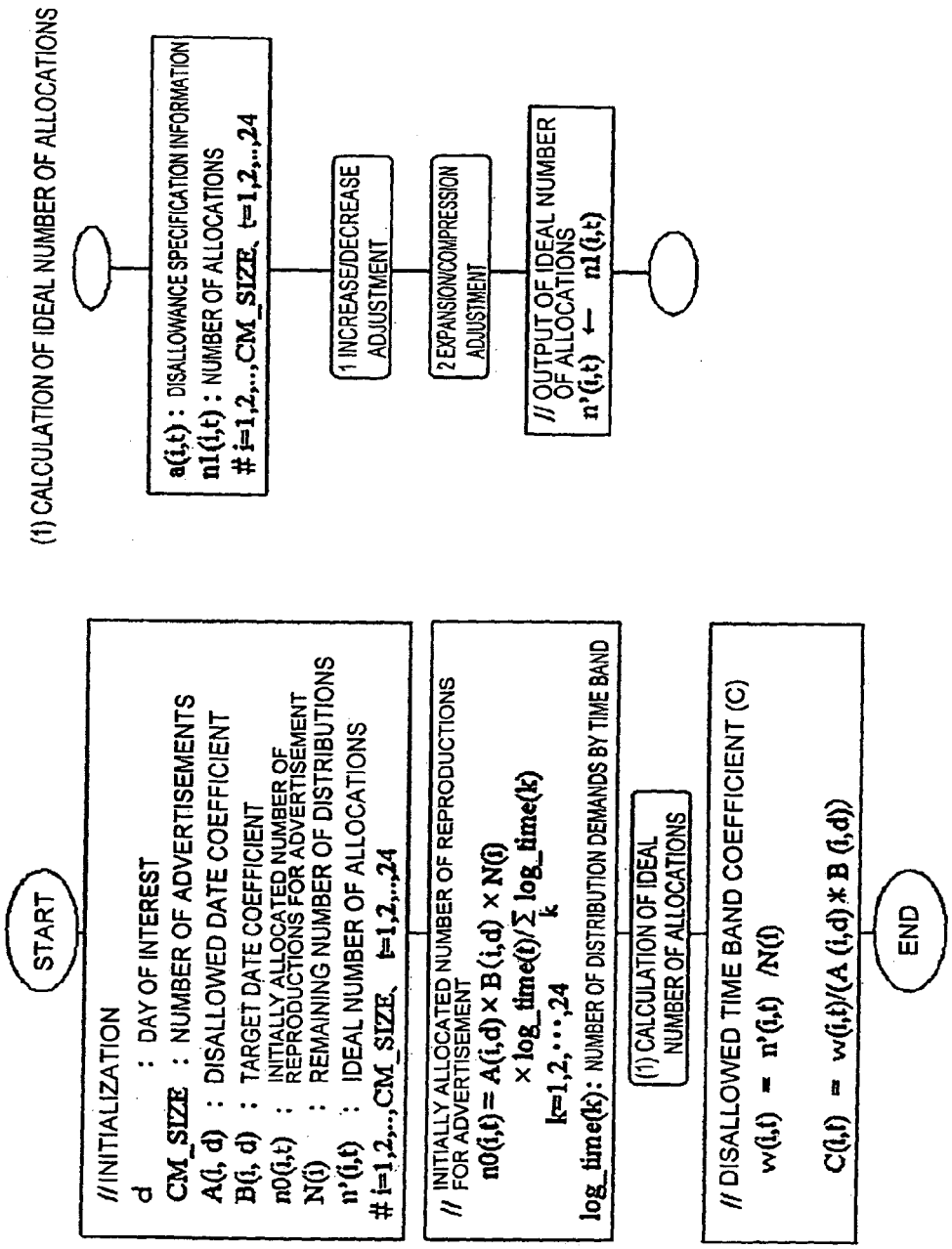
FIG. 12 is a drawing showing the flow of calculating the disallowed time band coefficient when using method I allocation of the present invention.

The "1 Increasing/decreasing adjustment" and "2 Expansion/compression adjustment" of "(1) Calculation of ideal number of allocations" in the target day coefficient calculation flow of FIG. 11 are respectively performed by the following processes:

1. Increasing/decreasing adjustment
<1> For i=1, 2, 3, ..., CM_SIZE and d=1, 2, 3, ..., DAYS, the number of allocations n1(i,d) is determined in accordance with the following conditions i), ii), and iii).
i) When advertisement i specifies a target for day d:

$$n1(i,d)=n0(i,d)+u(i,d)$$

ii) Other cases (in which advertisement i does not specify a target for day d):

$$n1(i, d) = n0(i, d) - n0(i, d) * \sum_{j \in T1} u(i, j) \bigg/ \sum_{j \in T2} n0(i, j)$$

T1: Date set of target specifications of advertisement i
T2: Date set of days without target specification where, $$u(i, d) = \frac{a(i, d) * n0(i, d) * \sum_{m} n0(m, d)}{\sum_{m} n0(m, d) - n0(i, d) - a(i, d) * n0(i, d)}$$

$$m = 1, 2, \ldots, CM\_SIZE$$

2. Expansion/compression adjustment
<1> For d=1, 2, 3, ..., DAYS, an expansion/compression ratio is determined that arranges the advertisement slots for each advertisement while maintaining the ratios for each advertisement.

$$es(d) = \left( \sum_{i} n(i, d) \bigg/ \sum_{i} n1(k, d) \right),$$

where i=1, 2, 3, ..., CM_SIZE
<2> For i=1, 2, 3, ..., CM_SIZE and d=1, 2, 3, ..., DAYS, the ideal number of allocations is determined using the expansion/compression ratio for each day.

$$n1(i,d)=n1(i,d)*es(d)$$

The "1 Increasing/decreasing adjustment and exchange adjustment of (1) Calculation of ideal number of allocations" in the category weight calculation flow shown in FIG. 28 is carried out by the following processes:
1. Increasing/decreasing adjustment and exchange adjustment (increasing/decreasing adjustment method B)
<1> For each of i=1, 2, 3, ..., CM_SIZE, when j=1, 2, 3, ..., CATEGORIES, the increasing/decreasing adjustment and exchange adjustment are performed under the following conditions i) to determine the number of allocations n1(i,j).
i) When category j is a target specification of advertisement i:

$$n1(i,j)=n1(i,j)+u(i,j)$$

where, $$u(i, j) = \frac{a(i, j) * n0(i, j) * \sum_{m} n0(m, j)}{\sum_{m} n0(m, j) - n0(i, j) - a(i, j) * n0(i, j)}$$

$$m = 1, 2, \ldots, CM\_SIZE$$

<1>-1 (Exchange adjustment)
For n=1, 2, 3, ... CATEGORIES, the specified degree of increase/decrease is reduced for advertisement i by the amount of advertising in other categories, in accordance with the conditions i-1) shown below:
i-1) When advertisement i has no target specification for category n:

$$n1(i, n) = n1(i, n) - u(i, j) * \sum_{k \in T1} n0(i, k) \bigg/ \sum_{k \in T2} n0(i, k)$$

<1>-1 For m=1, 2, ..., CM_SIZE, the exchange amount is determined in accordance with the following conditions.

$$ds(m, n) = \left( u(i, j) * \sum_{j \in T1} n0(i, k) \bigg/ \sum_{j \in T2} n0(i, k) \right) * n1(m, j) \bigg/ \sum_{k} n1(k, j)$$

$$k = 1, 2, \ldots, CM\_SIZE$$

i-1-1) (Exceptional processing)
When there is no advertising amount to be exchanged:

$$(n1(m,n)-ds(m,n)<0)$$

$$ds(m,n)=n1(m,n)*Ds, \text{ where } Ds=0.9 \text{ (arbitrary)}$$

<1>-1-2 (Exchange)
For m=1, 2, ..., CM_SIZE, the amount of advertising is increased/decreased according to the exchange amount.

$$n1(m,n)=n1(m,n)+ds(m,n)$$

$$n1(m,j)=n1(m,j)-ds(m,n)$$

T1: Category set of target specifications of advertisement i
T2: Category set other than target specifications of advertisement i The "1 Increasing/decreasing processing"; "2 Openings and overage amount calculation"; and "Slot and remaining number updating" of "(1) Calculation of ideal number of allocations (n'(i,j))" in the category weight calculation flow shown in FIG. 29 are performed by the following processing.
1. Increasing/decreasing processing
<1> For each of i=1, 2, 3, ..., CM_SIZE, when j=1, 2, 3, ..., CATEGORIES, the number of unit allocations is determined in accordance with the following conditions i) and ii).
i) When category j is a target specification of advertisement i:

$$n1(i,j)=n0(i,j)+u(i,j)$$

ii) Other cases:

$$n1(i, j) = n0(i, j) - n0(i, j) * \sum_{k \in T1} u(i, k) \bigg/ \sum_{k \in T2} n0(i, k)$$

T1: Category set of target specifications of advertisement i
T2: Date set of the category without target specifications of advertisement i where, $$u(i, j) = \frac{a(i, j) * n0(i, j) * \sum_{m} n0(m, j)}{\sum_{m} n0(m, j) - n0(i, j) - a(i, j) * n0(i, j)}$$

2. Openings and overage amount calculation

<1> For j=1, 2, 3, ..., CATEGORIES, the total number of distributions for each category that was increased/decreased as shown in 1 is calculated.

$$s0(j) = \sum_{i} n0(i, j),$$

$$s1(j) = \sum_{i} n1(i, j)$$

$$i = 0, 1, 2, 3, \ldots, CM\_SIZE$$

<2> For i=0, 1, 2, 3, ..., CM_SIZE and j=1, 2, 3, ..., CATEGORIES, each value is calculated in accordance with the following conditions i) and ii).

i) When a slot overage occurs (s1(j)−s0(j)>0):

$Ns(i)=Ns(i)-n1(i,j)*(s0(j)/s1(j))$ $n0(i,j)=0$ $n2(i,j)=n2(i,j)+n1(i,j)*(s0(j)/s1(j))$ ii) When there is a slot opening (s0(j)−s1(j)≦0):

$Ns(i)=Ns(j)-n1(i,j)$ $n0(i,j)=(s0(j)-s1(j))*n1(i,j)/s1(j)$ $n2(i,j)=n1(i,j)$

3. Slot and remaining number of times updating

<1> For each of i=0, 1, 2, 3, ..., CM_SIZE, when j=1, 2, 3, ..., CATEGORIES, the number of unit allocations is updated.

$n0(i, j) = Ns(i) * ctgy(j)Allctgy$ // Re-allocation $n0(i, j) = n0(i, j) + un(i, j)$ // Add unit amount where, $$allctgy = \sum_{j} \sum_{i} n0(i, j), \text{ and}$$

$$ctgy(j) = \sum_{i} n0(i, j)$$

$$i = 0, 1, 2, 3, \ldots, CM\_SIZE$$

$$j = 1, 2, 3, \ldots, CATEGORIES$$

Figure 13:
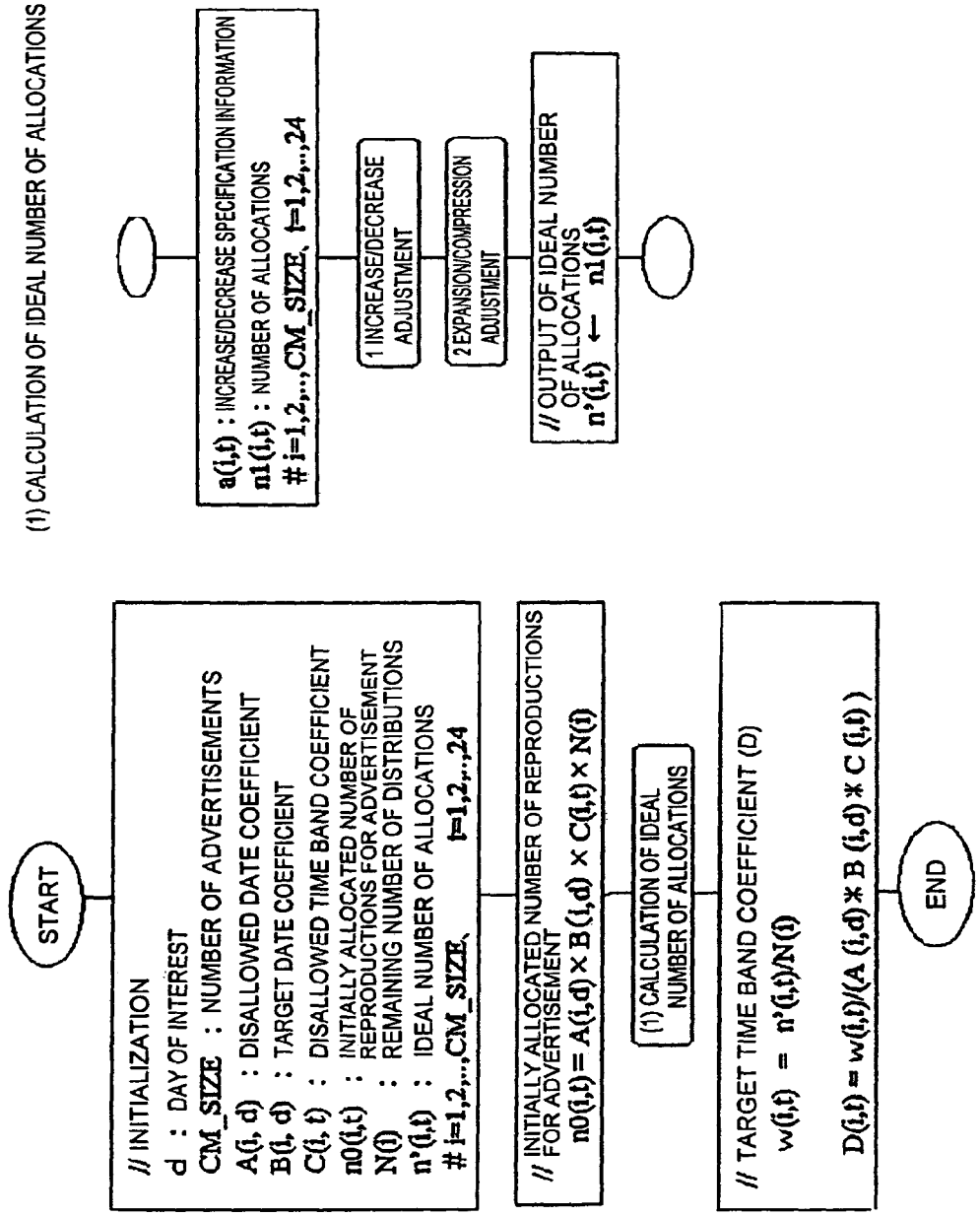
FIG. 13 is a drawing showing the flow of calculating target time band coefficient when using method I allocation of the present invention.

In this case, the "1 Increasing/decreasing adjustment" and "2 Expansion/compression processing" of "(1) Calculation of ideal number of allocations" in the disallowed time band coefficient calculation flow shown in FIG. 13 are respectively performed by the following processes:

1. Increasing/decreasing adjustment

<1> For i=1, 2, 3, ..., CM_SIZE and d=1, 2, 3, ..., DAYS, the number of allocations n1(i,d) is determined according to the following conditions i), ii), and iii):

i) When advertisement i has a disallowance specification for time band t:

$n1(i,t)=0$ ii) In cased other than i) where advertisement i has a disallowance specified for another time band:

$$n1(i, t) = n0(i, t) + n0(i, t) * \sum_{j \in T1} n0(i, j) \Big/ \sum_{j \in T2} n0(i, j)$$

T1: Disallowed time band set of advertisement i
T2: Time band set without the disallowed time band of advertisement i iii) all cases other than i) and ii):

$n1(i,t)=n1(i,t)+n0(i,t)$

2. Expansion/compression adjustment

<1> For t=1, 2, 3, ..., 24, the expansion/compression rate (es) that arranges each advertisement slot while maintaining the ratios for each advertisement is determined.

$$es(t) = \Big(\sum_{i} n(i, t) - \sum_{k \in C1} n1(k, t)\Big) \Big/ \Big(\sum_{i} n1(i, t) - \sum_{k \in C1} n1(k, t)\Big)$$

$$i = 1, 2, 3, \ldots, CM\_SIZE$$

C1: Set of advertisement types for which a disallowance occurs in the time band t <2> For i=1, 2, 3, ..., CM_SIZE and t=1, 2, 3, ..., 24, the ideal number of allocations is calculated using the expansion/compression ratio of each day in accordance with the conditions i) and ii) shown below:

i) When the time band t is disallowed for advertisement i:

$n1(i,t)=n1(i,t)$ ii) When the time band t is not disallowed for advertisement i:

$n1(i,t)=n1(i,t)*es(t)$

The "1 Increasing/decreasing adjustment" and "2 Expansion/compression adjustment" in "(1) Calculation of ideal number of allocations" in the target time band coefficient calculation flow shown in FIG. 13 are respectively performed by the following equations:

1. Increasing/decreasing adjustment

<1> For i=1, 2, 3, ..., CM_SIZE and t=1, 2, 3, ..., 24, the number of allocations n1(i,t) is determined in accordance with the following conditions i), ii), and iii).

i) When advertisement i has a target specification for the time band t:

$n1(i,t)=n0(i,t)+u(i,t)$ ii) Other cases (in which time band t is not a target of advertisement i):

$$n1(i, t) = n0(i, t) + n0(i, t) * \sum_{j \in T1} u(i, j) \Big/ \sum_{j \in T2} n0(i, j)$$

T1: Target time band set of advertisement i
T2: Time band set without the target time band of advertisement i where, $$u(i, t) = \frac{a(i, t) * n0(i, t) * \sum_m n0(m, t)}{\sum_m n0(m, t) - n0(i, t) - a(i, t) * n0(i, t)}$$

$$m = 1, 2, \ldots, CM\_SIZE$$

2. Slot adjustment processing

<1> For t=1, 2, 3, ..., 24, the advertisement slots are arranged while maintaining the ratios of each advertisement.

$$es(t) = \Sigma n(i,t)/\Sigma n1(i,t), \text{ where } i=1, 2, 3, \ldots, CM\_SIZE$$

<2> For i=1, 2, 3, ..., CM_SIZE and t=1, 2, 3, ..., 24, the ideal number of allocations is determined from the expansion/compression ratio for each day.

$$n1(i,t) = n1(i,t) * es(t)$$

In this calculation method, for example, when many advertisements have a disallowance specification, a difference occurs between the total number of reproductions for the advertisement for each advertisement. However, the processing is extremely simple, so that a feature of this method is that it needs only a small calculation burden and a simple system configuration.

(Method II)

Next, a different calculation method for adjusting openings and overages in advertisement slots will be described. This method is summarized in FIG. 12.

This calculation method is the same as method I in terms of performing uniform allocation of disallowances to days or time bands that are not disallowed. However, rather than performing expansion or compression to suit slots, this method adjusts the number of reproductions for the advertisement that correspond to the number added to days other than the disallowance specification days, by proportionally distributing advertisements without a disallowance specification for the days that are not disallowed with the ratio of the number of reproductions for the advertisement and uniformly extracting from them. This could be equivalent to exchange processing of advertisements with a disallowance specification and advertisements on other days without a disallowance specification (CM2 in FIG. 9).

In this method, when there is a large number of disallowances, days or time bands could occur in which exchange is not possible. Thus, in actual processing it is preferable to establish an exchange limit, such as exchange of 9/10 of the amount of advertisements.

In method II, however, even if the conditions are the same between dates and advertisements, depending upon the sequence of exchange processing, a slight difference occurs in the number of extractions. However, this method comprises very simple processing to eliminate the problem occurring with method I, where advertisements do not fit in advertisement slots.

The same type of processing, shown in the bottom part of FIG. 9, can also be carried out to allocate target specifications. For targeting (emphasizing), exchange processing is performed between the number of reproductions for the advertisement of advertisements with a target specification that has been uniformly procured from days without a target specification, and the equal number of reproductions for the advertisement proportionally allocated using the ratio of the number of each advertisement after emphasis adjustment on the target day. This point slightly differs from the processing for a disallowance specification.

The calculation flow for disallowance date coefficients is shown in FIGS. 15-18.

Figure 15:
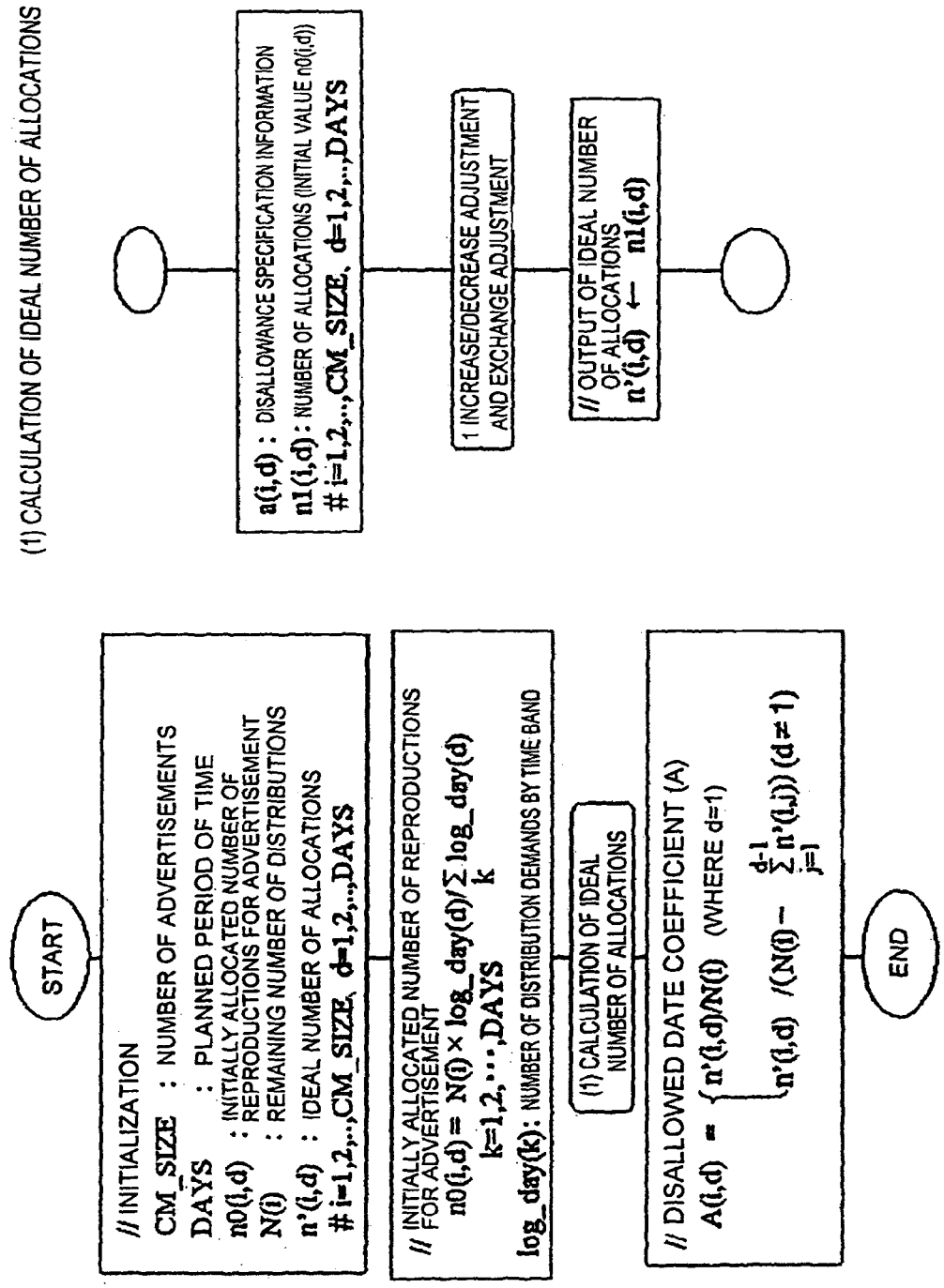
FIG. 15 is a drawing showing the flow of calculating the disallowed date coefficient when using method II allocation of the present invention.

The "1 Increasing/decreasing adjustment and exchange adjustments" of "(1) Calculation of ideal number of allocations" in the disallowance date coefficient calculation flow shown in FIG. 15 are performed by the following process:

1. Increasing/decreasing adjustment and exchange adjustment

<1> For each of i=1, 2, 3, ..., CM_SIZE, when d=1, 2, 3, ..., DAYs, in the case of the following condition i), increasing/decreasing and exchange adjustments are performed to establish the number of allocations n1(i,d)

i) When the day d is disallowed for advertisement i $$n1(i,d) = 0$$

<1>-1 (Exchange adjustment)

For n=1, 2, 3, ..., DAYS, the exchange amount is calculated and exchange adjustment is performed.

<1>-1-1 (Exchange amount calculation)

For m=1, 2, ..., CM_SIZE, the exchange amount (ds) is determined in accordance with the following conditions i-1) and i-2).

i-1) When n≠d and advertisement m is not disallowed on day d:

$$ds(m, n) = \left( n0(i, d) * \sum_{j \in T1} n0(i, j) / \sum_{j \in T2} n0(i, j) * n1(m, n) \right) / \sum_{k \in D1} n1(k, n)$$

i-1-1) (Exceptional processing)

For the case in which the advertising amount to be exchanged is insufficient:

(when n1(m,n)−ds(m,n)<0)

$$ds(m,n) = n1(m,n) * Ds, \text{ where } Ds = 0.9 \text{ (arbitrary)}$$

i-2) Other cases:

$$ds(m,n) = 0$$

<1>-1-2 (Exchange)

For m=1, 2, ..., CM_SIZE, the advertisement amount is increased or decreased in accordance with the exchange amount.

$$n1(m,n) = n1(m,n) - ds(m,n) // \text{Source of movement}$$

$$n1(m,n) = n1(m,d) + ds(m,n) // \text{Destination of movement}$$

$$n1(i,n) = n1(m,n) + ds(m,n) // \text{Disallowed advertisement}$$

Figure 16:
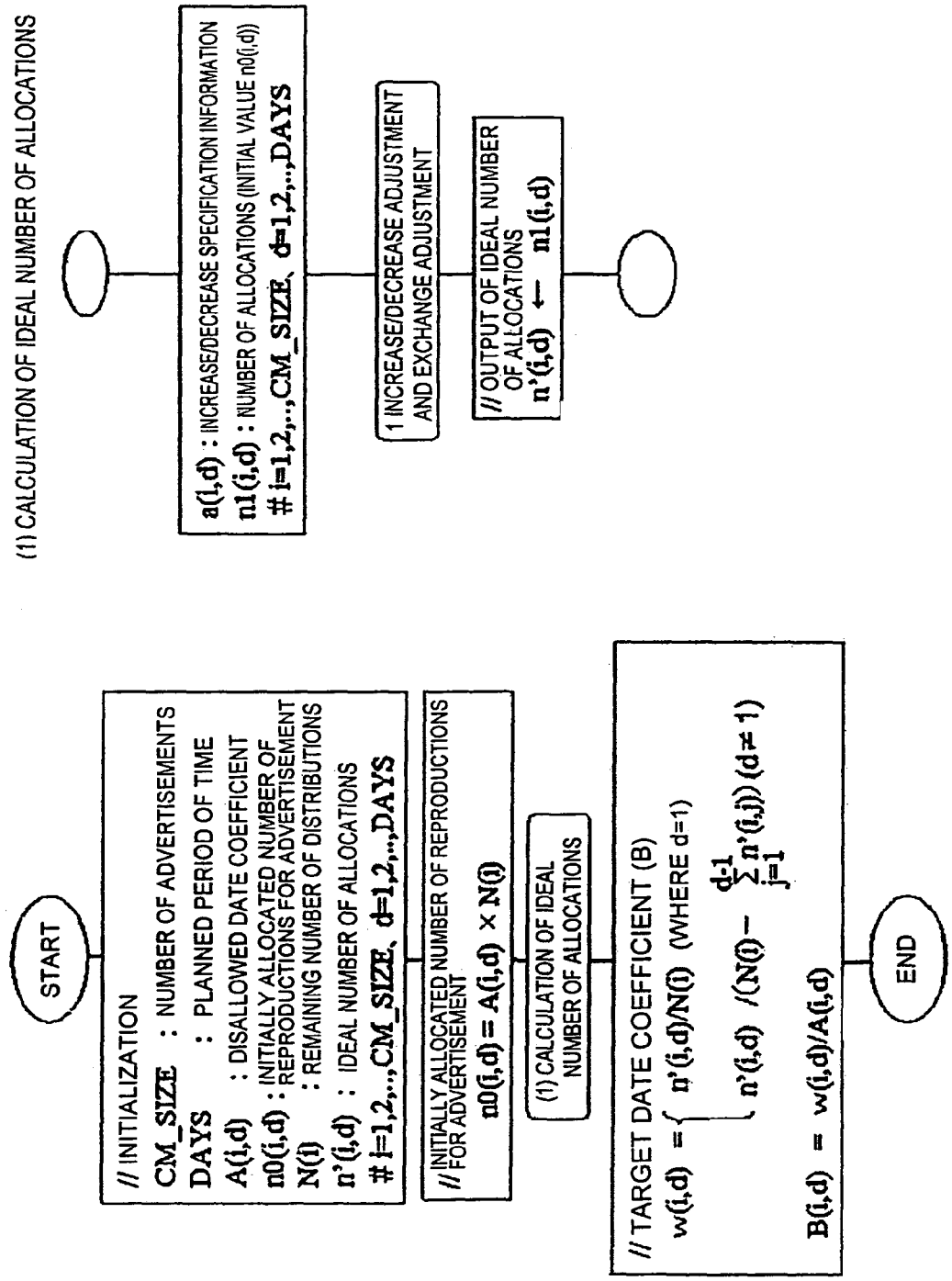
FIG. 16 is a drawing showing the flow of calculating target date coefficient when using method II allocation of the present invention.

T1: Disallowed date set for advertisement i
T2: Date set for advertisement i
D1: Set of advertisements without a disallowance specification on day d where, the "1 Increasing/decreasing adjustment and exchange adjustment" of "(1) Calculation of ideal number of allocations" in the target date: coefficient calculation flow shown in FIG. 16 is performed by the following process:

1. Increasing/decreasing adjustment and exchange adjustment (Increasing/decreasing adjustment method B)

<1> For i=1, 2, 3, ..., CM_SIZE and d=1, 2, 3, ..., DAYs, in the case of the condition i) shown below, increasing/ decreasing adjustment and exchange adjustment are performed and the number of allocations n1(i,d) is determined.

i) When day d is a target date for advertisement i:

$$n1(i, d) = n1(i, d) + u(i, d)$$

where, $$u(i, d) = \frac{a(i, d) * n0(i, d) * \sum_m n0(m, d)}{\sum_m n0(m, d) - n0(i, d) - a(i, d) * n0(i, d)}$$

$$m = 1, 2, \ldots, CM\_SIZE$$

<1>-1 (Exchange adjustment)

For n=1, 2, 3, ..., DAYS, the amount of advertising of advertisement i is reduced on other days using the increase/decrease specification in accordance with the conditions i-1) shown below:

i-1) When the advertisement i does not have a target specification for day n:

$$n1(i, n) = n1(i, n) - u(i, d) * \sum_{j \in T1} n0(i, j) \bigg/ \sum_{j \in T2} n0(i, j)$$

<1>-1

For m=1, 2, ..., CM_SIZE, the exchange amount (ds) is further determined in accordance with the conditions i-1-1) and i-1-2) shown below:

i-1-1) When advertisement m is not disallowed on day d:

$$ds(m, n) = \left( u(i, d) * \sum_{j \in T1} n0(i, j) \bigg/ \sum_{j \in T2} n0(i, j) \right) * n1(m, d) \bigg/ \sum_{k \in D1} n1(k, d)$$

i-1-1-1) (Exceptional processing)

For the case in which the advertisement amount to be exchanged is insufficient:

(n1(m,n)−ds(m,n)<0)

ds(m,n)=n1(m,n)*Ds, where Ds=0.9 (arbitrary)

i-2) For other cases:

ds(m,n)=0

<1>-1-2 (Exchange)

For m=1, 2, ..., CM_SIZE, the advertisement amount is increased or decreased in accordance with the exchange amount.

n1(m,n)=n1(m,n)+ds(m,n)

n1(m,d)=n1(m,d)−ds(m,n)

T1: Target-specified date set of an advertisement i

T2: Date set without target specification for advertisement i

Figure 17:
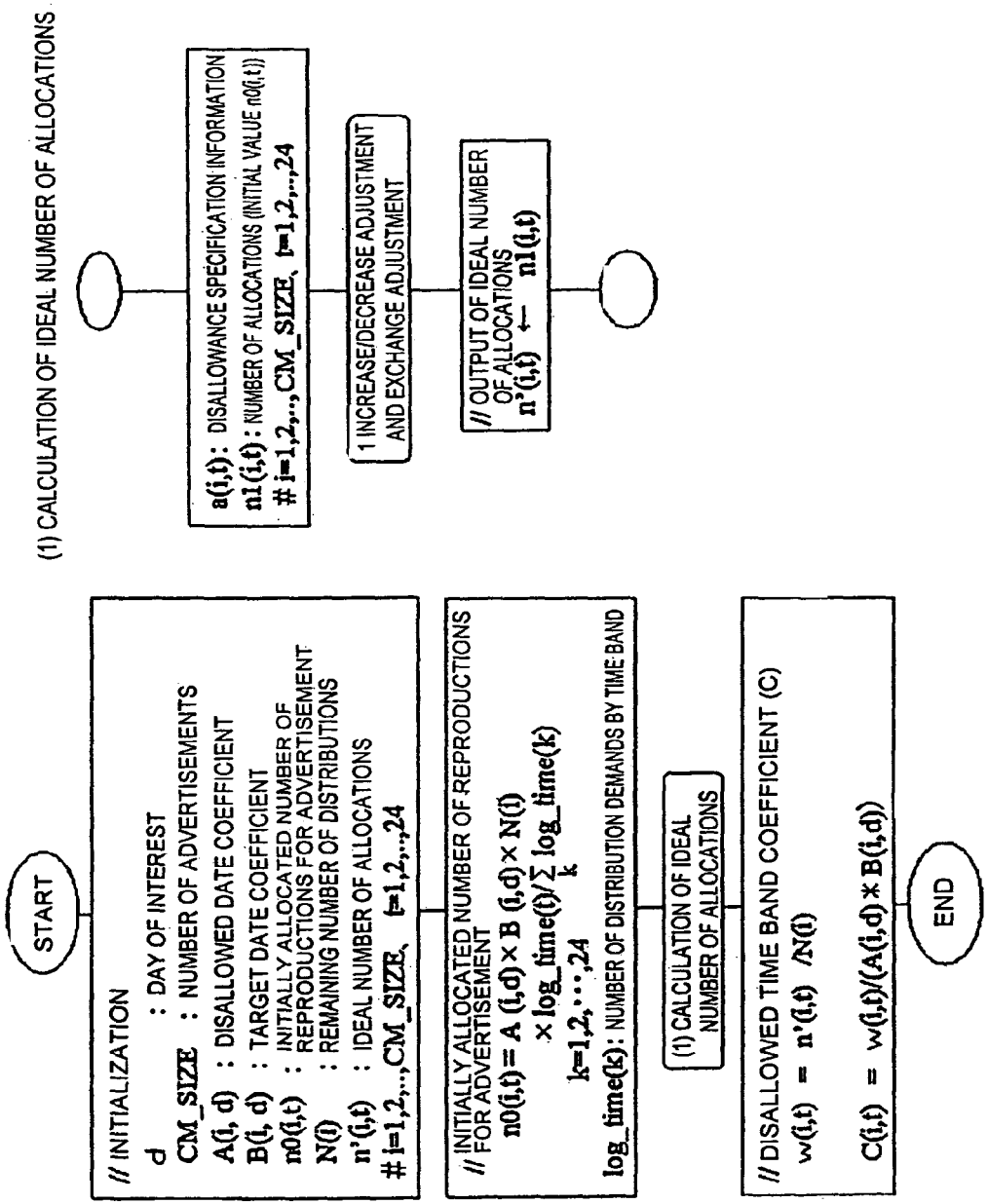
FIG. 17 is a drawing showing the flow of calculating the disallowed time band coefficient when using method II allocation of the present invention.

D1: Set of advertisements without a disallowance specification on day d where, the "1 Increasing/decreasing adjustment and exchange adjustment" of "(1) Calculation of ideal number of allocations" in the disallowed time band coefficient calculation flow shown in FIG. 17 is performed by the following processing.

1. Increasing/decreasing adjustment and exchange adjustment

<1> For each of i=1, 2, 3, ..., CM_SIZE, when t=1, 2, 3, ..., 24, for the case of the condition i) shown below, increasing or decreasing adjustment and exchange adjustment are performed to determine the number of allocations n1(i,t).

i) When time band t of advertisement i is disallowed:

n1(i,t)=0

<1>-1 (Exchange adjustment)

For n=1, 2, 3, ..., 24 the exchange amount is calculated and exchange adjustment is performed.

<1>-1-1 (Exchange amount calculation).

For m=1, 2, ..., CM_SIZE, the exchange amount (ds) is determined in accordance with the following condition i-1) and i-2).

i-1) When n≠t and the advertisement m does not have a disallowance on day t:

$$ds(m, n) = \left( n0(i, t) * \sum_{j \in T1} n0(i, j) \bigg/ \sum_{j \in T2} n0(i, j) \right) * n1(m, n) \bigg/ \sum_{k \in D1} n1(k, n)$$

i-1-1) (Exceptional processing)

When there are not enough advertisements to perform disallowed advertisement exchange:

((n1(m,n)−ds(m,n)<0)

ds(m,n)=n1(m,n)*Ds, where Ds=0.9 (arbitrary)

i-1-2) For other cases:

ds(m,n)=0

<1>-1-2 (Exchange)

Figure 18:
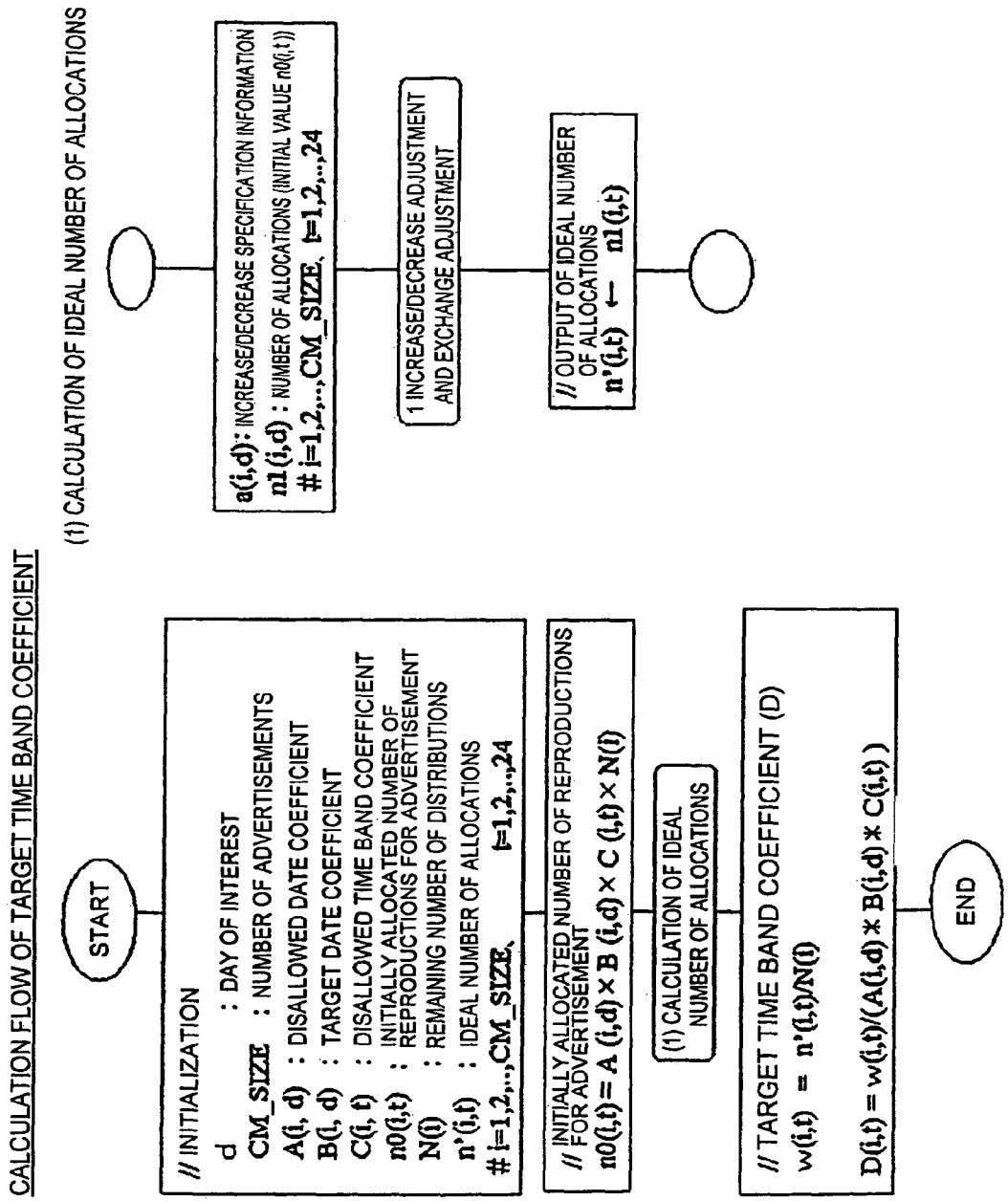
FIG. 18 is a drawing showing the flow of calculating target time band coefficient when using method II allocation of the present invention.

For m=1, 2, ..., CM_SIZE, the advertisement amount is increased or decreased in accordance with the exchange amount.

n1(m,n)=n1(m,n)−ds(m,n)//Source of movement n1(m,t)=n1(m,t)+ds(m,n)//Destination of movement n1(i,n)=n1(i,n)+ds(m,n)//Disallowed advertisement T1: Time band set of disallowance specifications for advertisement i T2: Time band set with no disallowance specification for advertisement i D1: Set of advertisements without a disallowance specification in time band t where, the "1 Increasing/decreasing adjustment and exchange adjustment" of "(1) Calculation of ideal number of allocations" in the target time band coefficient calculation flow shown in FIG. 18 are performed by the following process:

1. Increasing/decreasing adjustment and exchange adjustment (Increasing/decreasing adjustment method B)

<1> For i=1, 2, 3, ..., CM_SIZE and t=1, 2, 3, ..., 24 for the case of the condition i) shown below, increasing/decreasing adjustment and exchange adjustment are performed to determine the number of allocations n1(i,t).

i) When time band t is a target for advertisement i:

$$n1(i, t) = n1(i, t) + u(i, t)$$

where, $$u(i, t) = \frac{a(i, t) * n0(i, t) * \sum_m n0(m, t)}{\sum_m n0(m, t) - n0(i, t) - a(i, t) * n0(i, t)}$$

$$m = 1, 2, \ldots, CM\_SIZE$$

<1>-1 (Exchange adjustment)

For n=1, 2, 3, . . . , 24, the amount of advertising of advertisement i is reduced in other time bands using the specified amount of increase/decrease in accordance with the conditions: i-1) shown below:

i-1) When the advertisement i does not have a target specification for time band t:

$$n1(i, n) = n1(i, n) - u(i, t) * \sum_{j \in T1} n0(i, j) \Big/ \sum_{j \in T2} n0(i, j)$$

<1>1-1

For m=1, 2, . . . , CM_SIZE the exchange amount (ds) is further determined in accordance with the conditions i-1-1) and i-1-2) shown below:

i-1-1) When the advertisement m is not disallowed in time band t:

$$ds(m, n) = \left( u(i, t) * \sum_{j \in T1} n0(i, j) \Big/ \sum_{j \in T2} n0(i, j) \right) * n1(m, t) \Big/ \sum_{k \in D1} n1(k, t)$$

i-1-1-1) (Exceptional processing)

When there is not enough advertisement amount to perform exchange:

$$(n1(m,n) - ds(m,n) < 0):$$

$$ds(m,n) = n1(m,n) * Ds, \text{ where } Ds=0.9 \text{ (arbitrary)}$$

i-1-2) Other cases:

$$ds(m,n) = 0$$

<1>-1-2 (Exchange)

For m=1, 2, . . . , CM_SIZE, the advertisement amount is increased or decreased according to the exchange amount.

$$n1(m,n) = n1(m,n) + ds(m,n)$$

$$n1(m,t) = n1(m,t) - ds(m,n)$$

T1: Time band set with a target specification of an advertisement i

T2: Time band set with no target specification for advertisement i

D1: Set of advertisements without a disallowance specification on time band t (Method III)

In yet another method, the case of not fitting into advertisement slots, as in method I, is eliminated, and there is no influence from the sequence of exchange, as in method II. In addition, this method uses re-iterative calculation that has a small amount of calculation and enables enhancement of the emphasis effect, compared with the case of performing mathematical programming such as linear programming, described later.

The general allocation processing of method III is shown in FIG. 19. A step for the adjustment amount of each time is provided. That is, by repeating adjustment for a fixed amount that is divided by the number of times, advertisements with disallowances or the like are gradually allocated to days or time bands without a disallowance.

Specifically, (1) if the number of adjustment times is set to ten times, for example, ⅒ of the amount of advertisements before adjustment is extracted. The number of adjustment times can be arbitrarily determined. (2) Disallowances are removed, and allocation is made to days other than disallowed days. All advertisements in slots having openings are moved to the intermediate number of reproductions for the advertisement. The breakdown of advertisements in which there is an overage is equivalent to the ratio of the amount of advertisements for each advertisement that day. Openings (carry-forward slots) and overage amounts (remaining number of carry-forwards) exist in each slot, and the totals for each are equivalent. (4) With respect to the carry-forward slots, the number of remaining carry-forwards is allocated. (5) ⅒ of the advertisement amount before the adjustment is extracted. (6) A return is made to (2), and the processing ends when the number of repetitions reaches ten. The numbers used herein are assigned in common with the numbers in FIG. 19.

Specifically, the disallowed advertisement (CM1) is uniformly allocated to days that are not disallowed, and the allocated disallowance is divided into an adjustment amount and an overage amount, while maintaining the share for each advertiser.

The portion fitting into the adjustment amount is established as the allocation amount, as is. In order to accelerate the elimination of the overage amount, it is added to the adjustment amount the next time, and the same processing is repeated.

Since the overage amount is collected and proportionally allocated again to openings, it is possible to perform allocations that, in contrast to method II, are not dependent on the exchange sequence. By using this method, it is possible to perform allocations using a finite number of adjustments, and if the adjustment amount is made small, it is possible to perform allocation comparable to linear programming. In addition, because greater skewing can occur in allocation ratio than in the degree of emphasis, this method is attractive to advertisers.

With regard to target specifications, calculations can also be performed in this manner. The specific calculation equations are exemplified in FIGS. 20 to 24.

Figure 20:
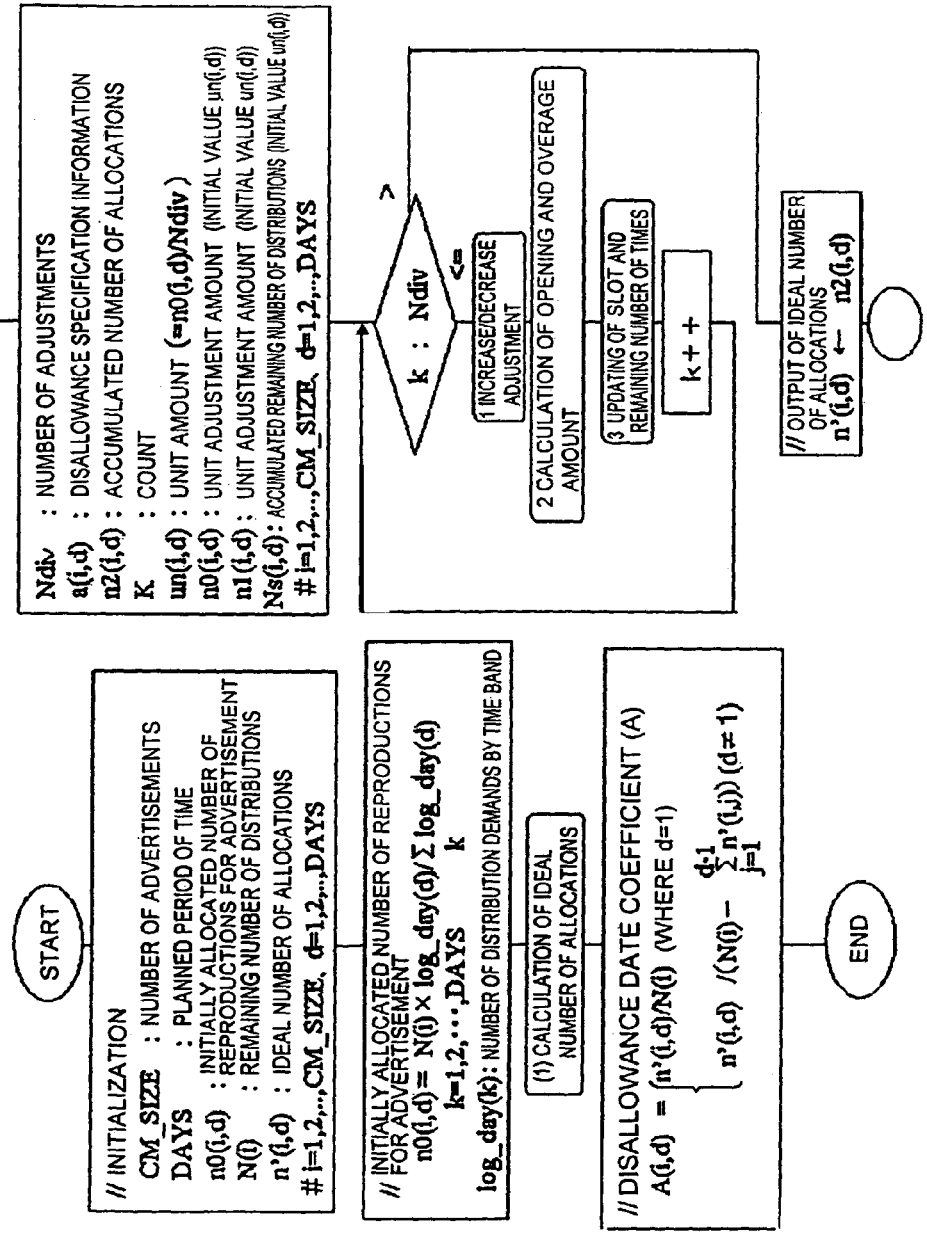
FIG. 20 is a drawing showing the flow of calculating the disallowed date coefficient when using method III allocation of the present invention.

The "1 Increasing/decreasing adjustment"; "2 Opening and overage amount calculation"; and "3 Slot and remaining number of times updating" of "(1) Calculation of ideal number of allocations" in the disallowance date coefficient calculation flow shown in FIG. 20 are performed by the following processes:

1. Increasing/decreasing amount processing

<1> For each of i=1, 2, 3, . . . , CM_SIZE when d=1, 2, 3, . . . , DAYS, the unit adjustment amount n1(i,d) is determined in accordance with the following conditions i), ii), and iii).

i) When advertisement i has a disallowance specification on day d:

$$n1(i,d) = 0$$

ii) For cases other than i) and in which there is a disallowance specification on another day:

$$n1(i, d) = n0(i, d) + n0(i, d) * \sum_{j \in T1} n0(i, j) / \sum_{j \in T2} n0(i, j)$$

T1: Time band set with a disallowance specification of an advertisement i

T2: Time band set with no disallowance specification for advertisement i iii) For all cases other than i) and ii):

$n1(i,d)=n0(i,d)$

2. Opening and overage amount calculation

<1> For d=1, 2, 3, ..., DAYS, the total unit adjustment amount of each day that is increased or decreased in the above processing 1 is calculated.

$$s0(d) = \sum_i 0(i, d),$$

$$s1(d) = \sum_i n1(i, d),$$

$i = 0, 1, 2, 3, \ldots CM\_SIZE$

<2> For each of i=0, 1, 2, 3, ..., CM_SIZE, when d=1, 2, 3, ..., DAYS, values are determined in accordance with the following conditions i) and ii):

i) When there is a slot overage (s1(d)−s0(d)>0):

$Ns(i)=Ns(i)-n1(i,d)*(s0(d)/s1(d))$ $n0(i,j)=0$ $n2(i,d)=n2(i,d)+n1(i,d)*(s0(d)/s1(d))$ ii) When there is a slot opening (s0(d)−s1(d)≧0):

$Ns(i)=Ns(d)n1(i,d)$ $n0(i,d)=(s0(d)-s1(d))*n1(i,d)/s1(d)$ $n2(i,d)=n2(i,d)+n1(i,d)$

3. Updating slot and number of remaining times

<1> For each of i=0, 1, 2, ..., CM_SIZE, when d=1, 2, 3, ..., DAYS, the unit adjustment amount is updated.

$n0(i,d)=Ns(i)*day(d)/all\ day$ //Re-allocation of remaining number of times $n0(i,d)=n0(i,d)+un(i,d)$ //Unit amount addition where, $$\text{all day} = \sum_d \sum_i n0(i, d)$$

$$\text{day}(d) = \sum_i n0(i, d)$$

i=0, 1, 2, 3, ..., CM_SIZE; d=1, 2, 3, ..., DAYS

Figure 21:
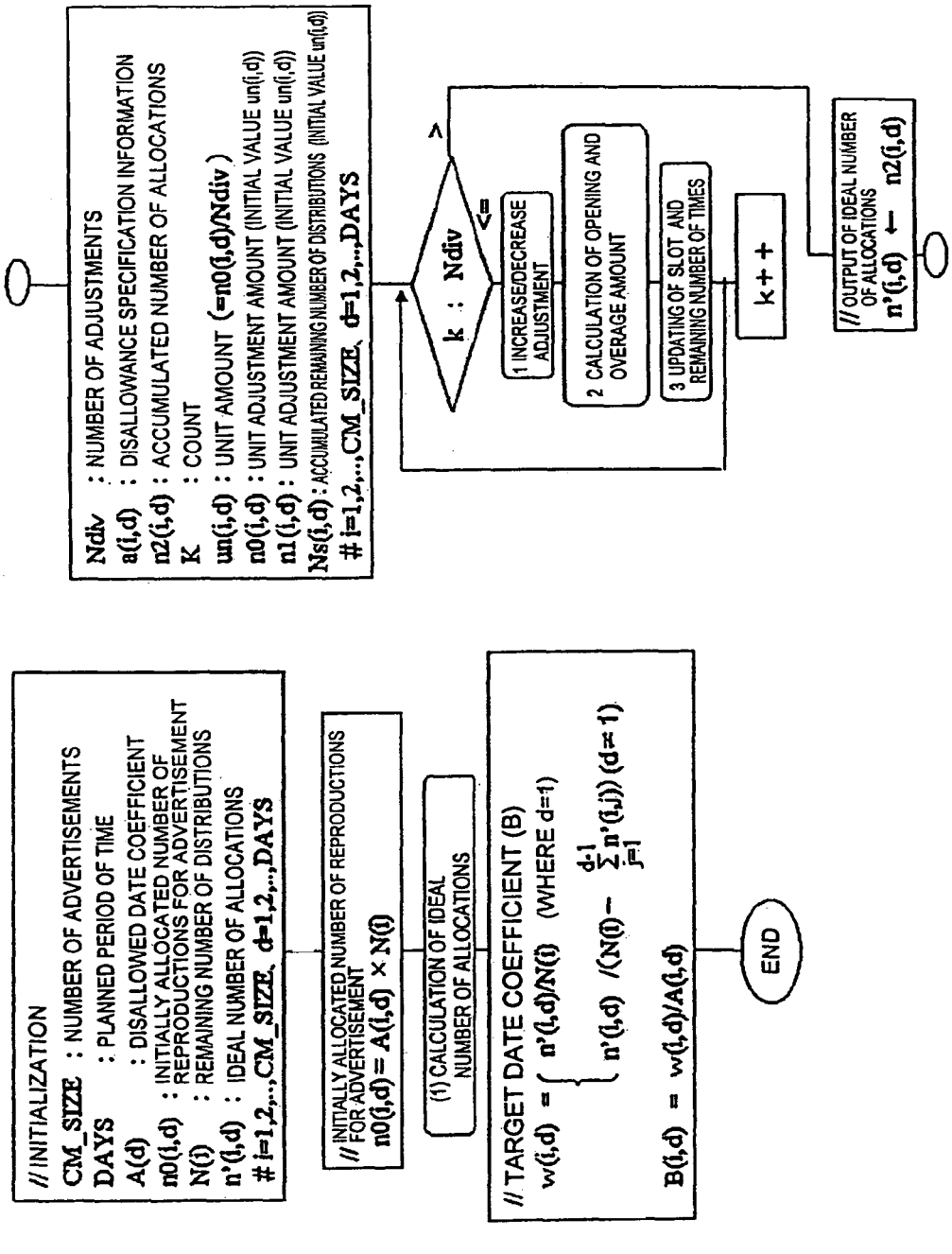
FIG. 21 is a drawing showing the flow of calculating target date coefficient when using method III allocation of the present invention.

"1 Increasing/decreasing adjustment"; "2 Opening and overage amount calculation"; and "3 Slot and remaining number of times updating" of "(1) Calculation of ideal number of allocations" in the target date coefficient calculation flow shown in FIG. 21 are performed by the following processes:

1. Increasing/decreasing amount processing

<1> For each of i=1, 2, 3, ..., CM_SIZE when d=1, 2, 3, ..., DAYS, the unit adjustment amount n1(i,d) is determined in accordance with the following conditions i) and ii).

i) When day d is a target date for advertisement i:

$n1(i,d)=n0(i,d)+u(i,d)$ ii) Other cases:

$$n1(i, d) = n0(i, d) - n0(i, d) * \sum_{j \in T1} u(i, j) / \sum_{j \in T2} n0(, j)$$

T1: Date set with a disallowance specification for advertisement i

T2: Date set with no disallowance specification for advertisement i where, $$u(i, d) = \frac{a(i, d) * n0(i, d) * \sum_m n0(m, d)}{\sum_m n0(m, d) - n0(i, d) - a(i, d) * n0(i, d)}$$

m=1, 2, ..., CM_SIZE

2. Opening and overage amount calculation

<1> For j=1, 2, 3, ..., DAYS, the total unit adjustment amount for each day is calculated that was increased/decreased in processing 1.

$$s0(d) = \sum_i n0(i, d),$$

$$s1(d) = \sum_i n1(i, d)$$

i=0, 1, 2, 3, ..., CM_SIZE

<2> For i=0, 1, 2, 3, ..., CM_SIZE and j=1, 2, 3, ..., DAYS, values are determined in accordance with the following conditions i) and ii):

i) When there is a slot overage (s1(d)−s0(d)>0):

$Ns(i)=Ns(i)-n1(i,d)*(s0(d)/s1(d))$ $n0(i,j)=0$ $n2(i,d)=n2(i,d)+n1(i,d)*(s0(d)/s1(d))$ ii) When there is a slot opening (s0(d)−s1(d)≦0)

$Ns(i)=Ns(d)-n1(i,d)$ $n0(i,d)=(s0(d)-s1(d))*n1(i,d)/s1(d)$ $n2(i,d)=n2(i,d)+n1(i,d)$

3. Slot and remaining number of times updating

<1> For each of i=0, 1, 2, 3, ..., CM_SIZE, when j=1, 2, 3, ..., DAYS, the unit adjustment amount is updated.

$n0(i,d)=Ns(i)*day(d)Allday$ //Re-allocation $n0(i,d)=n0(i,d)+un(i,d)$ //Add unit amount where, $$\text{all day} = \sum_d \sum_i n0(i, d)$$

$$\text{day}(d) = \sum_I n0(i, d)$$

$$i = 0, 1, 2, 3, \ldots, \text{CM\_SIZE};$$

$$d = 1, 2, 3, \ldots, \text{DAYS}$$

i=0, 1, 2, 3, ..., CM_SIZE; d=1, 2, 3, ..., DAYS

Figure 22:
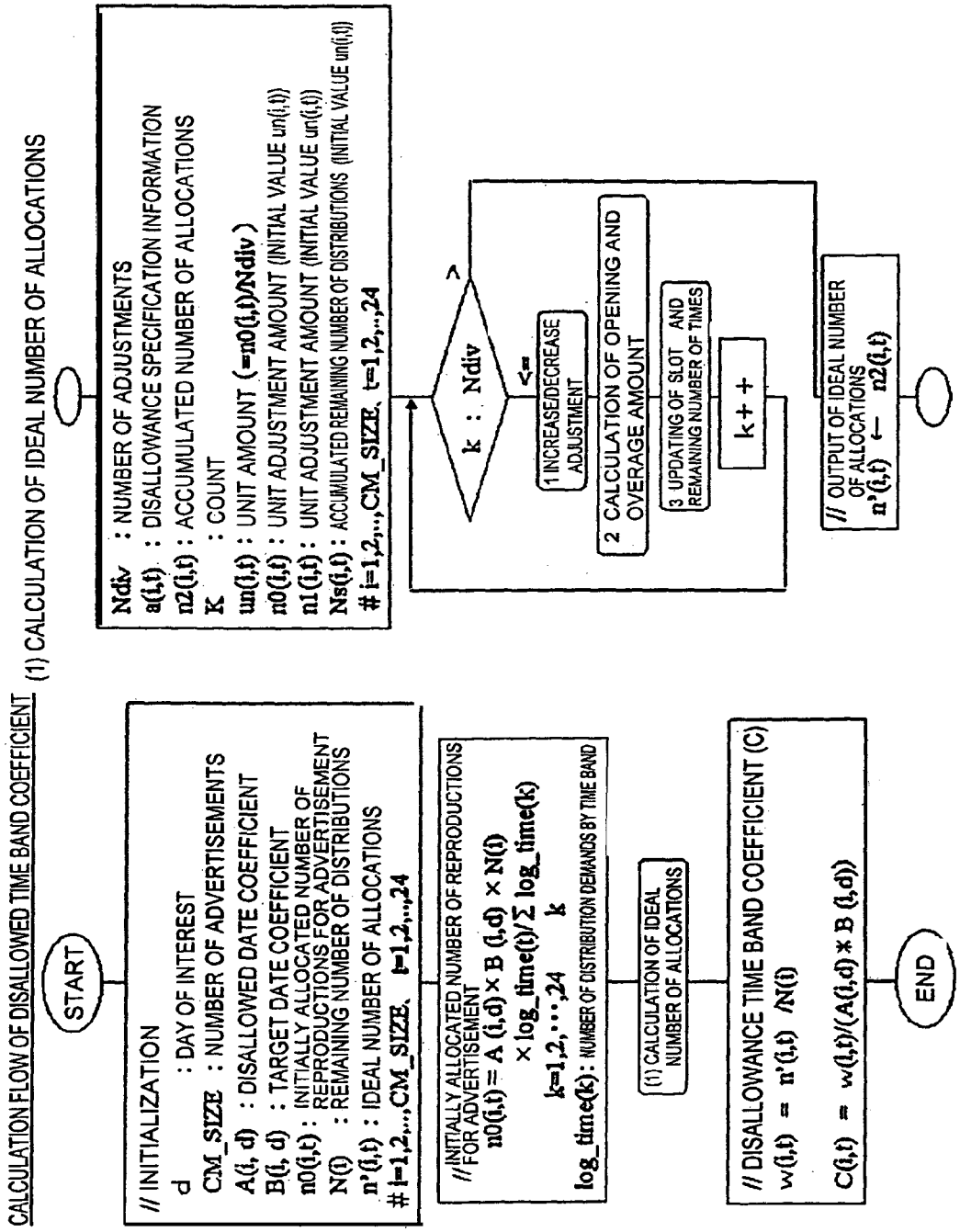
FIG. 22 is a drawing showing the flow of calculating the disallowed time band coefficient when using method III allocation of the present invention.

The "1 Increasing/decreasing adjustment"; "2 Opening and overage amount calculation"; and "Slot and remaining number of times updating" of "(1) Calculation of ideal number of allocations" in the disallowed time band coefficient calculation flow shown in FIG. 22 are performed by the following processing, respectively.

1. Increasing/decreasing processing
<1> For each of i=1, 2, 3, ..., CM_SIZE, when j=1, 2, 3, ..., 24, the unit adjustment amount n1(i,t) is calculated in accordance with the following conditions i) and ii).
i) When time t is a disallowance specification of advertisement i:

$$n1(i,t)=0$$

ii) For cases other than (i) and in which the advertisement i has a disallowance specification at another time band:

$$n1(i, t) = n0(i, t) + n0(i, t) * \sum_{j \in T1} n0(i, j) \Big/ \sum_{j \in T2} n0(i, j)$$

T1: Target time band set of advertisement i
T2: Time band set without the target time band of advertisement i
iii) For cases other than i) and ii):

$$n1(i,t)=n0(i,t)$$

2. Opening and overage calculation
<1> For t=1, 2, 3, ..., 24, the total unit adjustment amount of each day that is decreased or increased as noted in 1 is calculated.

$$s0(d) = \sum_i n0(i, t),$$

$$s1(d) = \sum_I n1(i, t), \text{ where}$$

$$i = 0, 1, 2, 3, \ldots, 24$$

where i=0, 1, 2, 3, ..., 24
<2> For each of i=0, 1, 2, 3, ..., CM_SIZE, when t=1, 2, 3, ..., 24, values are determined in accordance with the following conditions i) and ii):
i) When there is a slot overage (s1(t)−s0(t)>0):

$$Ns(i)=Ns(i)-n1(i,t)*(s0(t)/s1(t))$$

$$n0(i,j)=0$$

$$n2(i,t)=n2(i,t)+n1(i,t)*(s0(t)/s1(t))$$

ii) When there is a slot opening (s0 (t)−s1(t)≦0):

$$Ns(i)=Ns(t)-n1(i,t)$$

$$n0(i,t)=(s0(t)-s1(t))*n1(i,t)/s1(t)$$

$$n2(i,t)=n2(i,t)+n1(i,t)$$

Figure 23:
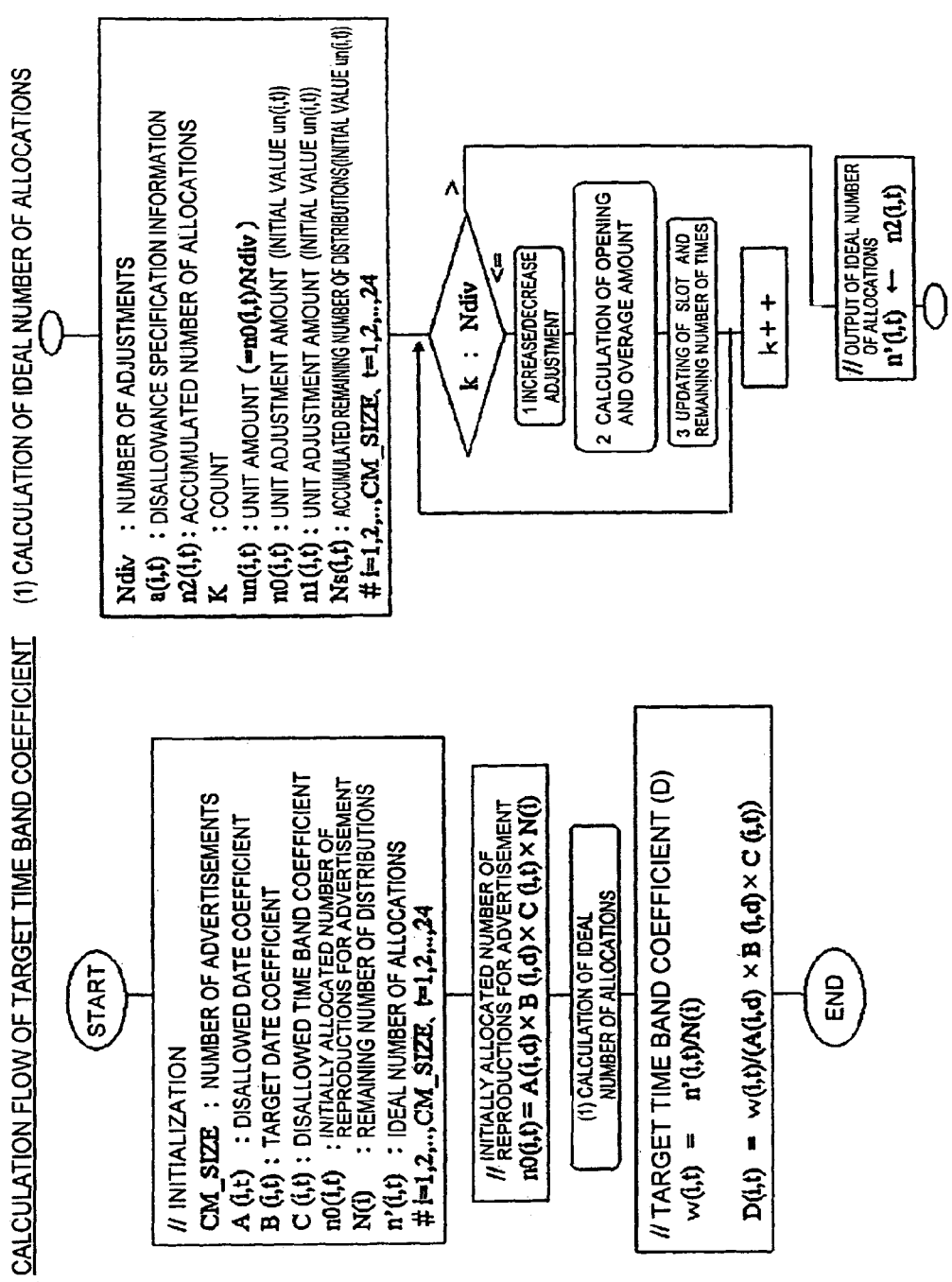
FIG. 23 is a drawing showing the flow of calculating target time band coefficient when using method III allocation of the present invention.

3. Updating slot and number of remaining times
<1> For each of i=0, 1, 2, 3, ..., CM_SIZE, when t=1, 2, 3, ..., 24, the unit adjustment amount is updated.

$$n0(i,t)=Ns(i)*\text{time}(t)/\text{all time}//\text{Re-allocation}$$

$$n0(i,t)=N0(i,t)+un(i,d)//\text{Unit amount addition}$$

where, $$\text{all time} = \sum_t \sum_i n0(i, t)$$

$$\text{time}(t) = \sum_i n0(i, t)$$

$$i = 0, 1, 2, 3, \ldots, \text{CM\_SIZE and}$$

$$t = 1, 2, 3, \ldots, 24$$

i=0, 1, 2, 3, ..., CM_SIZE and t=1, 2, 3, ..., 24
The "1 Increasing/decreasing adjustment"; "2 Opening and overage amount calculation"; and "3 Slot and remaining number of times updating" of "(1) Calculation of ideal number of allocations" in the target time band coefficient calculation flow shown in FIG. 23 are performed by the following processes:

1. Increasing/decreasing amount processing
<1> For each of i=1, 2, 3, ..., CM_SIZE when t=1, 2, 3, ..., 24, the unit adjustment amount n1(i,t) is determined in accordance with the following conditions i) and ii):
i) When time t is a target time band for advertisement i:

$$n1(i,t)=n0(i,t)+u(i,t)$$

ii) For other cases:

$$n1(i, t) = n0(i, t) - n0(i, t) * \sum_{j \in T1} u(i, t) \Big/ \sum_{j \in T2} n0(i, j)$$

T1: Time band set with a target specification for advertisement i
T2: Time band set with no target specification for advertisement i
where, $$u(i, t) = \frac{a(i, t) * n0(i, t) * \sum_m n0(m, t)}{\sum_m n0(m, t) - n0(i, t) - a(i, t) * n0(i, t)}$$

$$m = 1, 2, \ldots, \text{CM\_SIZE}$$

m=1, 2, ..., CM_SIZE

2. Opening and overage amount calculation
<1> For j=1, 2, 3, ..., 24, calculation is done of the total unit adjustment amount for each time band that was increased/decreased in accordance with the above processing 1.

$$s0(d) = \sum_i n0(i, t),$$

$$s1(t) = \sum_i n1(i, t)$$

$$t = 0, 1, 2, 3, \ldots, 24$$

t=0, 1, 2, 3, . . . , 24
<2> For i=0, 1, 2, 3, . . . , CM_SIZE and t=1, 2, 3, . . . , 24, values are calculated in accordance with the following conditions i) and ii):
i) Overage (s1(*t*)−s0(*t*)>0):

$Ns(i)=Ns(i)-n1(i,t)*(s0(t)/s1(t))$ $n0(i,j)=0$ $n2(i,t)=n2(i,t)+n1(i,t)*(s0(t)/s1(t))$ ii) Opening (s1(t)−s0(t)≦s0):

$Ns(i)=Ns(t)-n1(i,t)$ $n0(i,t)=(s0(t)-s1(t))*n1(i,t)/s1(t)$ $n2(i,t)=n2(i,t)+n1(i,t)$:

3. Updating slot and remaining number of times
<1> For each of i=0, 1, 2, 3, . . . , CM_SIZE, when t=1, 2, 3, . . . , 24, the unit adjustment amount is updated.

$n0(i,t)=Ns(i)*\text{time}(t)\text{Alltime}//\text{Re-allocation}$ $n0(i,t)=n0(i,t)+un(i,t)//\text{Add unit amount}$ where, $$\text{all time} = \sum_t \sum_i n0(i, t),$$

$$\text{time}(t) = \sum_i n0(i, t)$$

$$i = 0, 1, 2, 3, \ldots, \text{CM\_SIZE};$$

$$t = 1, 2, 3, \ldots, 24$$

i=0, 1, 2, 3, . . . , CM_SIZE; t=1, 2, 3, . . . , 24

(Method IV)

This method is one that uses linear programming to determine an optimum value in order to achieve optimum allocation, and the following are target functions, specific equations and the like thereof.

Disallowance Date Coefficient Calculation
(Pre-Conditions)
CM_SIZE: Number of advertisements
DAYS: Planned time period
a(i,d): Disallowance specification information
n0(i,d): Initially allocated number of reproductions for the advertisement
1. Calculation of initially allocated number of reproductions for the advertisement $$n0(i, t) = N(i) \times \log\_\text{day}(d) \Big/ \sum_k \log\_\text{day}(d)$$

$$k = 1, 2, \ldots, \text{DAYS}$$

k=1, 2, . . . , DAYS
log_day(k): Number of distribution demands for each time band
N(i): Remaining-number of distributions
2. For i=0, 1, 2, . . . , CM SIZE and d=1, 2, 3, . . . , DAYS:
i) When day d is disallowed for advertisement i:

$n1(i,d)=0$ ii) For cases other than i) where another day has a disallowance specification:

$$n1(i, d) = n0(i, d) + n0(i, d) * \sum_{j \in T1} n0(i, j) \Big/ \sum_{j \in T2} n0(i, j)$$

T1: Time band set with target specifications for advertisement i
T2: Time band set with no target specification for advertisement i
iii) For cases other than i) and ii):

$n1(i,d)=0(i,d)$

3. Search for optimum value (n2(i,d))
Mathematical programming is used to determine a combination of n2(*i*,*d*) that minimizes the target function Z shown below:

Target Function:

$$Z = \sum_{i,d} \left\{ K(i, d) \times \left| \frac{n1(i, d) - n2(i, d)}{n1(i, d)} \right| \right\} \to \min$$

i=1, 2, . . . , CM_SIZE and d=1, 2, 3, . . . , DAYS $K(i,j)=1$

Restriction Conditions:

$$\sum_d n2(i, d) = \sum_d n0(i, d)$$

$$\sum_i n2(i, d) = \sum_i n0(i, d)$$

i=1, 2, 3, . . . , CM_SIZE
d=1, 2, 3, . . . , DAYS $n2(i,d)=0$ (if $a(i,d)=0$)//Disallowed day variable ignored 4. Calculation of weight function (A)

$$A(i, d) = \begin{cases} n2(i, d)/N(i) & (\text{when } d = 1) \\ n2(i, d) \Big/ \left( N(i) - \sum_{j=1}^{d-1} n2(i, j) \right) & (d \neq 1) \end{cases}$$

Target Date Coefficient Calculation
(Pre-Conditions)
CM_SIZE: Number of advertisements
DAYS: Planned time period
a(i,d): Increase/decrease specification information
n0(i,d): Initially allocated number of distributions 1. Initially allocated number of reproductions for the advertisement calculation $$n0(i,d)=A(i,d)\times N(i)$$

A(i,d): Disallowance date coefficient
N(i): Remaining number of distributions

2. Ideal value (n1(i,d)) determination
   For i=0, 1, 2, 3, ..., CM_SIZE and d=1, 2, 3, ..., DAYS:
   i) When day d is a target date for advertisement i:

$$n1(i,d)=n0(i,d)+u(i,d)$$

ii) For other cases (in which day d is not a target date for advertisement i):

$$n1(i,d) = n0(i,d) - n0(i,d) * \sum_{j \in T1} u(i,d) \bigg/ \sum_{j \in T2} n0(i,j)$$

T1: Set of target time bands for advertisement i
T2: Set of target time bands without the target specifications of advertisement i
where, $$u(i,d) = \frac{a(i,d) * n0(i,d) * \sum_m n0(m,d)}{\sum_m n0(m,d) - n0(i,d) - a(i,d) * n0(i,d)}$$

m=1, 2, ..., CM_SIZE

3. Search for optimum value (n2(i,d))
   Mathematical programming is used to determine a combination of n2(i,d) that minimizes the target function Z shown below:
   Target function:

$$Z = \sum_{i,d} \left\{ K(i,d) \times \left| \frac{n1(i,d) - n2(i,d)}{n1(i,d)} \right| \right\} \to \min$$

i=1, 2, ..., CM_SIZE and d=1, 2, 3, ..., DAYS $$K(i,j) = \begin{cases} 1 & \text{(if } a(i,d)=0\text{) // No target specification} \\ k & \text{(otherwise) // Target specification exists;} \\ & k \text{ is arbitrary constant.} \end{cases}$$

Restriction Conditions:

$$\sum_d n2(i,d) = \sum_d n0(i,d)$$

$$\sum_i n2(i,d) = \sum_i n0(i,d)$$

i=1, 2, 3, ..., CM_SIZE
d=1, 2, 3, ..., DAYS.

4. Calculation of weight function (A)

$$w(i,d) = \begin{cases} n2(i,d)/N(i) & \text{(when } d=1\text{)} \\ n2(i,d) \bigg/ \left( N(i) - \sum_{j=1}^{d-1} n2(i,j) \right) & (d \neq 1) \end{cases}$$

$$B(i,d)=w(i,d)/A(i,d)$$

Disallowance Time Band Coefficient Calculation
   (Pre-Conditions)
   CM_SIZE: Number of advertisements
   a(i,t): Disallowance specification information
   n0(i,t): Initially allocated number of reproductions for the advertisement 1. Calculation of initially allocated number of reproductions for the advertisement $$n0(i,t)=A(i,d)\times B(i,d)\times N(i)\times \log\_time(t)/\Sigma \log\_time(k)$$

k=1, 2, ..., 24
A(i,d): Disallowance date coefficient
N(i): Remaining number of distributions
log_time(k): Number of distribution demands for each time band
B(i,d): Target date coefficient 2. Ideal value (n1(i,t)) determination
   For i=0, 1, 2, 3, ..., CM_SIZE and t=1, 2, 3, ..., 24:
   i) When time t is disallowed for advertisement i:

$$n1(i,t)=0$$

ii) For cases other than i) where another time band has a disallowance:

$$n1(i,t) = n0(i,t) + n0(i,t) * \sum_{j \in T1} n0(i,t) \bigg/ \sum_{j \in T2} n0(i,t)$$

T1: Set of target time bands for advertisement i
T2: Set of target time bands without the target specifications of advertisement i
   iii) All cases other than i) or ii):

$$n1(i,t)=0(i,t)$$

3. Search for optimum value (n2(i,t))
   Mathematical programming is used to determine a combination of n2(i,t) that minimizes the target function Z shown below:
   Target Function:

$$Z = \sum_{i,t} \left\{ K(i,t) \times \left| \frac{n1(i,t) - n2(i,t)}{n1(i,t)} \right| \right\} \to \min$$

i=1, 2, ..., CM_SIZE; t=1, 2, 3, ..., 24
K(i,j)=1

Restriction Conditions:

$$\sum_t n2(i,t) = \sum_t n0(i,t)$$

-continued $$\sum_i n2(i, t) = \sum_i n0(i, t)$$

i=1, 2, 3, . . . , CM_SIZE; t=1, 2, 3, . . . , 24 n2(i,t)=0 (if a(i,t)==0)//Disallowance time band variable ignored

4. Disallowance time band coefficient (C) calculation $$w(i,t)=n2(i,t)/N(i)$$

$$C(i,t)=w(i,t)/(A(i,d)*B(i,d))$$

Target Time Band Coefficient Calculation
(Pre-Conditions)
CM_SIZE: Number of advertisements
a(i,t): Increase/decrease specification information
n0(i,t): Initially allocated number of reproductions for the advertisement
1. Calculation of initially allocated number of reproductions for the advertisement $$n0(i,t)=A(i,d)\times B(i,d)\times C(i,t)\times N(i)$$

A(i,d): Disallowance date coefficient
B(i,d): Target date coefficient
C(i,t): Disallowance time band coefficient
N(i): Remaining number of distributions 2. Ideal value (n1(i,t)) determination
For i=0, 1, 2, 3, . . . , CM_SIZE and t=1, 2, 3, . . . , 24:
i) When time t is a target time band for advertisement i:

$$n1(i,t)=n0(i,t)+u(i,t)$$

ii) For other cases (in which time t of advertisement i is not a target time band)

$$n1(i, t) = n0(i, t) - n0(i, t) * \sum_{j \in T1} u(i, j) \Big/ \sum_{j \in T2} n0(i, j)$$

T1: Set of target time bands for advertisement i
T2: Set of target time bands without the target specifications of advertisement i
where, $$u(i, t) = \frac{a(i, t) * n0(i, t) * \sum_m n0(m, t)}{\sum_m n0(m, t) - n0(i, t) - a(i, t) * n0(i, t)}$$

$$m = 1, 2, \ldots, CM\_SIZE$$

3. Search for optimum value (n2(i,t))
Mathematical programming is used to determine a combination of n2(i,d) that minimizes the target function Z shown below:
Target Function:

$$Z = \sum_{i,t} \left\{ K(i, t) \times \left| \frac{n1(i, t) - n2(i, t)}{n1(i, t)} \right| \right\} \to \min$$

i=1, 2, . . . , CM_SIZE and t=1, 2, 3, . . . , 24

$$K(i, j) = \begin{cases} 1 \text{(if } a(i, j) = 0) \text{ // No target specification} \\ k \text{(otherwise) // Target specification} \\ \text{arbitrary constant } k \end{cases}$$

Restriction Conditions:

$$\sum_t n2(i, t) = \sum_t n0(i, t)$$

$$\sum_t n2(i, t) = \sum_t n0(i, t)$$

i=1, 2, 3, . . . , CM_SIZE
t=1, 2, 3, . . . , 24

4. Target time band coefficient (D)

$$w(i,t)=n2(i,t)/N(i)$$

$$D(i,t)=w(i,t)/(A(i,d)*B(i,d)*C(i,t))$$

Because there is an increase in the amount of calculation accompanying an increase in the number of advertisements and the like that are handled, there is an increase in the burden placed on hardware. However, with improved hardware performance, there is an improvement in its practical usefulness, enabling optimum distribution that in line with a degree of emphasis.

(Increase/Decrease Adjustment Method (Calculation of Added Amount))

Figure 24:
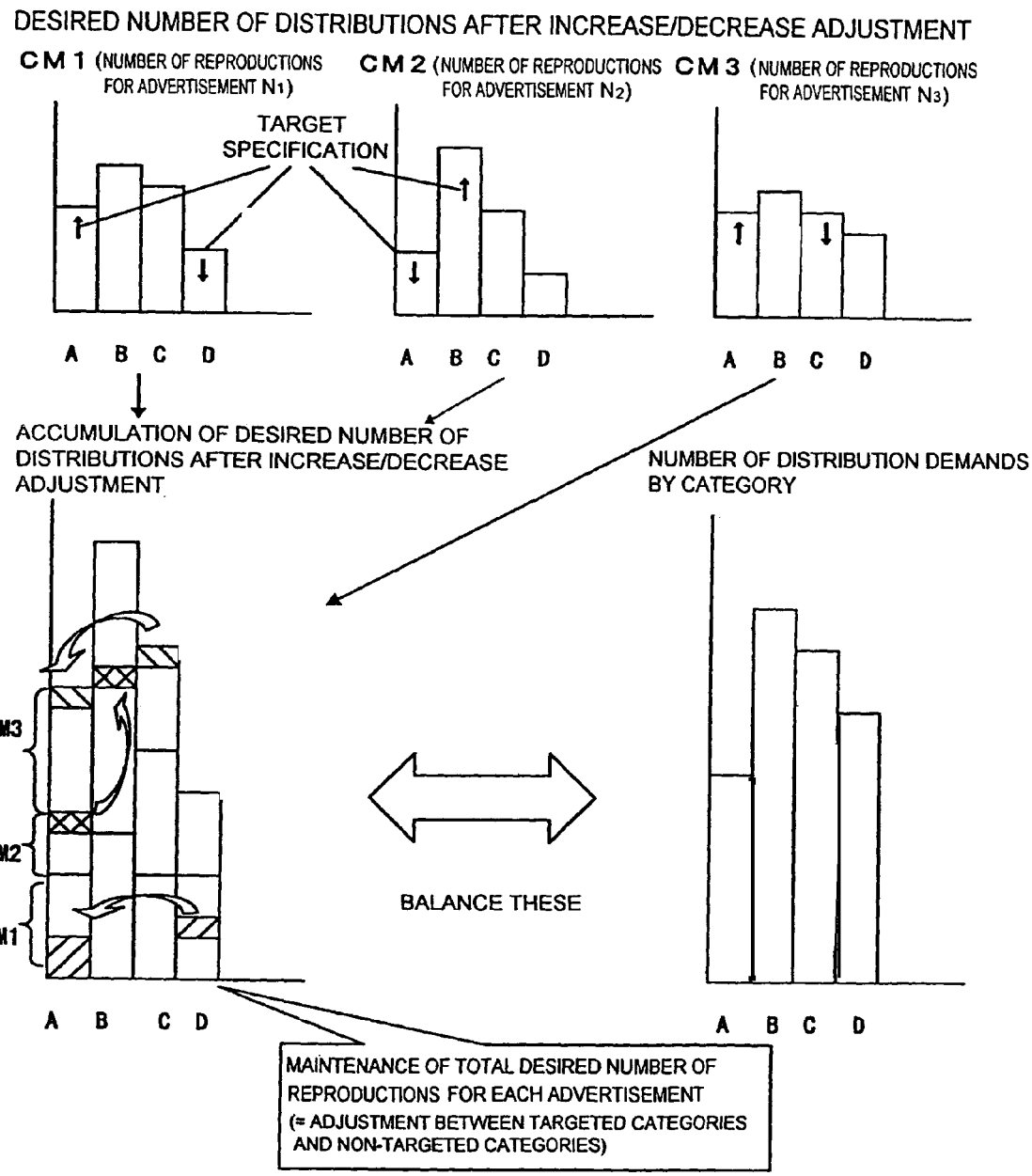
FIG. 24 is a drawing describing the calculation of the amount of increase in the advertisement allocation method of the present invention (part 1).

What follows is a supplementary description of the method for deriving the target coefficient, which is the amount of advertisements to be added to the number of reproductions for the advertisement with target specification in the case of targeting (emphasis) being applied to categories, days, or time bands by the advertiser (refer to FIG. 24).

In general, the added amount is derived by using method B shown in FIG. 25. Specifically, from the size of the slot before adjustment the added amount is determined so that the increase/decrease ratio determined by the increase/decrease specification is achieved after the addition is made. This added amount is the product of the ratio given by basic coefficient, relative to the total advertising amount for day d before adjustment, and the advertising amount.

The added amount, however, can be defined as being derived by method A, shown in FIG. 25, because this is no more than an issue of the definition of "emphasis". That is, this method is one whereby the basic coefficient with respect to the absolute number of reproductions for the advertisement of an advertisement is used to determine the ratio of increase or decrease, and this ratio is taken as the added amount.

Additionally, as shown by the method A+B of FIG. 26, derivation is possible from this combination. That is, after doing the adding using the method A, method B is used to derive the final adding. By using this method, when there is both positive and negative adjustment, the expansion of the amount of increase or decrease is smaller than that using the method B.

In the present invention targeting processing can be performed using the added amount by any of these definitions.

In the case of implementing a distribution system of the present invention, if the actual number of distribution demands exceeds the expected number of distributions, openings occur in the "advertising list"; meaning that the "number of planned distributions" becomes zero, after which the extraction probability of that advertisement becomes zero, resulting in the possibility of a lost business opportunity.

Given the above, the present invention comprises an embodiment in which, using the following function $f(x)$ rather than the actual number of times base as the number of planned distributions (x), the planned number of distributions does not become zero.

$$f(x)=x+\alpha \times x_0,$$

where $\alpha$ is set so as to constantly adjust to the size of the advertising list, this being (remaining number of planned distributions of all advertisements−remaining number of planned distributions for a particular advertisement)/(overall number of planned distributions); and $x_0$ is the number of planned distributions and non-zero value.

The "planned number of distributions" function $f(x)$ is not limited to the above-noted function, and is allowed as long as it approximates the actual number of planned distributions and is not zero.

In addition, the "planned number of distributions" function $f(x)$ is not limited to the above-noted function, and the following functions can be envisioned.

$$f(x)=\alpha \times x+(1-\alpha)\times x_0,$$

where $\alpha$ is a constant 0 or greater and 1.0 or less, and $x_0$ is the number of reproductions for the advertisement that is not 0.

$$f(x)=x+\alpha x_0,$$

where $\alpha$ is a constant that is 0 or greater and $x_0$ is the number of reproductions for the advertisement that is not 0.

In the case of using such planned number of distribution functions f(x), the number of reproductions for the advertisement of each advertisement can be greater than the planned number of distributions.

Therefore, as a result, when there is a large difference between the planned number of distributions and the number of actual reproductions for the advertisement, rather than a form of distributions in which the "initial number of reproductions for the advertisement" is given highest priority, emphasis is placed on the advertising ratio of each advertisement, where there is uniform distribution in terms of the differences in distribution opportunities between advertisements.

By adopting such functions, it is possible to not only avoid the danger of the advertising list losing opportunities, but also to eliminate instability in extraction probability when the planned number of distributions in the advertising list becomes small.

Additionally, a practical solution for the problem of the planned number of distributions becoming zero is to contemplate such a condition beforehand, and prepare an advertising list for the purpose of scrambling. Furthermore, when the planned number of distributions of only a part of the advertisements is zero, or close to zero, extraction can be performed from the scrambling advertising list at a predetermined frequency.

By doing this, it is possible to suppress the concentrated advertisement of one and the same advertisement.

(Coefficient of Slot Size in Seconds)

A practical problem that exists in actual distribution using the present invention is that, because of mixing of various advertisement slot patterns (size of an advertisement slot for one time) and length (seconds) of the advertisement material, in control of the extraction probability, there is a further need for compensation by further controlling the coefficient of slot size in seconds.

The following three methods can be specific solutions for this problem.

(1) Method of Using a Decision Tree (Part 1)

In this case, the advertisement slot patterns and advertisement material lengths are finite in number. Hence even though the number of combinations thereof could be huge, it is still finite. Thus it is also possible to pre-prepare a coefficient of slot size in seconds that pre-adjusts the advertisement probability.

Figure 30:
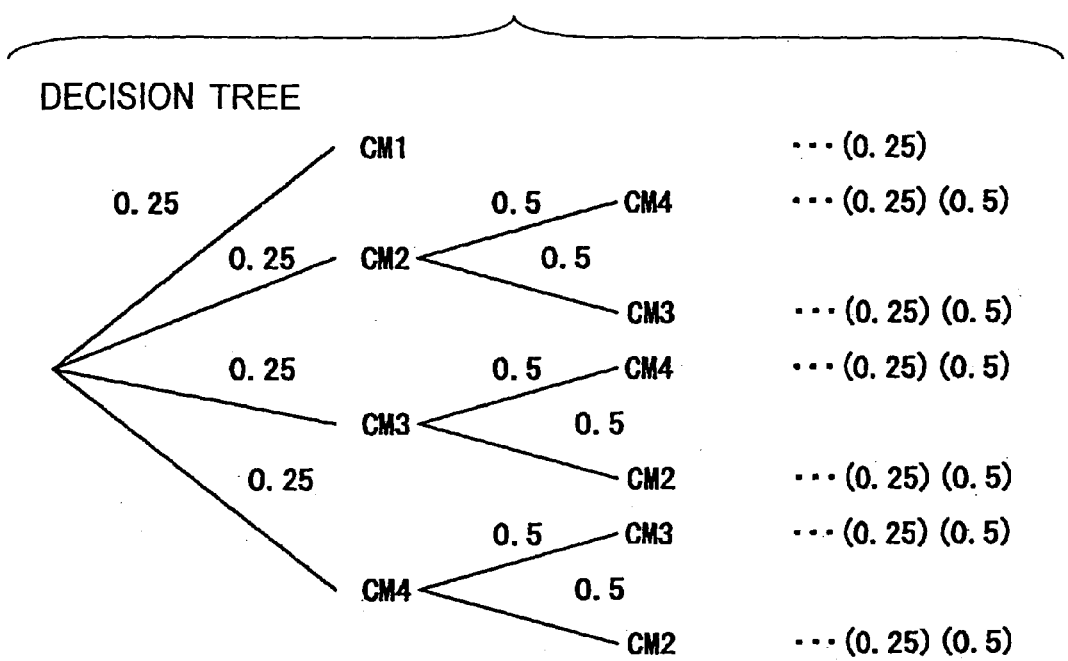
FIG. 30 is a drawing illustrating the present invention's calculation method (1) for calculating the coefficient of advertisement slot size in seconds.

Given the above, one specific method can be envisioned for solving this problem wherein, as exemplified in FIG. 30, a weight coefficient (coefficient of slot size in seconds) is prepared beforehand from the selection probability and the change ratio, by assuming a decision tree of all combinations. The method for solving this problem, however, is not restricted to this method.

The general processing flow is as follows.

N(m): Number of advertisement times for each category
len(m): The length of an advertisement content (second)
Flame: 13 slot patterns
w_flame(m, 13): Coefficient of slot size in seconds 1) The selection probability P0(i) is calculated based on the number of advertisement times for each viewer category $$P0(i)=N(i)/\Sigma N(i)$$

2) Decision tree generation
(a) Setting initial values

*rem*=Flame(*k*)//Remaining slot=slot pattern par_id//No parent advertisement (start)

(b) calc_tree (rem, par_id)//Branch generation (remaining slot, parent advertisement)

Check whether the advertisement i (c_id(i)) satisfies the following conditions (for i=1, 2, . . . , n)

(i) *len*(*i*)>=*rem*//Advertisement content length>=number of seconds coefficient (ii) *par_id*< >*c_id*(*i*)//Child is different advertisement from parent (continuity check)

(Advertisement i corresponds) calc_tree (rem−len(i), c_(i)//Remaining slot; update parent and call processing (b) (return)

(No corresponding advertisement) End of branch

3) Calculate the occurrence rate P1(i) for slot k, using the decision tree of 2).

4) For each advertisement, the change ratio s(i) of P0(i) and P1(i) is determined.

$$S(i)=P1(i)/P0(i)$$

5) Determine the maximum common multiple max of the change ratio s(xi).

6) Calculate the handicap coefficient for (flame(k))

*w_flame*(*i,k*)=max/*s*(*i*)

7) Change the slot pattern (flame(k)) and perform steps 2) to 6).
(k=1, 2, . . . , 13)

The decision tree of FIG. 30 is an example in which A is a 30-second advertisement, the other advertisements B, C, and D are 15-second advertisements, and a 30-second slot is filled.

(2) Method of Using a Decision Tree (Part 2)

A method that can be used to utilize the decision tree of (1) is to fill the individual advertisement slots by determining the expected value that selects each advertisement via a decision tree path on first time extraction only, applying weight based on individual expected values, but not in accordance with the difference in number of advertisement seconds (that is, in proportion to the planned number of distributions), and performing usual random extractions at the next extraction steps.

Figure 31:
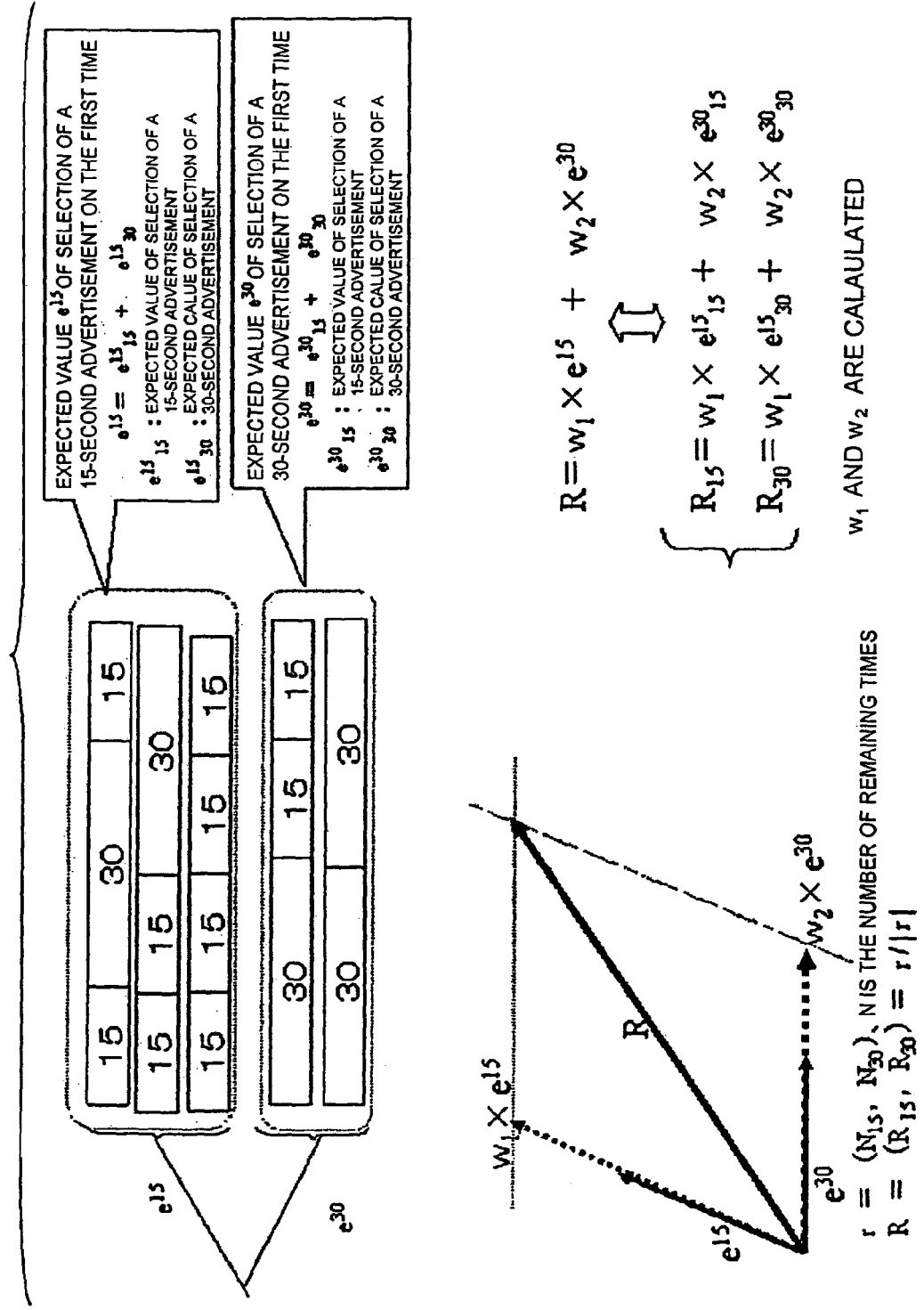
FIG. 31 is a drawing illustrating the present invention's calculation method (2) for calculating the coefficient of advertisement slot size in seconds.

FIG. 31 is a drawing describing the concept of a decision tree, and weight for 15-second and 30-second advertisements with respect to a 60-second slot.

The difference between this method and the above-described method (1) is that only when the first random extraction is done with respect to the individual 60-second slots, an operation is performed to apply handicaps that consider subsequent variations.

(3) Method of Expressing the Slot Size in Seconds as an Expected Value and Specifying the Number of Extraction Times By determining the number of extraction times such that the expected value of the overall time period of advertising is the same as the number of advertisement slot seconds, it is possible to maintain, on average, the advertising ratio for each advertisement, regardless of the advertisement length. In the case of individual advertisement slots, however, there will be a slight deviance relative to the 60-second slot, as noted below.

<Step 1>

Determine the expected values of the number of advertisement seconds within the advertising list.

<Step 2>

Calculate the number of extraction times so that the slot number of seconds is the expected value, based on the slot size in seconds and the expected value of the number of advertisement seconds.

For example, consider an example of the number of advertisement slot seconds of 60 seconds, an advertisement A (15 seconds, 100 times), advertisement B (15 seconds, 100 times), advertisement C (30 seconds, 100 times), and advertisement D (60 seconds, 100 times).

First, as step 1, the expected value E of the number of advertisement seconds at one extraction time is determined. That is, the overall total of the products of the number of seconds for each advertisement and its extraction probability is taken. The result in this example will be 30 seconds. Since this expected value E of the number of advertisement seconds is the average time which can fill in an advertisement slot for each extraction time, stated differently there are 400 times worth of a 30-second advertisement.

As step 2 the number of extraction times is determined that is required to fill the number of advertisement slot seconds. When the number of advertisement slot seconds E is 60 seconds, the number of extractions would be two. That is, by placing the 30-second advertisement twice, the 60-second advertisement slot is filled.

Therefore, if two extractions are made for each advertisement slot, although midway there will be fluctuation in the time length for advertisements in individual advertisement slots, the minimum being 30 seconds and the maximum being 120 seconds, the final totals will indicate a distribution result in which the specified number of advertisement slot seconds is the expected value, thereby enabling the planned advertisement slots to be filled.

Thus, for advertisements 1, 2, ..., m, ..., M, if the length of the content of advertisement m is len(m) and the number of advertisement times in each category for advertisement m is N(m), the expected value E of the length of the advertisement content is given by the following equation:

$$E = (len(n) \times N(m))/\Sigma N(m)$$

Thus, if the specified number of advertisement slot seconds is Flame, the number of extractions of interest can be determined as $$Flame \times (1/E).$$

Although the number of extraction times determined in step 2 may not be an integer number of times, it is possible to round the number of times upward or downward.

(4) Method of Specifying the Slot Size in Seconds and Extraction Times

Step 1:

By the above-noted method (3), calculate the number of extraction times such that the slot size in seconds is the expected value.

Step 2:

By the above-noted method (1) or (2), determine the decision tree for the number of extraction times of step 1.

Step 3:

In the decision tree generated by step 2, arrange the branches that are outside the allowable limit of the slot size in seconds.

In the above the "allowable limit" is as follows:

Slot size in seconds−Δ<advertisement length (sum of the number of seconds of advertisements of each branch)<slot size in seconds+Δ

(The sizes of −Δ and +Δ are not necessarily the same.)

A merit of this method is that processing is simplified because the number of extractions is small and it is possible to reduce division of the branches of the decision tree. Furthermore, the range of variation in the slot size in seconds E can be controlled.

As an example, consider a case in which the slot size in seconds is 60 seconds, which includes advertisement A (15 seconds, 100 times), advertisement B (15 seconds, 100 times), advertisement C (30 seconds, 100 times), and advertisement D (60 seconds, 100 times).

In the illustrated case, the slot size in seconds range is −Δ1=15 seconds and +Δ2=30 seconds, this being a time range of 45 to 90 seconds. This range is that indicated by the broken line in FIG. 32(a).

The probability distribution in this case is noted in FIG. 32(b).

Step 1: Specified number of times=2

Step 2: The branches of the first time 15-second advertisement and the second time 15-second advertisement outside the broken line, and the first time 60-second advertisement and second time 60-second advertisement branches are arranged. If this extraction pattern arises, that extraction would be ignored and extraction would be performed again.

(On-Line Processing)

In the advertisement insertion system 7, a pre-allocated advertising list 15-2, generated via the above-noted process and allocated for each sales unit, is received from an advertisement advertising server 4, and preparation for on-line processing is achieved.

Figure 33:
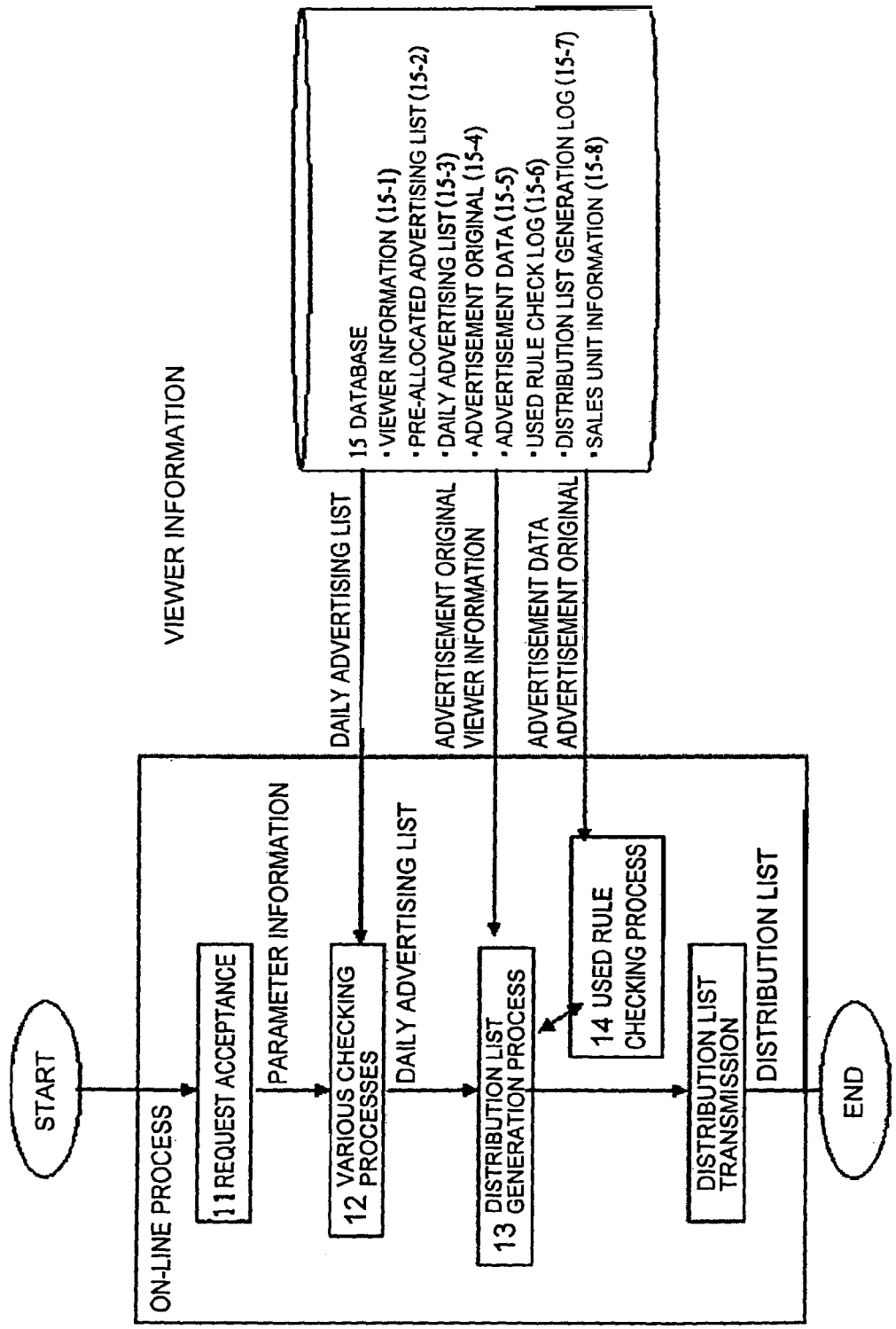
FIG. 33 is a drawing showing the present invention's flow from receipt of a viewer request to distribution list removal.

An advertisement information request and viewer information are received from a viewer terminal 2 that is playing back program video content, and advertisement information responsive to the sales unit determined by the advertisement information and the viewer information is distributed to the viewer terminal 2. After this, the processing flow is as shown in FIG. 33.

As described above, in the pre-distributed advertising list uploading process 8, the pre-allocated monthly advertising list exemplified in FIG. 34 is received and stored, which is generated by the advertisement advertising server.

In the allowance checked advertising list generation process 9, the existence of authentication for each of the advertisement originals and the advertisement data, and the presence in the advertising server 1 are confirmed with respect to the pre-allocated advertising list 15-2 that was captured in the advertising list uploading process 8. The allowed time period is also checked based on allowance information. Allowance information is verified by acquiring the allowance information of the advertisement content from the allowance management server 16. The checked advertising list is then stored as a pre-checked advertising list in a database. An example of a pre-checked advertising list is shown in FIG. 35.

In the allowance checked advertising list generation process 9, a check of the advertisement originals and the advertisement data allowance period of time are performed with respect to the pre-checked advertising list as well. Thus, even if the allowance information or advertisement data or the like is changed after the advertising list uploaded, the content thereof is reflected automatically.

The allowance checked advertising list generation processing is preferably launched daily.

In the weight coefficient calculation process 10, the handicap coefficient is calculated for each pre-checked advertising list. In the distribution list generation process 13, advertisement selection is performed by random extraction probability based on the number of reproductions for the advertisement for each advertisement included in the pre-checked advertising list.

As described above, control is possible such that the delay in progress of advertisements with disallowances is eliminated by increasing the amount of advertisements that could not be distributed because of disallowed days or time bands on other days or time bands. In addition, it is possible to distribute the advertisements on the specified days or time bands. Furthermore, similar treatment can be applied, for example, when the occurrence probability reduces relative to the slot size in seconds due to the difference of advertisement content seconds.

In addition, as a result, the calculated handicap coefficients are retained in the checked advertising list. This weight coefficient calculation process is preferably launched daily.

When there is a specific request from a viewer on the viewer terminal 2, request acceptance 11 also receives an advertisement request from the viewer terminal 2, and viewer information at the same time.

(Checking Processes)

In the various checking processes 12, a checked advertising list that is linked by an advertisement request and viewer information passed by the request acceptance section 11 is acquired from a database. The allowance conditions, usage conditions, and advertisement slot conditions are preferably included within the advertisement request. In addition, it is possible to acquire detailed information from viewer information, such as region and age, by accessing the viewer information database 15-1 using a viewer code.

Information comprised in the advertisement request and viewer information is as follows: First, the advertisement request usually comprises usage information including allowance conditions such as the network, region, age, date, and time band; usage conditions such as format, number of pixels, and bit rate; and advertisement slot conditions such as the distribution provider, advertisement slot size in seconds, advertising list class, program content code, and slot number. Viewer information usually comprises items such as age, region, viewer category, past actions and behavior, viewer code, and player ID.

In accordance with narrowing conditions, such as advertisement slot size in seconds, time band, and network, narrowing is carried out from the overall advertisement originals within the checked advertising list, to select only the target advertisement originals.

A specific method for checking, based on the time of a viewer request and whether the time was a disallowed time band is, as described above, a method wherein the disallowance time band coefficients, which are one of the handicap coefficients, are all made zero values. Thus the request is substantially removed from the subject in the random extraction.

The distribution list generation process 13 is preferably configured such that the advertisement originals distributed last time, and the advertisement originals for which the frequency is excessive, are further removed from the advertisement originals after narrowing within the checked advertising list. The frequency is the number of distributions of an advertisement original for each viewer, and is information that is held within the viewer information. In the distribution list generation process 13, extraction from the advertisement originals narrowed within the checked advertising list is performed with probabilities that are proportional to values that are the product of the number of reproductions for the advertisement and weight coefficient of each advertisement original. One advertisement is selected in accordance with the result of that extraction.

In the used rule process 14, a check as to whether distribution is possible is made with respect to the advertisement original selected by the distribution list generation process 13, based on the advertisement data information 15-5. This is because there is a plurality of contents encoded with respect to an advertisement original, and whether or not the advertisement original selected by the random extraction processing has content corresponding to available encoding (a used rule) is checked. The advertisement data is a plurality of encoded content information linked to the advertisement original, and the used rule is information regarding the viewing environment of a viewer. A bit rate and number of pixels are included in the advertisement data and used rule.

Only advertisements that have passed this check are added to the distribution list. Advertisement content for which distribution has been finalized, and information such as day and time are outputted to the distribution list generation log 15-7. When an addition is made to the distribution list, a value that results from subtracting the number of distributions from the number of reproductions for the advertisement held in the pre-checked advertising list is updated as the new number of reproductions for the advertisement. The updating of the number of reproductions for the advertisement can also be done periodically, using the distribution list generation log 15-7.

In the distribution list generation process 13, the used rule checking process 14 is repeated until the slot size in seconds provided by the advertisement request is filled. When the slot size in seconds is filled, the distribution list is returned to the request acceptance section 11, and distribution is made to the viewer terminal 2.

By analyzing the distribution list generation log 15-7 that is outputted at the time of distribution, the number of viewings is predicted, and the next advertising plan is established. In addition, by reflecting the distribution list generation log that is output each day in the weight calculation processing, it is possible to perform dynamic distribution control that is responsive to changes in the number of viewings.

As described above, in an information distribution system of the present invention, the distribution probability desired by an advertiser can be maintained without establishing a distribution priority. Thus, compared with a conventional method in which distribution is carried out by establishing a priority sequence, a highly effective distribution schedule capable of advertisement distribution with a narrowed viewer targeting can be created by simple processing.

In addition, because there is no need to establish a priority sequence, even if for example there are complex distribution condition specifications from the advertiser, such as category division, time/spot specifications, emphasis/non-emphasis or disallowance specifications, and the number of content seconds, it is possible to perform uniform processing by the same handicapped non-return, random extraction method, and thus there is a great benefit in terms of not only eliminating human support, but also avoiding a system architecture of great complexity.

Furthermore, in an advertisement distribution system of the present invention, by properly selecting the handicap with regard to each advertisement, even if there are various distribution condition specifications as noted above, the advertising list, which is the object of random extraction so as to maintain the extraction probability of the advertisement of the advertiser, is controlled. Thus, with respect to viewer terminals belonging to the same category, regardless of the details of requests such as the time band and video content type from a viewer terminal, it is possible to provide viewing opportunities for the same advertisement, and it is also possible to achieve advertisement distribution as desired by the advertiser. Additionally, because reliable distribution with neither excesses nor shortages with respect to the desired number of reproductions for the advertisement can be provided by a weight applying method, the advertiser's desires can be satisfied to an even greater degree.

INDUSTRIAL APPLICABILITY

The present invention meets the needs of clients such as advertisers, and also enables the autonomous distribution of information-matched to the attributes of an accessing terminal. In a sophisticated information-intensive society with developing broadband capabilities, the present invention is thus expected to be used as an information distribution control system comprising highly effective information distribution.

The invention claimed is:

1. An advertisement distribution system connected via an information network with at least a video content storage means which stores video contents, an advertisement storage means which stores advertisement materials, and a video content distribution server which selectively reads requested video contents from the video content storage means, and distributes, via an information network, the video content to a viewer terminal that has made a request, and the system comprises, a viewer database, which stores at least information about a minimum unit category to which each viewer belongs, and information about the viewing history for each viewer, an advertisement distribution condition database, which stores at least, for each advertisement, information about the desired number of reproductions for the advertisement during a planned time period and information about specifications of increasing or decreasing with respect to each minimum unit category and time period, a means for predicting the number of distribution demands, which predicts the number of demanded distributions within the time period for each minimum unit category, based on the information on the viewing history of all viewers, a means for calculating the number of planned distributions, which calculates the number of planned distributions of each advertisement for each minimum unit category, so as to balance the number of desired advertisements of each advertisement for each minimum unit category and the number of requested distributions for each minimum unit category, a means for generating a random extraction advertising list, which generates an advertising list for each minimum unit category, wherein the extraction probability for each advertisement in the case of random extraction is the ratio of the planned number of distributions of each advertisement for each minimum unit category to the accumulated total for each minimum unit category of the planned number of distributions of all the advertisements, a means for handicap application, which, when performing random extractions, applies a handicap, based on the information about specification of increasing or decreasing, each time to the remaining number of distributions of each advertisement comprised by each advertising list, so that the mean extraction probability is maintained over the time period, while causing a deviation in the extraction probability distribution between each advertising list at each random extraction, a means for random extraction, which performs random extraction with respect to the advertising list corresponding to a minimum unit category to which the distribution demand terminal belongs, based on the remaining number of distributions of each advertisement to which a handicap has been applied, so as to select one advertisement, a means for generating a distribution list, which generates a distribution list in which the extraction sequence is used as the advertisement distribution sequence, by repeating the random extraction of advertisements by the means for random extraction until the demanded advertisement slots are filled, while updating the advertising list so that the extraction probabilities for the next time reflect the results of the extraction, a means for managing a distribution list, which stores the distribution list and outputs the list to an advertisement material distribution server, and an advertisement material distribution server which, based on the distribution list, sequentially and selectively reads a corresponding advertisement material from the advertisement material storage means, and distribute the corresponding advertisement via the information network to a demand terminal which has made a request so as to be inserted into the video content distributed from the video content distribution server when the video content is distributed.

2. The advertisement distribution system of claim 1, wherein the means of generating a distribution list generates a distribution list in which the extraction sequence is used as the advertisement distribution sequence, by repeating the random extraction of advertisements by the means for random extraction until the demanded advertisement slots are filled, while updating each number of planned distributions of the advertising list by reducing the number of planned distributions so that there is no return to the advertising list for the extracted advertisement.

3. The advertisement distribution system of claim 1, wherein the means for generating a distribution list generates a distribution list in which the extraction sequence is used as the advertisement distribution sequence, by repeating the random extraction of advertisements by the means for random extraction until the demanded advertisement slots are filled, while multiplying the extraction probability of each advertisement by a corresponding correction coefficient and updating the extraction probability of each advertisement in the advertising list so that the extraction probability for the next time reflects the extraction results.

4. The advertisement distribution system of claim 1, wherein the advertisement distribution condition database further stores a minimum unit category classification for each advertisement, and the system further comprises
 a means for minimum unit category classification which performs a detailed division, into minimum categories, of the categories for all the advertisements desired to be distributed during the time period, and
 assigning the increase or decrease specifications stored in the advertisement distribution condition database to the corresponding minimum categories, and then storing the specifications again.

5. The advertisement distribution system of claim 1, wherein the means for calculating the number of planned distributions, in order to increase or decrease the initially allocated number of reproductions for the advertisement for the specified category for each advertisement in accordance with the target specification, performs a uniform flexible adjustment between the initially allocated number and the number of reproductions for the advertisement for categories without target specification for the advertisement; and uses each of the number of reproductions for the advertisement to which the increase or decrease adjustment has made as the planned number of distributions for each minimum unit category, so that the overall number of reproductions for the advertisement comprised in each minimum unit category agrees with the number of distribution demands for each minimum unit category, while maintaining the ratio of the number of reproductions for each advertisement for each minimum unit category to the overall number of planned reproductions for advertisements comprised in each minimum unit category after the flexible adjustment.

6. An advertisement distribution method comprising connecting through an information network to at least a video content storage means which stores video contents, an advertisement, storage means which stores advertisement materials, and a video content distribution server which selectively reads a requested video contents from the video content storage means, and distributes via an information network the video content to a viewer terminal that has made a request, and the method further comprises the steps of:
 storing at least information about a minimum unit category to which each viewer belongs, and information about the viewing history for each viewer,
 storing at least, for each advertisement, information about the desired number of reproductions for the advertisement during a planned time period and information about specifications of increasing or decreasing with respect to each minimum unit category and time period,
 predicting the number of distribution demands within the time period for each minimum unit category, based on the information on the viewing history of all viewers,
 calculating the number of planned distributions of each advertisement for each minimum unit category, so as to balance the number of desired advertisements of each advertisement for each minimum unit category and the number of distribution demands for each minimum unit category,
 generating a random extraction advertising list for each minimum unit category, in which the extraction probability for each advertisement in the case of random extraction is the ratio of the planned number of distributions of each advertisement for each minimum unit category to the accumulated total for each minimum unit category of the planned number of distributions of all the advertisements,
 applying handicap, wherein a handicap is applied, based on the information about specification of increasing or decreasing, each time of random extractions to the remaining number of distributions of each advertisement comprised by each advertising list, so that the mean extraction probability is maintained over the time period, while causing a deviation in the extraction probability distribution between each advertising list at each random extraction,
 extracting one advertisement by selecting and performing random extraction with respect to the advertising list corresponding to a minimum unit category to which the distribution demand terminal belongs, based on the remaining number of distributions of each advertisement to which a handicap has been applied,
 generating a distribution list in which the extraction sequence is used as the advertisement distribution sequence, by repeating the random extraction of advertisements until the demanded advertisement slots are filled, while updating the advertising list so that the extraction probabilities for the next time reflect the results of the extraction,
 storing the distribution list and outputting the list to an advertisement material distribution server,
 sequentially and selectively reading a corresponding advertisement material from advertisement storage mean based on the distribution list, and
 distributing the corresponding advertisement material from the advertisement material distribution server via the information network to demand terminal which has made a request so as to be inserted into the video content distributed from the video content distribution when the video content is distributed.

7. The advertisement distribution method of claim 6, wherein the step of generating a distribution list generates a distribution list in which the extraction sequence is used as the advertisement distribution sequence, by repeating the random extraction of advertisements by the step of extracting one advertisement until the demanded advertisement slots are filled, while updating each number of planned distributions of the extracted advertisement by reducing it so that there is no return to the advertising list for the random extraction.

8. The advertisement distribution method of claim 6, wherein the step of generating a distribution list generates a distribution list in which the extraction sequence is used as the advertisement distribution sequence, by repeating the random extraction of advertisements by the step of extracting one advertisement until the demanded advertisement slots are filled, while multiplying the extraction probability of each advertisement by a corresponding correction coefficient and updating the extraction probability of each advertisement in the advertising list so that the extraction probability for the next time reflects the extraction results.

9. The advertisement distribution method of claim 6, wherein the method comprises the steps of:
   storing a category classification for each advertisement,
   finely dividing the categories for all the advertisements desired to be distributed during the time period, into minimum categories, and
   assigning the stored increase or decrease specifications to the corresponding minimum unit categories, and then storing the specifications again.

10. The advertisement distribution method of claim 6, wherein the step of calculating the number of planned distributions, in order to increase or decrease the initially allocated number of reproductions for the advertisement for the specified category for each advertisement in accordance with the target specification, performs a uniform flexible adjustment between the initially allocated number and the number of reproductions for the advertisement for minimum unit categories without target specification for the advertisement; and uses each of the number of reproductions for the advertisement to which the increase or decrease adjustment has made as the planned number of distributions for each minimum unit category, so that the overall number of reproductions for the advertisement comprised in each minimum unit category agrees with the number of distribution demands for each minimum unit category, while maintaining the ratio of the number of reproductions for each advertisement for each minimum unit category to the overall number of planned reproductions for advertisements comprised in each minimum unit category after the flexible adjustment.

11. An advertisement distribution system that distributes each advertisement material from an advertisement distribution server to an information demand terminal via an information network, where the system comprises:
   a means for managing the number of distributions, where the means stores the planned number of distributions during a period of time for each advertisement material, the actual number of distributions already made for each advertisement material, and the remaining number of distributions for each advertisement material, which is the difference between these two numbers of distributions,
   a means for generating advertising list, where the means generates an advertising list for extraction of each time period, in which the extraction probability for each advertisement material in the case of random extraction is the ratio of the remaining number of distributions for each advertisement material to the accumulated total of the remaining number of distributions for each advertisement material at that point in time,
   a means for handicap application, which, when performing random extractions, applies a handicap, based on information about specification of increasing or decreasing, each time to the remaining number of distributions of each advertisement material comprised by the advertising list, so that the mean extraction probability is maintained over the time period, while causing deviation in the extraction probability distribution between each advertising list at each random extraction,
   a means for random extraction, where the means performs random extractions with respect to the advertising list of the corresponding time period, based on the remaining number of distributions of each advertisement material to which a handicap has been applied, so as to extract one advertisement material, and
   an advertisement material distribution server which distributes an extracted advertisement material via the information network to the distribution demand terminal, wherein an addition is made to the actual number of distributions already made, a subtraction is made from the remaining number of distributions based on the results of the distribution, and wherein the advertising list is updated so that the distribution results are reflected in the extraction probabilities for next time.

12. An advertisement distribution method that distributes each advertisement material from an advertisement distribution server to an information demand terminal via an information network, where the method comprises the steps of:
   managing the number of distributions, wherein the planned number of distributions during a period of time for each advertisement material, the actual number of distributions already made for each advertisement material, and the remaining number of distributions for each advertisement material, which is the difference between these two numbers of distributions, are stored,
   generating an advertising list for extraction of each time period, in which the extraction probability for each advertisement material in the case of random extraction is the ratio of the remaining number of distributions for each advertisement material to the accumulated total of the remaining number of distributions for each advertisement material at that point in time,
   applying handicap, wherein, when performing random extractions, a handicap is applied, based on information about specification of increasing or decreasing, each time to the remaining number of distributions of each advertisement material comprised by the advertising list, so that the mean extraction probability is maintained over the time period, while causing deviation in the extraction probability distribution between each advertising list at each random extraction,
   extracting one advertisement material by performing a random extraction with respect to the advertising list of the corresponding time period, based on the remaining number of distributions of each advertisement material to which a handicap has been applied,
   distributing the extracted advertisement material from an advertisement distribution server via the information network to the distribution demand terminal, and
   updating the advertising list so that the distribution results are reflected in the extraction probabilities for next time.

* * * * *